United States Patent
Haim et al.

(10) Patent No.: US 10,159,051 B2
(45) Date of Patent: Dec. 18, 2018

(54) METHODS, APPARATUS AND SYSTEMS FOR HANDLING ADDITIONAL POWER BACKOFF

(71) Applicant: InterDigital Patent Holdings, Inc., Wilmington, DE (US)

(72) Inventors: John W. Haim, Baldwin, NY (US); Stephen E. Terry, Northport, NY (US); Janet A. Stern-Berkowitz, Little Neck, NY (US); Sung-Hyuk Shin, Northvale, NJ (US); Virgil Comsa, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 15/484,290

(22) Filed: Apr. 11, 2017

(65) Prior Publication Data

US 2017/0223641 A1   Aug. 3, 2017

Related U.S. Application Data

(63) Continuation of application No. 14/663,058, filed on Mar. 19, 2015, now Pat. No. 9,661,590, which is a
(Continued)

(51) Int. Cl.
*H04W 52/36* (2009.01)
*H04W 52/34* (2009.01)
(Continued)

(52) U.S. Cl.
CPC ......... *H04W 52/365* (2013.01); *H04W 52/34* (2013.01); *H04W 72/082* (2013.01);
(Continued)

(58) Field of Classification Search
CPC .................. H04W 52/146; H04W 52/365
(Continued)

(56) References Cited

U.S. PATENT DOCUMENTS 8,249,091 B2   8/2012   Kim et al.
8,565,205 B2   10/2013  Ho
(Continued)

FOREIGN PATENT DOCUMENTS

CN   101102135   1/2008
CN   101895923   11/2010
(Continued)

OTHER PUBLICATIONS

"3rd Generation Partnership Project; Technical Specification Group Radio Access Network; Evolved Universal Terrestrial Radio Access (E-UTRA) Physical Layer Procedures (Release 10)", 3GPP TS 36.213 V10.0.1, Dec. 2010, 98 pages.
(Continued)

*Primary Examiner* — John J Lee
(74) *Attorney, Agent, or Firm* — Eric Berkowitz

(57) ABSTRACT

Methods, apparatus and systems are described for a wireless transmit/receive unit (WTRU) to manage its transmission power. A power headroom report (PHR) may be triggered based on changes to backoff or the impacts of backoff. Additional backoff may be used to calculate a maximum output power of the WTRU and may be indicated by a domination indicator to network resources. The WTRU may be configured to eliminate triggers caused by virtual PHRs. Furthermore, the WTRU may be configured to respond to rapid changes to backoff.

20 Claims, 15 Drawing Sheets

Related U.S. Application Data continuation of application No. 13/345,033, filed on Jan. 6, 2012, now Pat. No. 9,020,556.

(60) Provisional application No. 61/430,903, filed on Jan. 7, 2011, provisional application No. 61/442,095, filed on Feb. 11, 2011, provisional application No. 61/466,899, filed on Mar. 23, 2011, provisional application No. 61/468,432, filed on Mar. 28, 2011, provisional application No. 61/473,635, filed on Apr. 8, 2011, provisional application No. 61/523,113, filed on Aug. 12, 2011.

(51) Int. Cl.
| | | |
|---|---|---|
| *H04W 72/08* | (2009.01) | |
| *H04W 52/14* | (2009.01) | |
| *H04W 52/24* | (2009.01) | |
| *H04W 72/04* | (2009.01) | |

(52) U.S. Cl.
CPC ........ *H04W 52/146* (2013.01); *H04W 52/243* (2013.01); *H04W 72/0473* (2013.01)

(58) Field of Classification Search
USPC ........ 455/522, 69, 67.11; 370/329, 252, 328
See application file for complete search history.

(56) References Cited

U.S. PATENT DOCUMENTS

| | | |
|---|---|---|
| 8,755,832 B2 | 6/2014 | Baldemair et al. |
| 2003/0119452 A1 | 6/2003 | Kim et al. |
| 2009/0191910 A1 | 7/2009 | Athalye et al. |
| 2010/0322090 A1 | 12/2010 | Zhang et al. |
| 2010/0329113 A1 | 12/2010 | Madan et al. |
| 2011/0158117 A1 | 6/2011 | Ho et al. |
| 2011/0199921 A1 | 8/2011 | Damnjanovic et al. |
| 2012/0147801 A1 | 6/2012 | Ho et al. |
| 2012/0172079 A1 | 7/2012 | Baldemair et al. |
| 2012/0207112 A1* | 8/2012 | Kim ............... H04W 52/146 370/329 |
| 2012/0281568 A1* | 11/2012 | Ho ............... H04W 52/365 370/252 |
| 2012/0281633 A1 | 11/2012 | Kim et al. |
| 2013/0051261 A1 | 2/2013 | Kazmi et al. |
| 2013/0301536 A1* | 11/2013 | Park ............... H04W 24/10 370/328 |
| 2014/0233396 A1 | 8/2014 | Marinier et al. |

FOREIGN PATENT DOCUMENTS

| | | |
|---|---|---|
| EP | 1876725 | 1/2008 |
| EP | 2659720 | 7/2012 |
| EP | 2945453 | 11/2015 |
| JP | 2012-522473 | 9/2012 |
| JP | 2014-506059 | 3/2014 |
| RU | 2236757 | 9/2004 |
| WO | WO-2009/048404 | 4/2009 |
| WO | WO-2009/118367 | 10/2009 |
| WO | WO-2010/051513 | 5/2010 |
| WO | WO-2010/129146 | 11/2010 |
| WO | WO-2011/002789 | 1/2011 |
| WO | WO-2012/091651 | 7/2012 |

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 10)", 3GPP TS 36.321 V10.0.0, Dec. 2010, 53 pages.
"3rd Generation Partnership Project; Technical Specification Group Radio Access Network; Evolved Universal Terrestrial Radio Access (E-UTRA); Medium Access Control (MAC) protocol specification (Release 10)", 3GPP TS 36.321 V10.1.0, Mar. 2011, 53 pages.
"3rd Generation Partnership Project; Technical Specification Group Radio Access Network; Evolved Universal Terrestrial Radio Access (E-UTRA); Medium Access Control (MAC) protocol specification (Release 10)", 3GPP TS 36.321 V10.4.0, Dec. 2011, 54 pages.
"3rd Generation Partnership Project; Technical Specification Group Radio Access Network; Evolved Universal Terrestrial Radio Access (E-UTRA); Medium Access Control (MAC) protocol specification (Release 10)", 3GPP TS 36.321 V10.3.0, Sep. 2011, 54 pages.
"3rd Generation Partnership Project; Technical Specification Group Radio Access Network; Evolved Universal Terrestrial Radio Access (E-UTRA); Medium Access Control (MAC) protocol specification (Release 10)", 3GPP TS 36.321 V10.2.0, Jun. 2011, 59 pages.
"3rd Generation Partnership Project; Technical Specification Group Radio Access Network; Evolved Universal Terrestrial Radio Access (E-UTRA); Physical layer procedures (Release 10)", 3GPP TS 36.213 V10.4.0, Dec. 2011, 125 pages.
"3rd Generation Partnership Project; Technical Specification Group Radio Access Network; Evolved Universal Terrestrial Radio Access (E-UTRA); Physical Layer Procedures (Release 9)", 3GPP TS 36.213 V9.3.0, Sep. 2010, 80 pages.
"3rd Generation Partnership Project; Technical Specification Group Radio Access Network; Evolved Universal Terrestrial Radio Access (E-UTRA); Radio Resource Control (RRC) protocol specification (Release 10)", 3GPP TS 36.331 V10.0.0, Dec. 2010, 276 pages.
"3rd Generation Partnership Project; Technical Specification Group Radio Access Network; Evolved Universal Terrestrial Radio Access (E-UTRA); Radio Resource Control (RRC); Protocol specification (Release 10)", 3GPP TS 36.331 V10.1.0, Mar. 2011, 290 pages.
"Japanese Notice of Allowance (English Translation)", Japanese Application No. 2013-548568, dated Dec. 15, 2015, 3 pages.
"Japanese Notice of Allowance (English Translation)", Japanese Application No. 2016-005433, dated Sep. 6, 2016, 3 pages.
"Japanese Notice of Rejection", Japanese Application No. 2013-548568, dated Jul. 14, 2015, 4 pages.
"Japanese Notice of Rejection (English Translation)", Japanese Application No. 2013-548568, dated Jul. 14, 2015, 5 pages.
"Patent Abstract of CN101895923", Nov. 24, 2010, 1 page.
"Russian Decision on Grant", Russian Application No. 2013136902, dated Jan. 13, 2016, 12 pages.
"Russian Decision on Grant (English Translation)", Russian Application No. 2013136902, dated Jan. 13, 2016, 8 pages.
"The IS95 Reverse Channel, Wireless Communication, Chapter: Network Concepts and Standards, Section: Cellular Systems, IS95", http://www.wirelesscommunication.nl/reference/chaptr01/telephon/is95/is95rev.htm, published on or before, Jan. 5, 2011, 4 pages.
"United States Office Action", U.S. Appl. No. 13/345,033, dated May 2, 2014, 12 pages.
"Voyages of a Restless Mind", USS Clueless CDMA FAQ—Glossary, http://www.denbeste.nu/cdmafaq/glossary.shtml, published on or before, Jan. 5, 2011, 7 pages.
Ericsson, et al., "Closed loop transmit diversity for HSUPA", 3GPP Tdoc R1-105475, 3GPP TSG RAN WG1 Meeting #62bis, Xi'an, P.R. China, Oct. 11-15, 2010, 22 pages.
Ericsson, et al., "Pcmax for CA", 3GPP Tdoc R4-110561, 3GPP TSG-RAN Working Group 4 (Radio) Meeting AH#5, Austin, USA, Jan. 17-21, 2011, 5 pages.
ETSI MCC, "Report of 3GPP TSG RAN WG2 meeting #72, Jacksonville, USA, Nov. 15-19, 2010", 3GPP Tdoc R2-110679, 3GPP TSG-RAN Working Group 2 meeting #72bis, Dublin, Ireland, Jan. 17-21, 2011, 166 pages.
InterDigital, "MAC PHR Contents", 3GPP Tdoc R2-106417, 3GPP TSG RAN WG2 #72, Jacksonville, Florida, USA, Nov. 8-12, 2010, 8 pages.
Interdigital Communications, "Power Management PHR Triggering Clarification and Correction", 3GPP Tdoc R2-113207; 3GPP TSG RAN WG2 Meeting #74, Barcelona, Spain, May 9-13, 2011, 9 pages.

(56) References Cited

OTHER PUBLICATIONS

MCC Support, "Draft Report of 3GPP TSG RAN WG1 #62bis v0.1.0", 3GPP Tdoc R1-10xxxx, 3GPP TSG RAN WG1 Meeting #63, Jacksonville, USA, Nov. 15-19, 2010, 83 pages.
MCC Support, "Draft Report of 3GPP TSG RAN WG1 #64 v0.1.0", 3GPP Tdoc R1-11xxxx, 3GPP TSG RAN WG1 Meeting #65, Kobe, Japan, May 9-13, 2011, 77 pages.
MCC Support, "Final Report of 3GPP TSG RAN WG1 #60bis V1.0.0 (Beijing, China, Apr. 12-16, 2010)", 3GPP Tdoc R1-102601, 3GPP TSG RAN WG1 Meeting #61, Montreal, Canada, May 10-14, 2010, 85 pages.
MCC Support, "Final Report of 3GPP TSG RAN WG1 #61 V3.0.0 (Montreal, Canada, May 10-14, 2010)", 3GPP Tdoc R1-104183, 3GPP TSG RAN WG1 Meeting #61bis, Dresden, Germany, Jun. 28-Jul. 2, 2010, 83 pages.
MCC Support, "Final Report of 3GPP TSG RAN WG1 #64 V1.3.0", 3GPP Tdoc R1-111875, 3GPP TSG RAN WG1 Meeting #65, Spain, Barcelona, May 9-13, 2011, 79 pages.
MCC Support, "RAN-4 #57 Meeting Report", 3GPP Tdoc R4-110597, 3GPP TSG-RAN WG4 Meeting #57, Jacksonville, FL, USA, Nov. 15-19, 2010, 136 pages.
Mediatek Inc., "Discussion on Pcmax,c and Pcmax", 3GPP Tdoc R4-113381, 3GPP TSG-RAN Working Group 4 (Radio) Meeting #59AH, Romania, Bucharest, Jun. 27-Jul. 1, 2011, 3 pages.
Mediatek Inc., "Including Pcmax in Power Headroom Reporting", 3GPP Tdoc R1-111783, 3GPP TSG-RAN WG1 Meeting #65, Barcelona, Spain, May 9-13, 2011, 2 pages.
Mediatek Inc., "Reporting Pcmax", 3GPP Tdoc R2-113081, 3GPP TSG-RAN WG2 Meeting #74, Barcelona, Spain, May 9-13, 2011, 5 pages.
Motorola, "Change Request CR0270, Introduction of Rel-10 LTE-Advanced features in 36.213", 3GPP Tdoc R1-106557, 3GPP TSG-RAN Meeting #63, Jacksonville, USA, Nov. 15-19, 2010, 95 pages.
Motorola, "PHR and P_CMAX Reporting", 3GPP Tdoc R2-106478, 3GPP TSG RAN WG2 Meeting #72, Jacksonville, USA, Nov. 15-19, 2010, 3 pages.
New Postcom, "Remaining issues on uplink power control for LTE-A", 3GPP Tdoc R1-105942, 3GPP TSG RAN WG1 Meeting #63, Jacksonville, USA, Nov. 15-19, 2010, 2 pages.
NTT Docomo, Inc., "P-MPR related PHR triggering condition", 3GPP Tdoc R2-111245, 3GPP TSG-RAN WG2 Meeting #73, Taipei, Taiwan, Feb. 21-25, 2011, 4 pages.
Qualcomm, "Power Reduction Evaluation Study for Multi-transmitter and Tablet Devices", 80W2185-1, Rev. A, QUALCOMM Incorporated, Oct 28, 2010, 16 pages.
QualComm Inc., "Definition of Pcmax,c", 3GPP Tdoc R1-106348, 3GPP TSG-RAN WG1 #63, Jacksonville, Florida, USA, Nov. 15-19, 2010, 5 pages.
Qualcomm Incorporated, "Power Headroom Report for Rel.10", 3GPP Tdoc R4-104779, 3GPP TSG RAN WG4 #57, Jacksonville, Florida, USA, Nov. 15-19, 2010, 4 pages.
QUALCOMM Incorporated, et al., "Power Management Based PHR Trigger", 3GPP Tdoc R2-110656, Change Request 36.321 V10.0.0, 3GPP TSG-RAN2 Meeting #72bis, Dublin, Ireland, Jan. 17-21, 2011, 4 pages.
Qualcomm Incorporated, et al., "SAR Requirement and PHR", 3GPP Tdoc R2-106899, 3GPP TSG-RAN WG2 #72, Jacksonville, Florida, USA, Nov. 15-19, 2010, 2 pages.
Qualcomm Incorporated, et al., "Way Forward on PHR for Release 10", 3GPP Tdoc R4- 104927, 3GPP TSG RAN WG4 #57, Jacksonville, Florida, USA, Nov. 15-19, 2010, 1 page.

RAN WG1, "Way Forward on UL Power Control with Carrier Aggregation", 3GPP Tdoc R1-102578, 3GPP TSG RAN WG1 Meeting #60bis, Beijing, China, Apr. 12-16, 2010, 3 pages.
Samsung, "Correction of the equation for UL total transmit power scaling", 3GPP Tdoc R1-110083, 3GPP TSG RAN WG1 Meeting #63bis, Dublin, Ireland, Jan. 17-21, 2011, 2 pages.
Samsung, "Transmission Power & PHR handling in CA", 3GPP Tdoc R2-103550, 3GPP TSG-RAN2#70 meeting, Stockholm, Sweden, Jun. 28-Jul. 2, 2010, 7 pages.
TSG RAN WG1, "LS on the reference format on virtual PHR", 3GPP Tdoc R1-105820, 3GPP TSG-RAN WG1 #62bis, Xian, China, Oct. 11-15, 2010, 2 pages.
TSG RAN WG1, "LS on the reference format on virtual PHR", 3GPP Tdoc R2-106048, 3GPP TSG RAN WG2 Meeting #72, Jacksonville, USA, IDR #13 cites both R2-106048 and R1-105820, Nov. 15-19, 2010, 2 pages.
"3rd Generation Partnership Project; Technical Specification Group Radio Access Network; Evolved Universal Terrestrial Radio Access (E-UTRA); Radio Resource Control (RRC); Protocol Specification (Release 10)", 3GPP TS 36.331 V10.3.0, Sep. 2011, 296 Pages.
"3rd Generation Partnership Project; Technical Specification Group Radio Access Network; Evolved Universal Terrestrial Radio Access (E-UTRA); Radio Resource Control (RRC); Protocol specification (Release 10)", 3GPP TS 36.331 V10.2.0, Jun. 2011, 320 pages.
"3rd Generation Partnership Project; Technical Specification Group Radio Access Network; Evolved Universal Terrestrial Radio Access (E-UTRA); Radio Resource Control (RRC); Protocol specification (Release 9)", 3GPP TS 36.331 V9.5.0, Dec. 2010, 252 pages.
"3rd Generation Partnership Project; Technical Specification Group Radio Access Network; Evolved Universal Terrestrial Radio Access (E-UTRA); User Equipment (UE) radio transmission and reception (Release 10)", 3GPP TS 36.101 V10.5.0, Dec. 2011, 288 pages.
"3rd Generation Partnership Project; Technical Specification Group Radio Access Network; Evolved Universal Terrestrial Radio Access (E-UTRA); User Equipment (UE) radio transmission and reception (Release 9)", 3GPP TS 36.101 V9.5.0, Oct. 2010, 187 pages.
"Chinese Office Action", Chinese Application No. 201280004845.7, dated Mar. 25, 2016, 5 pages.
"Chinese Office Action (English Translation)", Chinese Application No. 201280004845.7, dated Mar. 25, 2016, 6 pages.
"Communication under Rule 164(2)(a) EPC", European Application No. 12701200.3, dated Aug. 4, 2017, 7 pages.
"Draft Report of 3GPP TSG RAN WG1 #61 v0.1.0 (Montreal, Canada, May 10-14, 2010)", 3GPP Tdoc R1-10xxxx, 3GPP TSG RAN WG1 Meeting #61bis, Dresden, Germany, Jun. 28-Jul. 2, 2010, 81 pages.
"Final Report of 3GPP TSG RAN WG1 #64 v1.0.0", 3GPP Tdoc R1-111970; 3GPP TSG RAN WG1 Meeting #65, Spain, Barcelona, May 9-13, 2011, 79 pages.
"Interim SAR Test Considerations for LTE Handsets and Data Modems", Federal Communications Commission, Office of Engineering and Technology, Laboratory Division Public Draft Review, Publication 941225, Dec. 15, 2010, 11 pages.
"International Search Report and Written Opinion", PCT/US2012/020444, dated Jul. 11, 2012, 16 pages.
"Japanese Notice of Allowance", Japanese Application No. 2013-548568, dated Dec. 15, 2015, 3 pages.
"Japanese Notice of Allowance", Japanese Application No. 2016-005433, dated Sep. 6, 2016, 3 pages.
Qualcomm Incorporated, "Definition of Pcmax,c", 3GPP R4-110207; 3GPP TSG RAN4 Meeting #57AH; Austin, Texas, USA, Jan. 17-21, 2010, 2 pages.

* cited by examiner

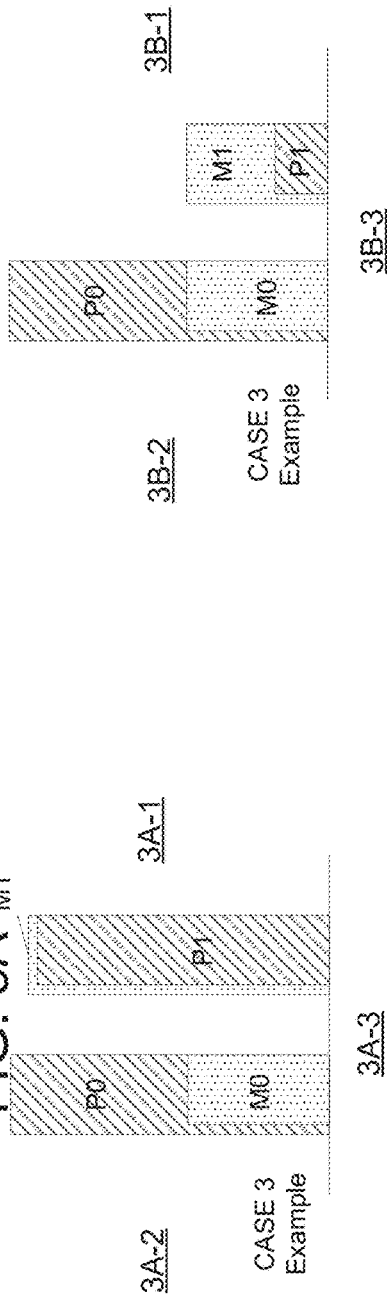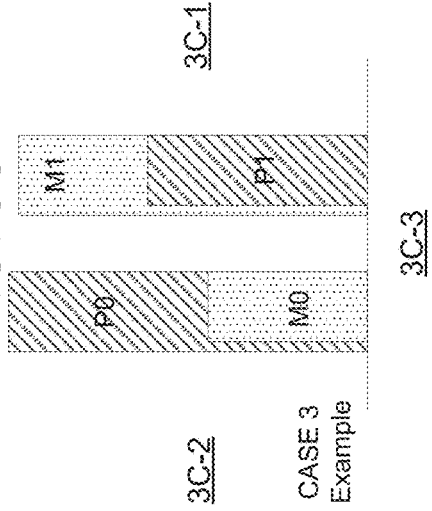

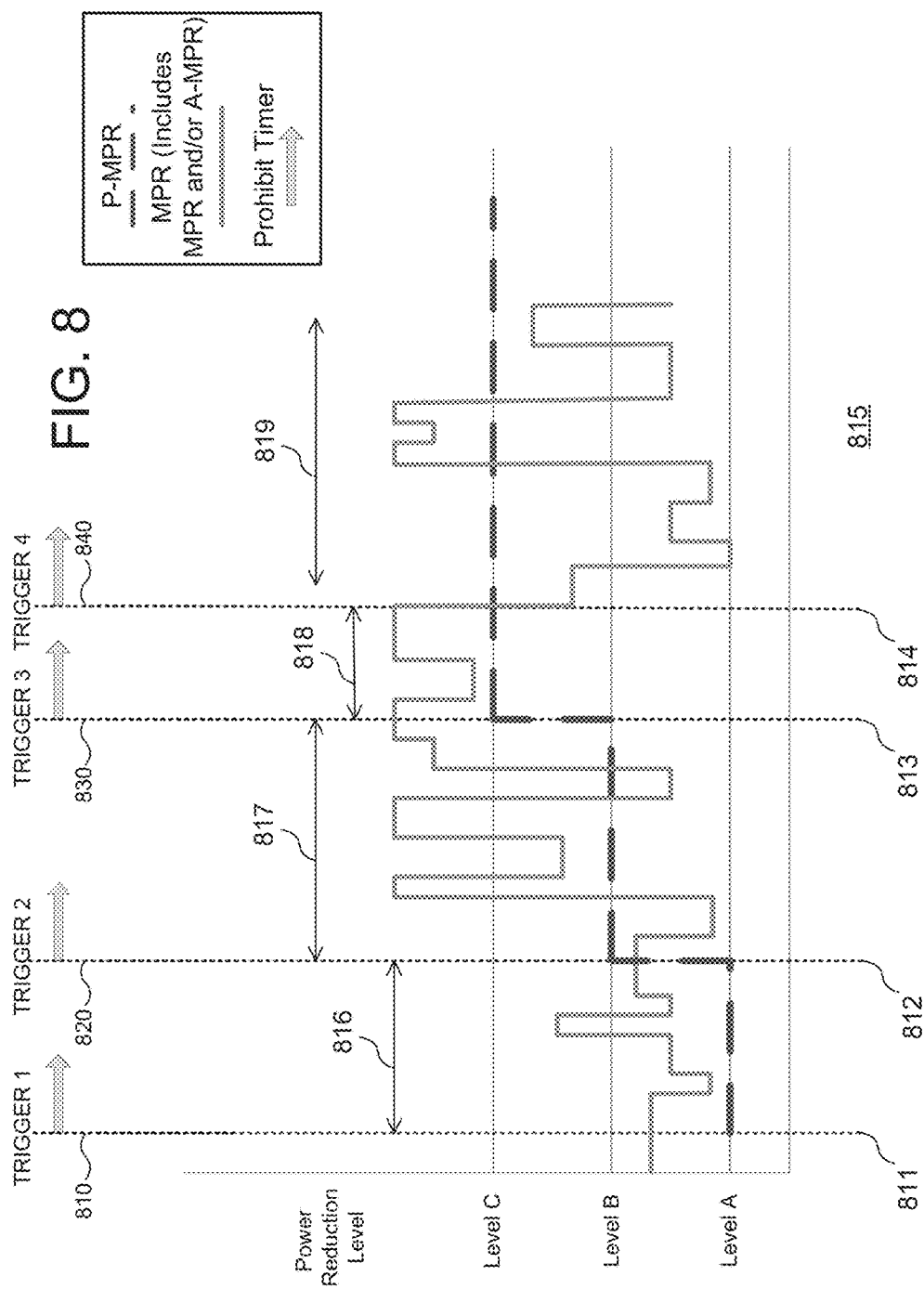

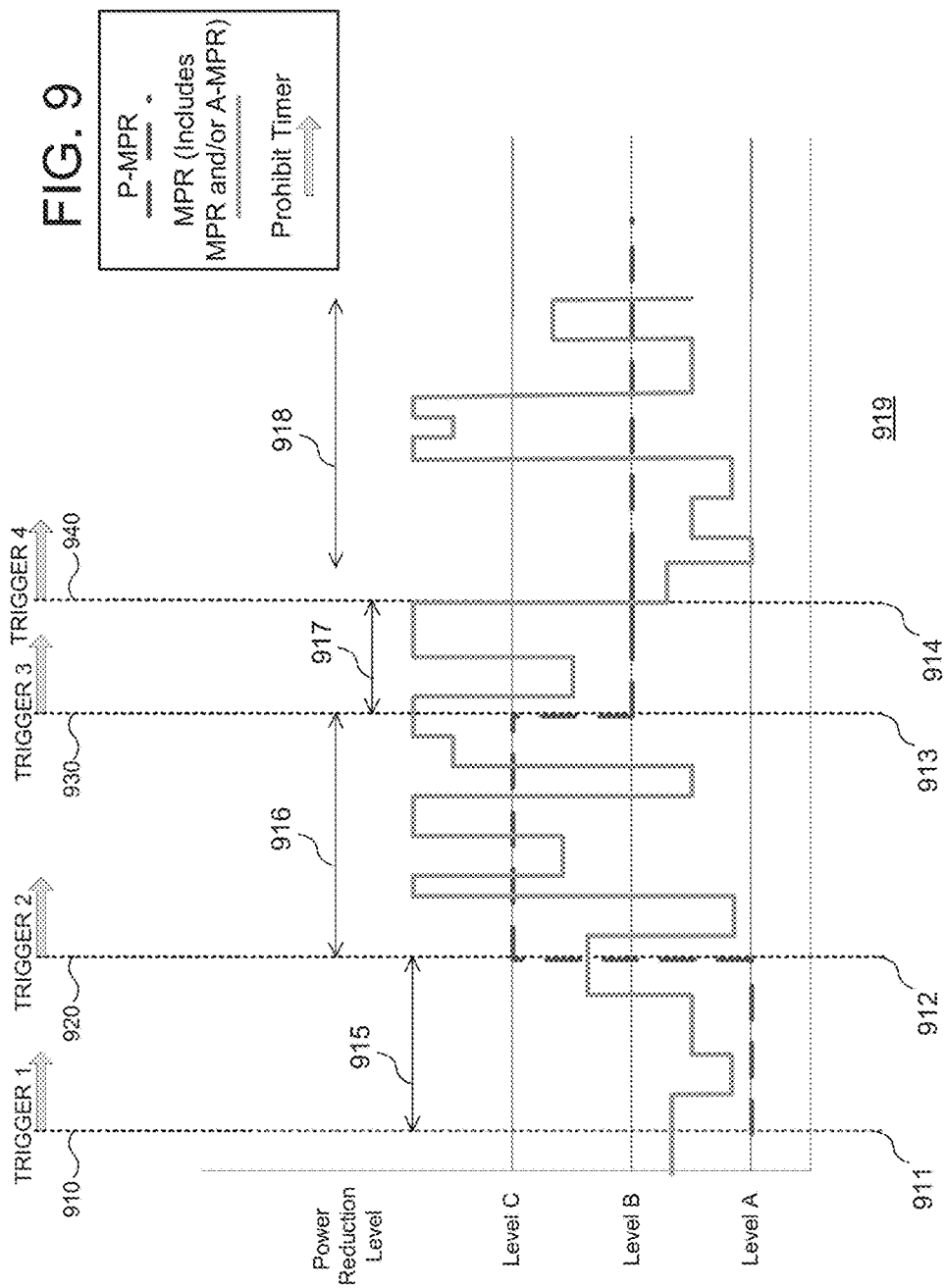

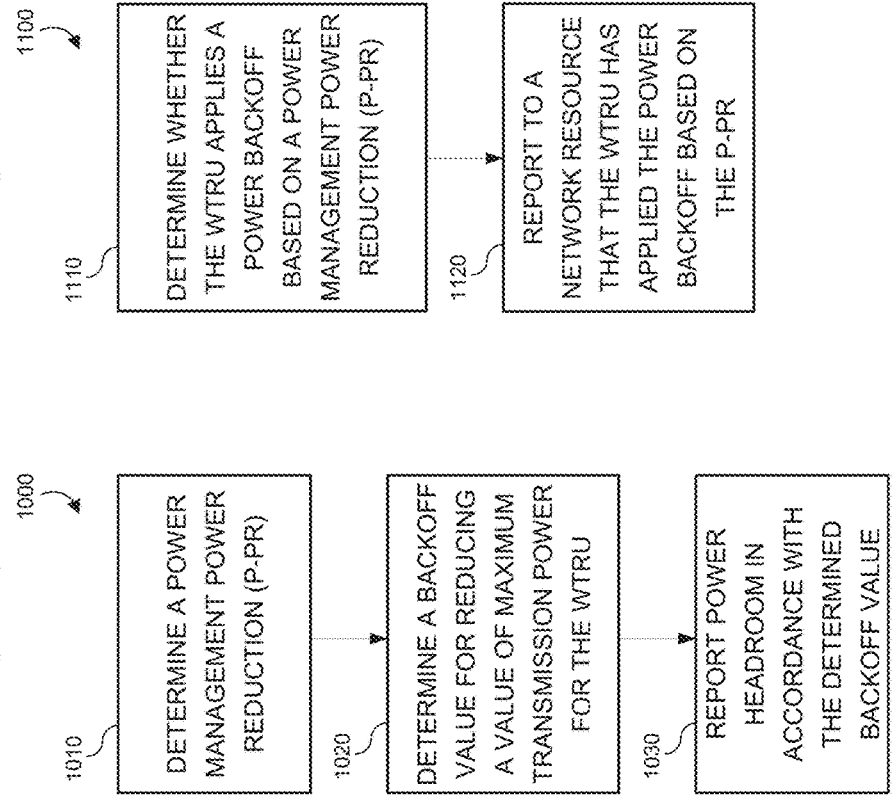
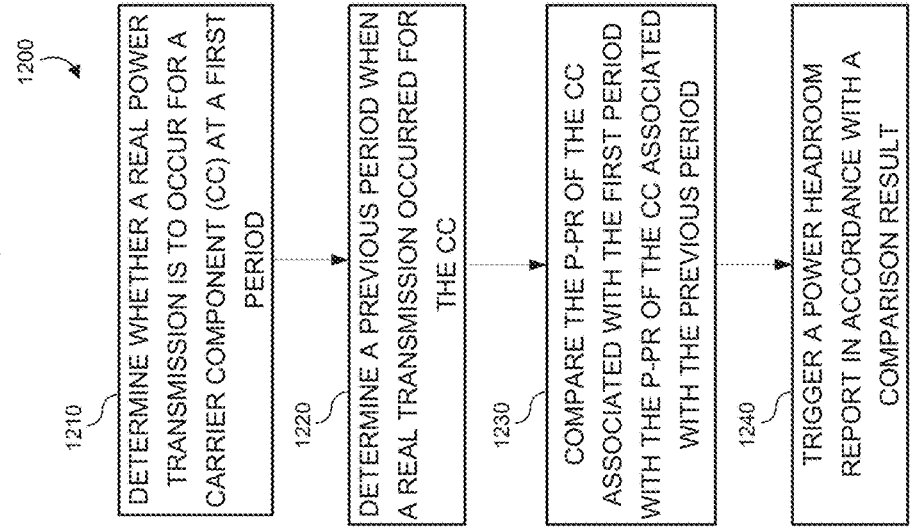
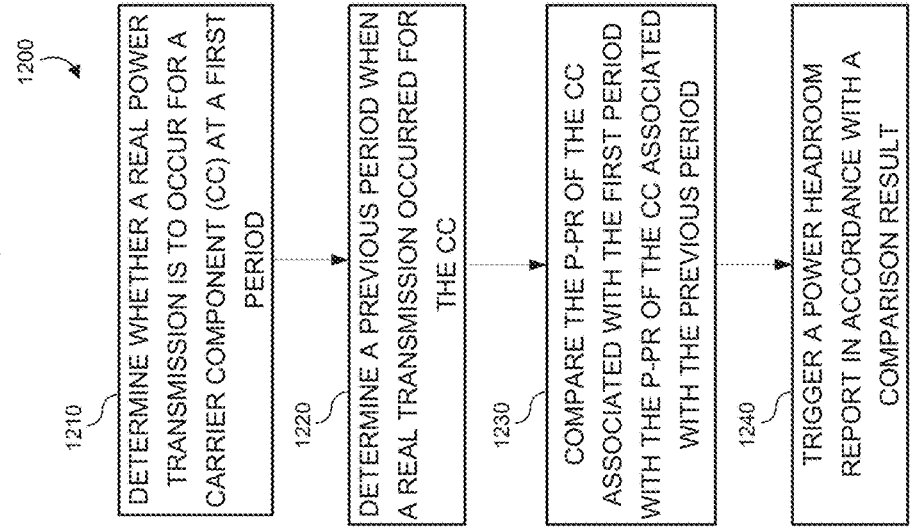
FIG. 12
FIG. 11
FIG. 10

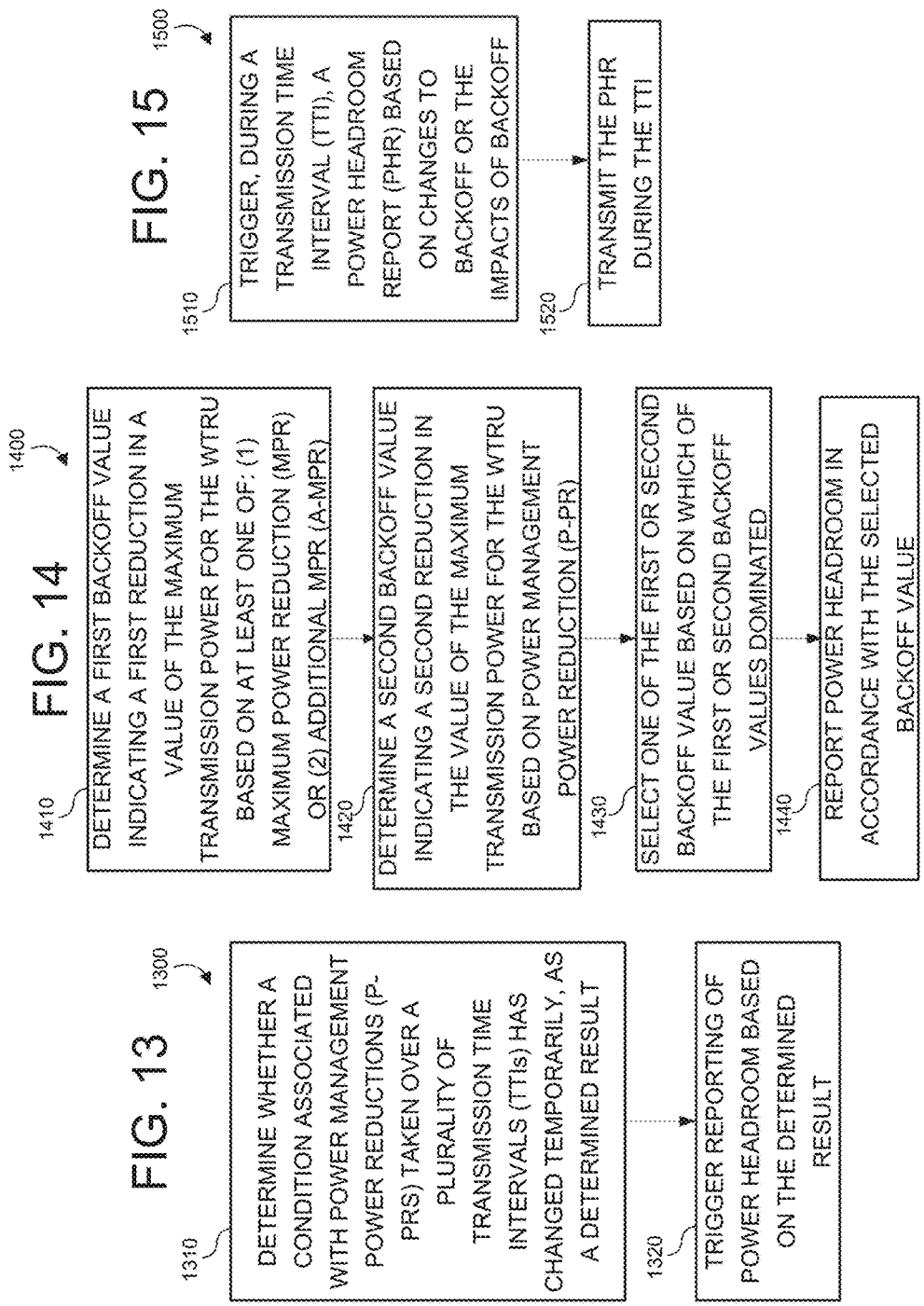

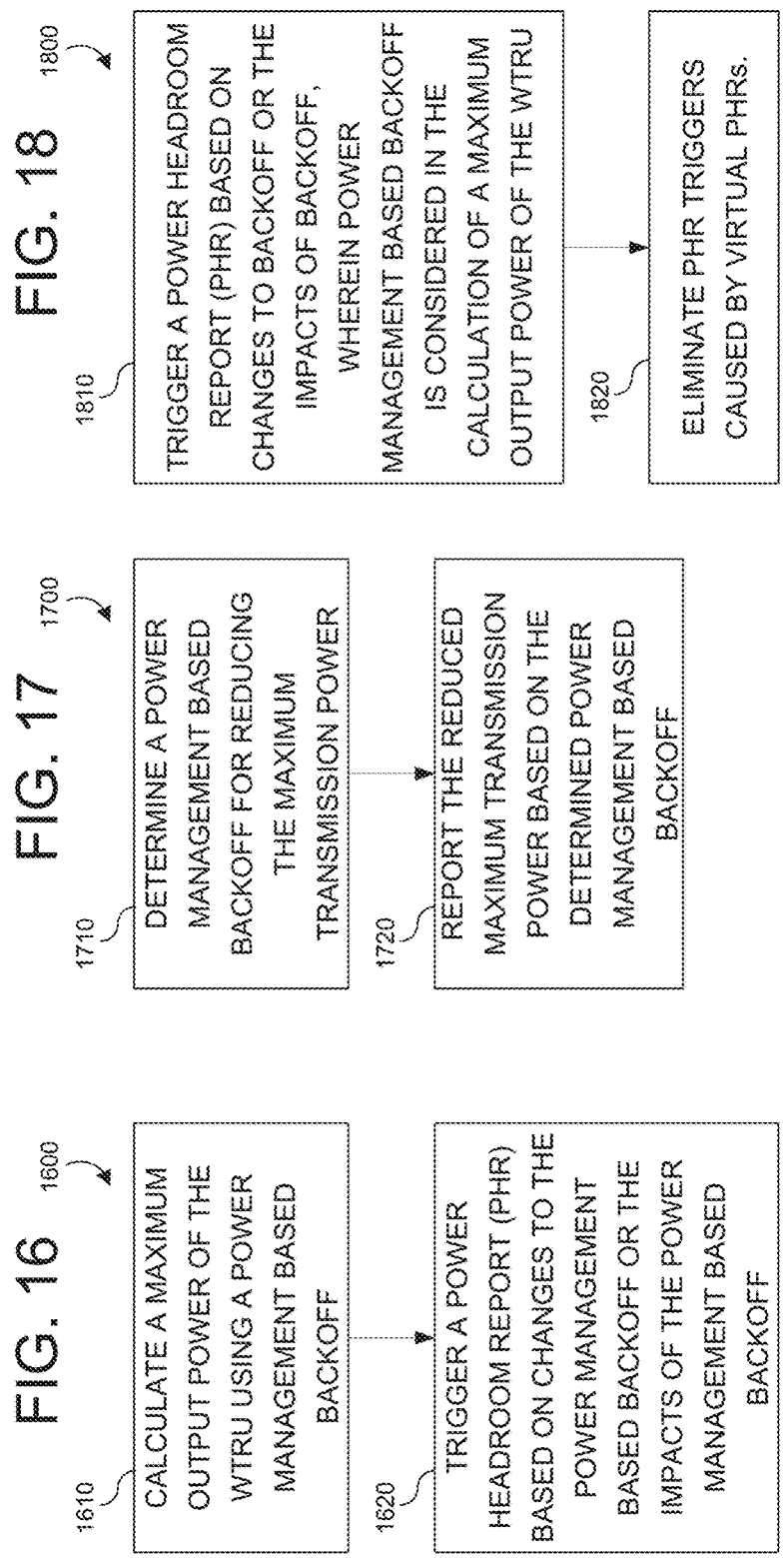

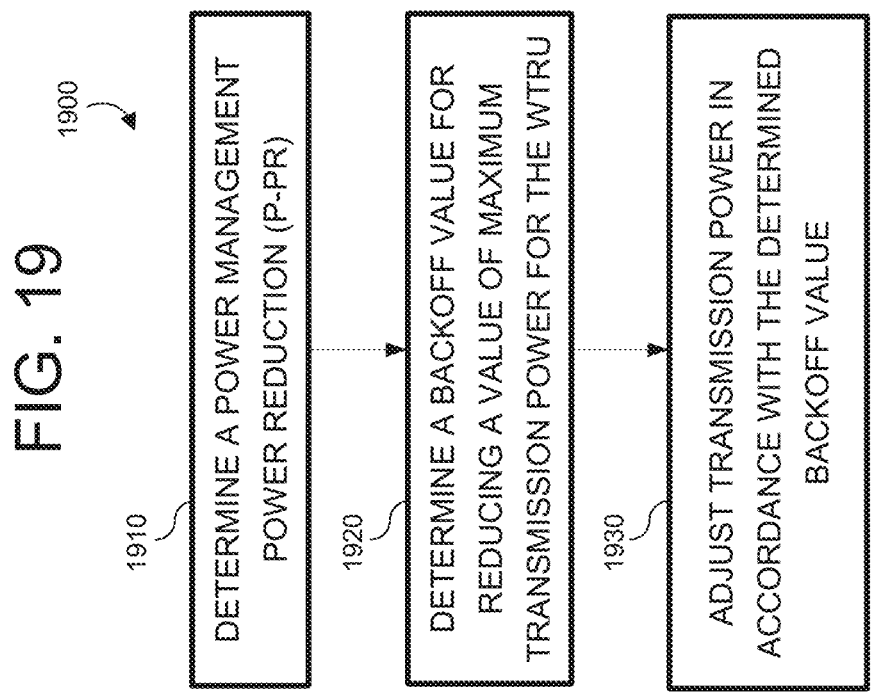

METHODS, APPARATUS AND SYSTEMS FOR HANDLING ADDITIONAL POWER BACKOFF

CROSS REFERENCE TO RELATED APPLICATIONS

This application is a continuation of U.S. patent application Ser. No. 14/663,058 filed Mar. 19, 2015, which is a continuation of U.S. patent application Ser. No. 13/345,033 filed Jan. 6, 2012, now U.S. Pat. No. 9,020,556, which claims priority to U.S. Provisional Application No. 61/430,903, filed Jan. 7, 2011, U.S. Provisional Application No. 61/442,095, filed Feb. 11, 2011, U.S. Provisional Application No. 61/466,899, filed Mar. 23, 2011, U.S. Provisional Application No. 61/468,432, filed Mar. 28, 2011, U.S. Provisional Application No. 61/473,635, filed Apr. 8, 2011, and U.S. Provisional Application No. 61/523,113, filed Aug. 12, 2011, the contents of each being incorporated herein by reference.

FIELD OF DISCLOSURE

This application relates to wireless communications and, in particular, methods, apparatus and systems for handling additional power backoff.

BACKGROUND

Power control is used in wireless communication systems to satisfy governmental regulations and to limit interference between and among wireless communication devices.

SUMMARY

Methods, apparatus and system are described for managing power headroom reporting associated with a wireless transmit/receive unit (WTRU). One representative method includes: determining a Power Management Power Reduction (P-PR); determining a backoff value for reducing a value of maximum transmission power for the WTRU; and reporting power headroom in accordance with the determined backoff value.

Another representative method for managing transmission power of a wireless transmit/receive unit (WTRU) includes: determining a Power Management Power Reduction (P-PR); determining a backoff value for reducing a value of maximum transmission power for the WTRU; and adjusting transmission power in accordance with the determined backoff value.

A representative wireless transmit/receive unit (WTRU) configured to report power headroom, includes a processor configured to: determine a Power Management Power Reduction (P-PR) and determine a backoff value for reducing a value of maximum transmission power for the WTRU; and a transmit/receive unit configured to report power headroom in accordance with the backoff value determined by the processor.

Another representative WTRU configured to manage power headroom reports (PHRs) includes: a processor configured to determine whether a real transmission is to occur for a component carrier (CC) at a first period; determine a previous period when a real transmission occurred for the CC; compare the P-PR of the CC associated with the first period with the P-PR of the CC associated with the previous period; and trigger a PHR in accordance with a comparison result.

BRIEF DESCRIPTION OF THE DRAWINGS

A more detailed understanding may be had from the Detailed Description below, given by way of example in conjunction with drawings appended hereto. Figures in such drawings, like the detailed description, are examples. As such, the Figures and the detailed description are not to be considered limiting, and other equally effective examples are possible and likely. Furthermore, like reference numerals in the Figures indicate like elements, and wherein:

FIG. 3A-3C are diagrams illustrating other representative PHR triggering procedures as different examples of how and when triggering may occur;

FIGS. 8 and 9 are diagrams illustrating still additional PHR representative triggering procedures using prohibit timers.

FIG. 10 is a flowchart illustrating a representative PHR method;

FIG. 11 is a flowchart illustrating another representative PHR method;

FIG. 12 is a flowchart illustrating a further representative PHR method;

FIG. 13 is a flowchart illustrating an additional representative PHR method;

FIG. 14 is a flowchart illustrating a still further representative PHR method;

FIG. 15 is a flowchart illustrating a still additional representative PHR method;

FIG. 16 is a flowchart illustrating a still additional representative PHR method;

FIG. 17 is a flowchart illustrating a yet further representative PHR method;

FIG. 18 is a flowchart illustrating a yet further representative PHR method;

FIG. 19 is a flowchart illustrating a representative power transmission adjustment method; and FIG. 20 is a flowchart illustrating a further representative power transmission adjustment method.

DETAILED DESCRIPTION

Figure 1A:
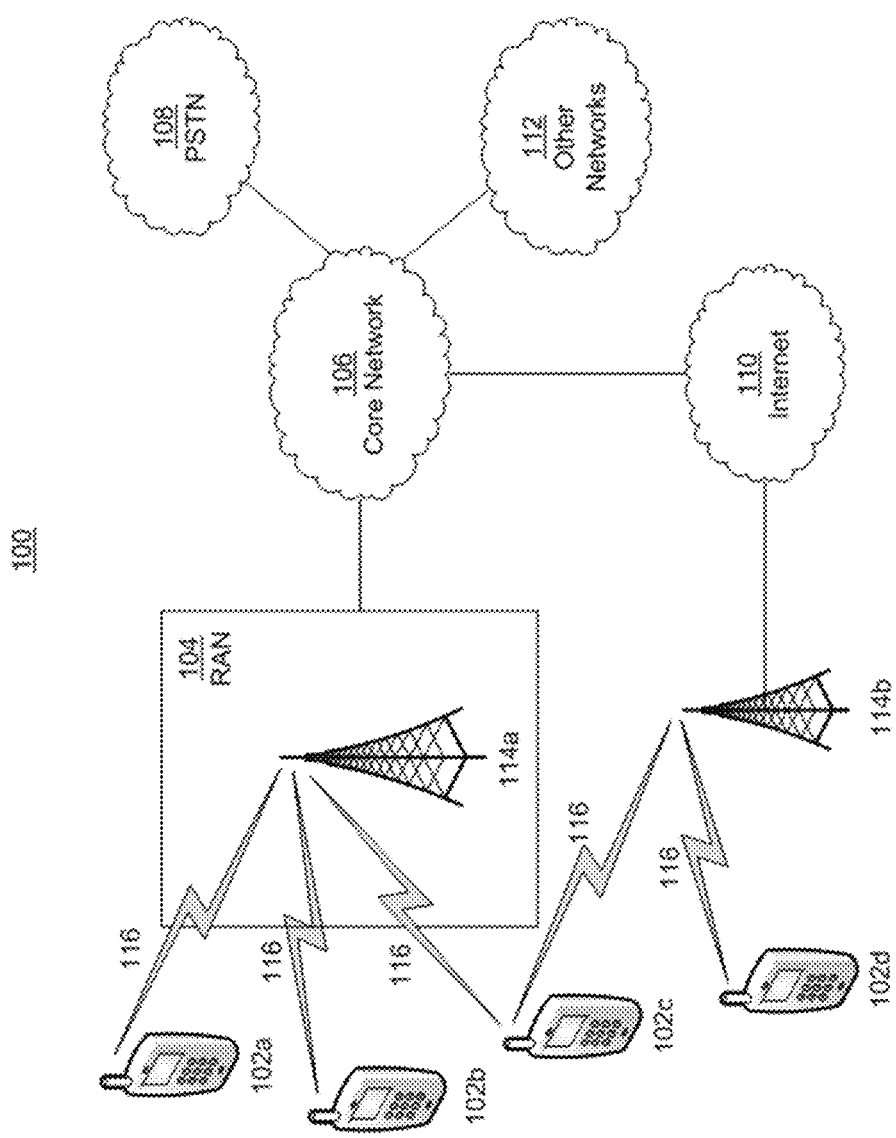
FIG. 1A is a system diagram of an example communications system in which one or more disclosed embodiments may be implemented.

Referring to FIG. 1A, the communication system 100 may be a multiple access system that provides content, such as voice, data, video, messaging, and/or broadcast, among others, to multiple wireless users. The communication system 100 may enable multiple wireless users to access such content through the sharing of system resources, including wireless bandwidth. For example, the communication system 100 may employ one or more channel access methods, such as code division multiple access (CDMA), time division multiple access (TDMA), frequency division multiple access (FDMA), orthogonal FDMA (OFDMA), and/or single-carrier FDMA (SC-FDMA), among others.

As shown in FIG. 1A, the communication system 100 may include WTRUs 102a, 102b, 102c, 102d, a radio access network (RAN) 104, a core network 106, a public switched telephone network (PSTN) 108, the Internet 110, and other networks 112, although it is contemplated that the disclosed embodiments may use any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, and/or consumer electronics, among others.

The communication systems 100 may also include a base station 114a and a base station 114b. Each of the base stations 114a and 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a and 114b may be a base transceiver station (BTS), a Node-B, an evolved Node-B (eNB), a Home Node-B (HNB), a Home eNB (HeNB), a site controller, an access point (AP), and/or a wireless router, among others. Although the base stations 114a, 114b are each depicted as a single element, it is contemplated that the base stations 114a and 114b may include any number of interconnected base stations and/or network elements.

The base station 114a may be part of the RAN 104, which may include other base stations and/or network elements (not shown), such as one or more base station controllers (BSCs), one or more radio network controllers (RNC), and/or one or more relay nodes, among others. The base station 114a and/or the base station 114b may be configured to transmit and/or receive wireless signals within a particular geographic region, (e.g., which may be referred to as a cell (not shown)). The cell may further be divided into cell sectors. For example, the cell associated with the base station 114a may be divided into three sectors. In certain representative embodiments, the base station 114a and/or 114b may include three transceivers, (e.g., one transceiver for each sector of the cell). In certain representative embodiments, the base station 114a may employ multiple-input multiple-output (MIMO) technology and may utilize multiple transceivers for each sector of the cell.

The base stations 114a and 114b may communicate with one or more of the WTRUs 102a, 102b, 102c, 102d over an air interface 116, which may be any suitable wireless communication link, (e.g., radio frequency (RF), microwave, infrared (IR), ultraviolet (UV), and/or visible light, among others). The air interface 116 may be established using any suitable radio access technology (RAT).

The communication system 100 may be a multiple access system and may employ one or more channel access schemes, such as CDMA, TDMA, FDMA, OFDMA, and/or SC-FDMA, among others. For example, the base station 114a in the RAN 104 and the WTRUs 102a, 102b, 102c may implement a radio technology such as universal mobile telecommunications system (UMTS) terrestrial radio access (UTRA), which may establish the air interface 116 using wideband CDMA (WCDMA). WCDMA may include communication protocols such as high-speed packet access (HSPA) and/or evolved HSPA (HSPA+). HSPA may include high-speed DL packet access (HSDPA) and/or high-speed UL packet access (HSUPA), among others.

In certain representative embodiments, the base station 114a and the WTRUs 102a, 102b, 102c may implement a radio technology such as evolved UTRA (E-UTRA), which may establish the air interface 116 using long term evolution (LTE) and/or LTE-Advanced (LTE-A).

In certain representative embodiments, the base station 114a and the WTRUs 102a, 102b, 102c may implement radio technologies such as IEEE 802.16 (e.g., worldwide interoperability for microwave access (WiMAX)), CDMA2000, CDMA2000 1x, CDMA2000 evolution-data optimized (EV-DO), Interim Standard 2000 (IS-2000), Interim Standard 95 (IS-95), Interim Standard 856 (IS-856), global system for mobile communications (GSM), enhanced data rates for GSM evolution (EDGE), and/or GSM/EDGE RAN (GERAN), among others.

The base station 114b may be a wireless router, HNB, HeNB, and/or AP, for example, and may utilize any suitable RAT for facilitating wireless connectivity in a localized area, such as a place of business, a home, a vehicle, and/or a campus, among others. In certain representative embodiments, the base station 114b and the WTRUs 102c, 102d may implement a radio technology such as IEEE 802.11 to establish a wireless local area network (WLAN). In certain representative embodiments, the base station 114b and the WTRUs 102c, 102d may implement a radio technology such as IEEE 802.15 to establish a wireless personal area network (WPAN). In certain representative embodiments, the base station 114b and the WTRUs 102c, 102d may utilize a cellular-based RAT (e.g., WCDMA, CDMA2000, GSM, LTE, and/or LTE-A, among others), to establish a picocell or femtocell. As shown in FIG. 1A, the base station 114b may have a direct connection to the Internet 110. Thus, the base station 114b may or may not access the Internet 110 via the core network 106.

The RAN 104 may be in communication with the core network 106, which may be any type of network configured to provide voice, data, applications, and/or voice, over Internet protocol (VoIP) services, among others, to one or more of the WTRUs 102a, 102b, 102c, 102d. For example, the core network 106 may provide call control, billing services, mobile location-based services, pre-paid calling, Internet connectivity, and/or video distribution, among others, and/or may perform high-level security functions, such as user authentication. Although not shown in FIG. 1A, it is contemplated that the RAN 104 and/or the core network 106 may be in direct or indirect communication with other RANs that may employ the same RAT or a different RAT as those of the RAN 104. For example, in addition to being connected to the RAN 104, which may be utilizing an E-UTRA radio technology, the core network 106 may be in communication with another RAN (not shown) employing a GSM radio technology.

The core network 106 may serve as a gateway for the WTRUs 102a, 102b, 102c, 102d to access the PSTN 108, the Internet 110, and/or other networks 112, among others. The PSTN 108 may include circuit-switched telephone networks that may provide plain old telephone service (POTS). The Internet 110 may include a global system of interconnected computer networks and devices that use common communication protocols, such as the transmission control protocol (TCP), user datagram protocol (UDP) and/or the Internet protocol (IP) in the TCP/IP suite, among others. The other networks 112 may include wired or wireless communications networks owned and/or operated by one or more service providers. For example, the other networks 112 may include another core network connected to one or more RANs, which may employ the same RAT or a different RAT as those of the RAN 104.

Some or all of the WTRUs 102a, 102b, 102c, 102d in the communication system 100 may include multi-mode capabilities, e.g., the WTRUs 102a, 102b, 102c, and 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology. Some or all of the WTRUs 102a, 102b, 102c, 102d in the communication system 100 may communicate with other devices using Bluetooth technology.

Figure 1B:
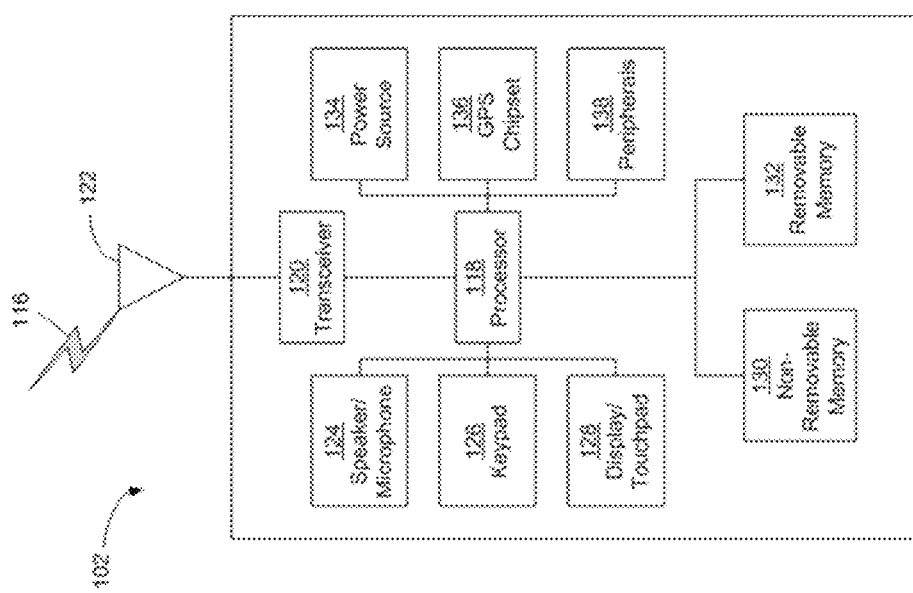
FIG. 1B is a system diagram of an example wireless transmit/receive unit (WTRU) that may be used within the communications system illustrated in FIG. 1A.

FIG. 1B is a diagram illustrating a representative wireless transmit/receive unit (WTRU) that may be used within the communication system of FIG. 1A.

Referring to FIG. 1B, the WTRU 102 may include a processor 118, a transceiver 120, a transmit/receive element, (e.g., an antenna), 122, a speaker/microphone 124, a keypad 126, a display/touchpad 128, a non-removable memory 130, a removable memory 132, a power source 134, a global positioning system (GPS) chipset 136, and/or peripherals 138, among others. It is contemplated that the WTRU 102 may include any sub-combination of the foregoing elements while remaining consistent with various disclosed embodiments.

The processor 118 may be a general purpose processor, a special purpose processor, a conventional processor, a digital signal processor (DSP), a microprocessor, one or more microprocessors in association with a DSP core, a controller, a microcontroller, an application specific integrated circuit (ASIC), a field programmable gate array (FPGA) circuit, an integrated circuit (IC), and/or a state machine, among others. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. Although FIG. 1B depicts the processor 118 and the transceiver 120, as separate components, the processor 118 and the transceiver 120 may be integrated together in an electronic package or chip.

The transmit/receive element 122 may be configured to transmit signals to, or receive signals from, a base station (e.g., the base station 114a) over an air interface 116. For example, in certain representative embodiments, the transmit/receive element 122 may be an antenna configured to transmit and/or receive RF signals. In certain representative embodiments, the transmit/receive element 122 may be an emitter/detector configured to transmit and/or receive IR, UV, or visible light signals, for example. In certain representative embodiments, the transmit/receive element 122 may be configured to transmit and receive both RF and light signals. The transmit/receive element 122 may be configured to transmit and/or receive any combination of wireless signals.

Although the transmit/receive element 122 is depicted, as a single element, the WTRU 102 may include any number of transmit/receive elements 122. The WTRU 102 may employ, for example, MIMO technology. In certain representative embodiments, the WTRU 102 may include two or more transmit/receive elements 122, (e.g., multiple antennas) for transmitting and/or receiving wireless signals over the air interface 116.

The transceiver 120 may be configured to modulate the signals that are to be transmitted by the transmit/receive element 122 and/or to demodulate the signals that are received by the transmit/receive element 122. The WTRU 102 may have multi-mode capabilities such that the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit and/or organic light-emitting diode (OLED) display unit), among others. The processor 118 may also output user data to the speaker/microphone 124, the keypad 126, and/or the display/touchpad 128, among others. The processor 118 may access information from, and may store data in, any type of suitable memory, such as the non-removable memory 130 and/or the removable memory 132. The non-removable memory 130 may include random-access memory (RAM), read-only memory (ROM), a hard disk, and/or any other type of memory storage device, among others. The removable memory 132 may include a subscriber identity module (SIM) card, a memory stick, and/or a secure digital (SD) memory card, among others. In certain representative embodiments, the memory may be non-transitory memory.

In certain representative embodiments, the processor 118 may access information from, and store data in, memory that is not physically located on the WTRU 102, such as on a server or a home computer (not shown).

The processor 118 may receive power from the power source 134, and may be configured to distribute and/or to control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), and/or lithium-ion (Li-ion), among others), solar cells, and/or fuel cells, among others.

The processor 118 may be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, and/or 114b) and/or may determine its location based on the timing of the signals being received from two or more nearby base stations. The WTRU 102 may acquire location information by way of any suitable location-determination method while remaining consistent with various disclosed embodiments.

The processor 118 may be coupled to other peripherals 138, which may include one or more software and/or hardware modules that may provide additional features, functionality, and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, and/or an Internet browser, among others.

Figure 1C:
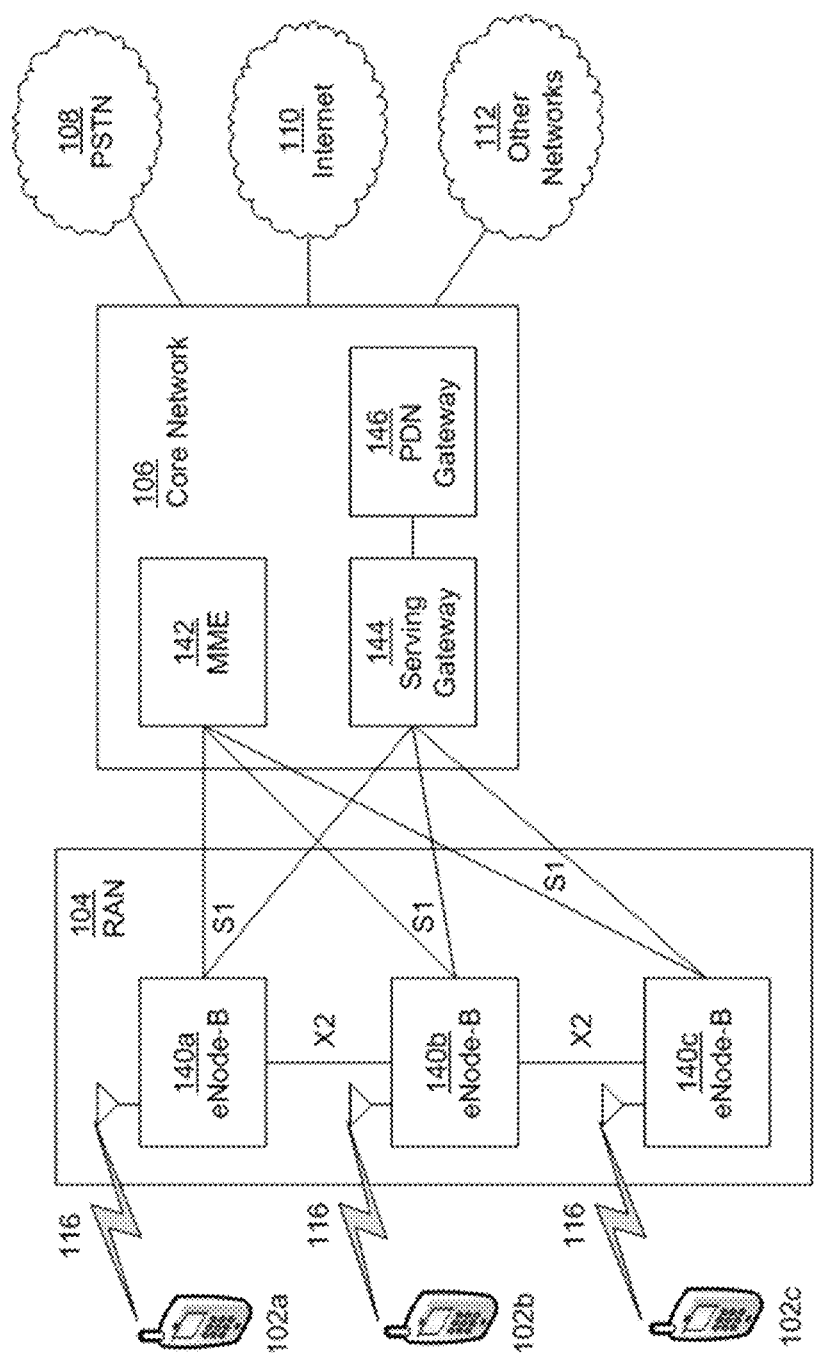
FIG. 1C is a system diagram of an example radio access network and an example core network that may be used within the communications system illustrated in FIG. 1A.

FIG. 1C is a diagram illustrating a representative radio access network and a representative core network that may be used within the communication system of FIG. 1A. The RAN 104 may employ an E-UTRA radio technology to communicate with the WTRUs 102a, 102b, and 102c over the air interface 116, although any number of WTRUs may be possible. The RAN 104 may also be in communication with the core network 106. The RAN 104 may include eNBs 140a, 140b, 140c, although the RAN 104 may include any number of eNBs while remaining consistent with various embodiments. The eNBs 140a, 140b, 140c may each include one or more transceivers for communicating with the WTRUs 102a, 102b, 102c over the air interface 116. In certain representative embodiments, the eNBs 140a, 140b, 140c may implement MIMO technology. The eNB 140a, for example, may use multiple antennas to transmit wireless signals to, and/or receive wireless signals from, the WTRU 102a.

Each of the eNBs 140a, 140b, and 140c may be associated with a particular cell (not shown) and may be configured to handle radio resource management decisions, handover decisions, and/or scheduling of users in the UL and/or DL, among others. As shown in FIG. 1C, the eNBs 140a, 140b, 140c may communicate with one another over an X2 interface.

The core network 106 shown in FIG. 1C may include a mobility management entity (MME) 142, a serving gateway 144, and/or a packet data network (PDN) gateway 146, among others. Although each of the foregoing elements are depicted as part of the core network 106, it is contemplated that any of these elements may be owned and/or operated by an entity other than the core network operator.

The MME 142 may be connected to each of the eNBs 140a, 140b, and 140c in the RAN 104 via an S1 interface and may serve as a control node. For example, the MME 142 may be responsible for authenticating users of the WTRUs 102a, 102b, 102c, bearer activation/deactivation, and/or selecting a particular serving gateway during an initial attach of the WTRUs 102a, 102b, 102c, among others. The MME 142 may also provide a control plane function for switching between the RAN 104 and other RANs (not shown) that employ other radio technologies, such as GSM or WCDMA.

The serving gateway 144 may be connected to each of the eNBs 140a, 140b, and 140c in the RAN 104 via the S1 interface. The serving gateway 144 may generally route and forward user data packets to/from the WTRUs 102a, 102b, 102c. The serving gateway 144 may perform other functions, such as anchoring user planes during inter-eNB handovers, triggering paging when DL data is available for the WTRUs 102a, 102b, 102c, and/or managing and/or storing contexts of the WTRUs 102a, 102b, 102c, among others.

The serving gateway 144 may be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway, (e.g., an IP multimedia subsystem (IMS) server), that may serve as an interface between the core network 106 and the PSTN 108. The core network 106 may provide the WTRUs 102a, 102b, 102c with access to other networks 112, which may include other wired or wireless networks that are owned and/or operated by other service providers.

In wireless communications, for example in wireless communications according to Third Generation Partnership Project (3GPP) long term evolution (LTE) Release 8 (R8) and Release 9 (R9), a single carrier may be used in each of the uplink (UL) and/or the downlink (DL). In UL transmissions, a wireless transmit/receive unit (WTRU) may perform power control based on a number of factors which may include: (1) measured pathloss on the DL carrier; (2) transmit power control (TPC) commands (e.g., from the eNodeB (eNB)); (3) the number of resource blocks on which it may transmit; and/or (4) other static or semi-static parameters, among others.

The static or semi-static parameters may be provided by the eNB or other network resources. The parameters and/or the power control formula and/or the power control procedure may be established based on or found in, for example, LTE or Advanced Long Term Evolution (LTE-A) standards. The power control procedure may account for the possibility that the calculated transmit power of the WTRU may exceed its maximum allowed transmit power and may provide that the WTRU scale back the transmit power so as not to exceed the maximum allowed transmit power.

The maximum allowed transmit power (or the configured maximum output power), $P_{CMAX}$, may be a function of the power class of the WTRU, a power limit that may be signaled by the eNB 140 and power reductions the WTRU may be permitted to make which may be based on the signals to be transmitted by the WTRU to, for example, avoid exceeding out of band emissions requirements or allowed values or levels. For example, for LTE/LTE-A transmissions, the WTRU may reduce its maximum output power based on Maximum Power Reductions (MPR) and/or additional MPR (A-MPR) and/or an allowed tolerance $\Delta Tc$. MPR, A-MPR, and $\Delta Tc$ values may be found in the LTE/LTE-A standards. Which values the WTRU may use may be based on a combination of one or more of certain transmission characteristics and signaling from the eNB 140. The values may be considered by the WTRU to be maximum allowed values and as such the WTRU may use the MPR, A-MPR, $\Delta Tc$ values and/or other lesser values.

The WTRU 102 may provide power headroom (PH) reports to the eNB 140, for example, to assist the eNB 140 in making scheduling choices. The WTRU may, for example, provide PH reports periodically and/or based on triggering events or conditions, among others. The power headroom reports may be provided based on certain triggering events, for example pathloss changes (e.g., large pathloss changes). The power headroom may be the difference between the calculated transmit power of the WTRU and its configured maximum output power that may include an actual power reduction taken by the WTRU. The actual power reduction may be less than or equal to the combined MPR, A-MPR and $\Delta Tc$ values. It is contemplated to extend the power control and power headroom functions to support carrier aggregation, for example in Release 10 of the LTE-A standards.

A WTRU supporting carrier aggregation, for example according to LTE Release 10 (R10), may be configured with one or more serving cells (or component carriers (CCs)) and for each CC the WTRU may be configured for UL communication. It is contemplated that the CC and the serving cell may be used interchangeably and still be consistent with the embodiments contained herein.

A WTRU may perform power control (PC) for each UL channel on each component carrier (or CC), c. There may be a configured maximum output power, $P_{CMAX,c}$, for each UL carrier (or CC). There may be more than one $P_{CMAX,c}$ for an UL CC, for example for a primary CC. A WTRU may perform PC on a subframe basis and may determine (e.g., only determine) the power for channels for which it is to make or will make an UL transmission in the subframe.

The WTRU may report the power headroom (PH) for each carrier (or CC) and the PH may be the difference between $P_{CMAX,c}$ and the calculated power for the CC prior to scaling. The WTRU may report more than one PH value for a CC, for example for a primary CC. A WTRU may report PH for a CC, for example, regardless of whether it is to transmit or will transmit on any channels of that CC when the PH is reported. When a PH report (PHR) is for a CC for which there is no actual transmission, the report may be called a virtual PHR. A virtual PH, for example, a PH for a CC for which there is no actual UL grant in the subframe in which the PHR is to transmit or will be transmitted, may be determined using a reference grant.

The $P_{CMAX,c}$ may be reported together with some or all per-component carrier (CC) PHRs. The $P_{CMAX,c}$ may be the value used for the calculation for the reported per-CC PH. In certain representative embodiments, $P_{CMAX,c}$ may not be reported for one or more CCs for which virtual PH may be reported.

It is contemplated that additional power backoff to $P_{CMAX,c}$ may be implemented, for example, to ensure that Specific Absorption Rate (SAR) thresholds or requirements may be met and that transmission thresholds or requirements related to the WTRU 102 simultaneously operating on LTE and other air interfaces, such as 1×RTT and/or 1×EV-DO, among others, may also be met.

It is contemplated for the $P_{CMAX,c}$ to take into account power management related (or based) additional backoff applied by the WTRU 102. In certain representative embodiments, procedures may be set forth for the additional power backoff and the $P_{CMAX,c}$ may be defined based on the additional power backoff. It is contemplated to specify provisioning or requirements for the additional power backoff.

The triggers for PH reporting may be periodic, upon configuration or reconfiguration, upon pathloss change (e.g., significant pathloss change), and/or upon secondary cell activation, among others. Certain triggers, for example a pathloss change trigger, may occur (e.g., only occur) outside the prohibit window of a previous PHR, for example when a prohibit timer for PHR is expired.

It is contemplated to implement additional power backoff (e.g., due to SAR, 1× (for example 1×RTT or 1×EV-DO) and/or other technologies, among others). Applying, and then sometime later removing, the additional backoff may result in the value of $P_{CMAX,c}$ changing from time-to-time. It is contemplated to include a new PHR trigger that is based on a change in $P_{CMAX,c}$ to inform the eNB 140 when the additional backoff changes.

In certain representative embodiments, representative methods and representative procedures may be implemented for handling backoff due to SAR, multi-RAT transmission including 1× (for example 1×RTT or 1×EV-DO) transmission, and/or other reasons not addressed (or impacted) by MPR, A-MPR, and ΔTc. The backoff may sometimes be referred to herein as non-MPR backoff, power management based backoff, power management backoff, power backoff due to power management, power management power reduction (P-MPR or PMPR), P-MPR backoff, additional power backoff, or additional backoff.

For the case of inter-band carrier aggregation, one or more of the MPR, A-MPR, ΔTc, and/or additional power backoff may be different for each band (e.g., per frequency band), which may result in reducing or limiting transmit power per band (e.g., the limits or reductions may be different for each frequency band). It is contemplated to have representative methods and representative apparatus for handling maximum power limits per frequency band when a WTRU 102 may be operating in more than one frequency band.

Uplink Control Information (UCI), which may include acknowledgement (ACK)/negative acknowledgement (NACK), channel state information (CSI), and/or scheduling request (SR), among others, may be transmitted by the WTRU 102 to the eNB 140. In a given subframe, when simultaneous physical uplink control channel (PUCCH) and physical uplink shared channel (PUSCH) is not configured (which may mean or indicate that the WTRU may not transmit simultaneously on PUCCH and PUSCH), a UCI (e.g., any UCI) may be transmitted on the PUSCH if there is a PUSCH to be transmitted in the subframe. In certain representative embodiments, for example when there is no PUSCH to be transmitted in the subframe, the UCI may be transmitted on the PUCCH. In certain representative embodiments, when simultaneous PUCCH and PUSCH is configured (which may mean or indicate that the WTRU may transmit simultaneously on PUCCH and PUSCH), certain UCI (e.g., ACK/NACK) may be transmitted on PUCCH regardless of there being a PUSCH to be transmitted in the subframe. The UCI may not be carried on more than one PUSCH in a given subframe. The WTRU 102 may scale the power of PUSCHs (e.g., all PUSCHs) without UCI equally.

The UCI may be transmitted simultaneously on the PUCCH and the PUSCH.

Representative methods and representative procedures may be implemented for preventing the WTRU 102 from exceeding maximum transmit power when the UCI is transmitted simultaneously on the PUCCH and the PUSCH, for one-band and/or for multiple-band operations.

Certain representative methods and certain representative apparatus may enable, for example: (1) inclusion of additional backoff in the $P_{CMAX,c}$ and/or $P_{CMAX}$ limits; (2) inclusion of additional backoff in the determination of $P_{CMAX,c}$; (3) triggering a PHR based on changed additional backoff; (4) eliminating PHR triggers, which may be unnecessary or not useful triggers, which may be caused by virtual PHR; (5) determining when to apply the additional backoff to $P_{CMAX,c}$ for use in power control and PHR; (6) handling rapidly changing additional backoff; (7) handling virtual PHR when there is additional backoff; (8) addressing maximum power per WTRU and maximum power per CC, (9) preventing the WTRU 102 from exceeding a maximum transmit power, with the UCI simultaneously on the PUCCH and the PUSCH for one-band operation; (10) handling maximum power when a WTRU 102 may be operating in more than one band, for example in inter-band carrier aggregation; and/or (11) preventing the WTRU 102 from exceeding a maximum transmit power with the UCI simultaneously on the PUCCH and the PUSCH for multiple band operation, among others.

One of skill in the art understands that the above examples may be applied either individually or in any combination.

It is contemplated that any of the power backoff values described herein as CC specific, such as MPR, A-MPR, $\Delta T_C$, power management backoff and the like may be the same for all CCs or for all CCs in a group, such as in a given band. For the given value or values that are the same, the subscript representing the CC (c is used for example herein) may be dropped or may be replaced by another, such as one representing a group or band-specific value.

It is contemplated that the calculations (e.g., all of the calculations) described herein may be performed in a specific subframe, e.g., subframe i. Each value in the calculation equation may be the value that applies to that specific subframe i or may be a value that applies to all subframes or to a specific set of subframes. Notation may be modified accordingly and still be in accordance with the representative embodiments described herein.

It is contemplated that the term $P_{CMAX,c}$ may be used to represent the configured maximum output power for serving cell (or CC) c. The LTE specifications have defined two versions of this value for the purpose of power headroom calculations where the version and associated calculations of power headroom used depend on which channels are present (i.e., are to be transmitted) on the CC. The two versions are referred to as $P_{CMAX,c}$ and $\tilde{P}_{CMAX,c}$ in the specifications. In certain representative embodiments relating to power headroom that may include, for example, calculations, triggering, and the like, $P_{CMAX,c}$ may be used to represent the configured maximum output power for a CC c in one or more of these currently defined versions or any other versions that may be defined in the future. Further, Pcmax,c, $P_{CMAX,c}$, PCMAX,c, $P_{CMAX,c}$, and other combinations of upper and lowercase, use or non-use of subscript notation for c, and fonts, may be used to represent the same quantities.

It is contemplated that the term $P_{CMAX}$ may be used to represent the configured maximum output power of the WTRU. $P_{CMAX}$, $P_{CMAX}$, and other combinations of upper and lowercase and fonts may be used to represent the same quantities.

In certain representative embodiments, additional backoff may be included in $P_{CMAX}$ limits as described below and/or $P_{CMAX,c}$ limits described later.

In a representative LTE example, the WTRU 102 may be allowed to set its configured maximum output power $P_{CMAX}$. The configured maximum output power $P_{CMAX}$ may be set within the following bounds:

$$P_{CMAX\_L} \leq P_{CMAX} \leq P_{CMAX\_H};  \quad \text{Equation (1)}$$

where $$P_{CMAX\_L} = \text{MIN}\{P_{EMAX} - \Delta T_C, P_{PowerClass} - \text{MPR} - A - \text{MPR} - \Delta T_C\}$$

$$P_{CMAX\_H} = \text{MIN}\{P_{EMAX}, P_{PowerClass}\}$$

$P_{EMAX}$ may be a power limit value signalled to the WTRU for example by the eNB 140 via higher layer signalling such as RRC signalling. $P_{EMAX}$ may be the value given by the information element (IE) P-Max.

$P_{PowerClass}$ may be the maximum WTRU power without taking into account a specified tolerance MPR and A-MPR may be specified allowed maximum power reduction values $\Delta T_C$ may be a tolerance value that the WTRU may use, for example when the UL transmission bandwidth may be confined near the edge of the UL transmission band. For example, $\Delta T_C$ may be a value such as 1.5 dB when the UL transmission bandwidth is confined within 4 MHz of the transmission band edges which may be represented by $F_{UL\_low}$ and $F_{UL\_low}$ 4 MHz or $F_{UL\_high}$ −4 MHz and $F_{UL\_high}$. $\Delta T_C$ may be 0 dB otherwise.

Representative modifications for including non-MPR effects (e.g., associated with power management based backoff or additional backoff) may include the following representative examples. Representative example 1 for handling non-MPR power backoff may be that the additional backoff is an additional term. For example, the allowed lower limit may be:

$$P_{CMAX\_L} = \text{MIN}\{P_{EMAX} - \Delta T_C, P_{PowerClass} - \text{MPR} - A - \text{MPR} - \Delta T_C - \text{nonMPR}\}. \quad \text{Equation (2)}$$

Representative example 2 for handling non-MPR power backoff may be that the additional backoff is in parallel with the MPR reduction (which may include MPR and A-MPR). For example, the allowed lower limit may be:

$$P_{CMAX\_L} = \text{MIN}\{P_{EMAX} - \Delta T_C, P_{PowerClass} - \text{MAX}\{\text{MPR} + A\text{-MPR}, \text{nonMPR}\} - \Delta T_C\}; \quad \text{Equation (3)}$$

where "nonMPR" may be the backoff needed or used to satisfy RF exposure limits or requirements for Specific Absorption Rate (SAR), limit interference with other technologies (e.g., 1× EV-DO) and/or, for example, handle other effects not related to MPR, A-MPR, and $\Delta$Tc.

If there are multiple "non-MPR" effects existing simultaneously, those effects may be additive (with MPR effects and/or each other) and/or in parallel (with MPR effects and/or each other). An example of additive N effects may be: nonMPR=nonMPR-1+nonMPR-2+ . . . +nonMPR-N and, for example, such nonMPR or its equivalent (e.g., using individual nonMPR-i values) may be used in one or more of the equations herein.

An example of parallel N effects may be: nonMPR=MAX (nonMPR-1, nonMPR-2, . . . nonMPR-N) and, for example, such nonMPR, or its equivalent (e.g., using the individual nonMPR-i values) may be used in one or more of the equations herein.

It may be possible that one or more effects may be additive and one or more effects may be in parallel. In that case, the equations may be combined. For example:

$$P_{CMAX\_L} = \text{MIN}\{P_{EMAX} - \Delta T_C, P_{PowerClass} - \text{MAX}\{\text{MPR} + A\text{-MPR} + \text{nonMPRadditive}, \text{nonMPRparallel}\} - \Delta T_C\}. \quad \text{Equation (4)}$$

Equation 4 may also be considered a generic equation in that nonMPRadditive may be an individual effect, the sum of multiple effects, the largest of multiple effects, or another combination of multiple effects. NonMPRadditive may also be 0, not present, or the equivalent. NonMPRparallel may be an individual effect, the sum of multiple effects, the largest of multiple effects, or another combination of multiple effects. NonMPRparallel may also be 0, not present, or the equivalent.

In certain representative embodiments, the additional backoff may be included in the determination of $P_{CMAX,c}$, as described herein.

For the case of transmitting signals (e.g., LTE signals), the WTRU 102 may be allowed to set its maximum output power $P_{CMAX}$ and/or per-CC maximum output power $P_{CMAX,c}$ (for example when supporting carrier aggregation), within specified limits. As a function of the signals being transmitted and of the configuration, the WTRU 102 may be permitted to reduce its maximum output power per CC to, for example, avoid exceeding out-of-band emission limits. The WTRU 102, based on its implementation, may use the allowed power reduction (e.g., full allowed power reduction), or a lesser value. In each subframe, i, for a given CC, the WTRU 102 may determine its power reduction (e.g., required power reduction) based on a configuration (e.g., LTE configuration) and grants, for example $MPR_{actual,c}(i)$, and may determine the maximum allowed output power in the subframe. A representative example of how an implementation may determine the maximum output power per CC is provided in Equation 5 set forth below.

$$P_{CMAX,c}(i) = MIN\{P_{EMAX,c}, P_{PowerClass} - MPR_{actual,c}(i) - \Delta T_{C,c}\}; \quad \text{Equation (5)}$$

where $P_{EMAX,c}$ may be a maximum power limit signalled by higher layers (for the CC), for example signalled to the WTRU by the eNB 140.

$P_{PowerClass}$ may be the maximum WTRU output power for the class of the WTRU.

$MPR_{actual,c}$ may be the actual power reduction the WTRU took due to MPR and/or A-MPR effects (for the CC).

$\Delta T_{C,c}$ may be a fixed power offset that is a function of the transmission bandwidth (BW) (for the CC).

How the additional power backoff for SAR, other radio technologies, and/or other non-MPR effects may be included in the WTRU's determination of $P_{CMAX,c}$, is described in the following representative examples.

In certain representative embodiments, the non-MPR backoff may be an additional term. For example:

$$P_{CMAX,c}(i) = MIN\{P_{EMAX,c}, P_{PowerClass} - MPR_{actual,c}(i) - Pbackoff,c(i) - \Delta T_{C,c}\}; \quad \text{Equation (6)}$$

where $Pbackoff,c(i)$ may be the additional backoff for CC c in subframe i.

If there are multiple backoffs due to multiple effects, they may be additive. For example, $Pbackoff,c(i)$ may be the composite (e.g., algebraic composite and/or sum) of the individual backoffs (or the additional backoffs). The additional backoffs may additionally or alternatively be included individually in the equation to achieve the additive effect.

In certain representative embodiments, the non-MPR backoff may not be in addition to the MPR reduction (e.g., which may include MPR and/or A-MPR reductions) but may be in parallel with the MPR reduction so that in effect the larger (or largest) of the 2 or more reductions may be used. For example:

$$P_{CMAX,c}(i) = MIN\{P_{EMAX,c}, P_{PowerClass} - MAX(MPR_{actual,c}(i), Pbackoff,c(i)) - \Delta T_{C,c}\}; \quad \text{Equation (7)}$$

where $Pbackoff,c(i)$ may be the additional backoff for CC c in subframe i.

If there are multiple backoffs due to multiple effects, they may be in parallel (e.g., all in parallel). For example, $Pbackoff,c(i)$ may be the maximum of the individual backoffs (or the additional backoffs). The additional backoffs may additionally or alternatively be included individually in Equation 7 such that the result may be the maximum of the backoffs (e.g., all of the backoffs), including the MPR backoff (e.g., which may include MPR and/or A-MPR backoffs).

It is observed that if the example related to Equation 7 is used, if the additional backoff is less than the MPR backoff, the $P_{CMAX,c}$ may not be affected by changes in additional backoff.

In certain representative embodiments, one or more of the non-MPR backoffs may be additive (with the MPR backoff and/or with each other) and one or more non-MPR backoffs may be in parallel (with the MPR backoff and/or each other). In this case, the various representative examples may be combined. For example:

$$P_{CMAX,c}(i) = MIN\{P_{EMAX,c}, P_{PowerClass} - MAX(MPR_{actual,c}(i) - PbackoffAdditive,c(i), PbackoffParallel,c(i)) - \Delta T_{C,c}\} \quad \text{Equation (8)}$$

Equation 8 may be considered a generic equation in that $PbackoffAdditive,c(i)$ may be an individual effect, the sum of multiple effects, the largest of multiple effects, or another combination of multiple effects. $PbackoffAdditive,c(i)$ may also be 0, not present, or the equivalent. $PbackoffParallel,c(i)$ may be an individual effect, the sum of multiple effects, the largest of multiple effects, or another combination of multiple effects. $PbackoffParallel,c(i)$ may also be 0, not present, or the equivalent.

In certain representative embodiments, triggering PHR due to changed additional backoff may be implemented.

In some cases, such as when the additional backoff is additive with the MPR backoff, as in the first representative example above, providing the $P_{CMAX,c}$ to the eNB 140 (e.g., in a PHR when the additional backoff changes sufficiently) may provide useful information.

In other cases, such as when the additional backoff is in parallel with the MPR backoff, as in the second representative example above, and the MPR backoff dominates, providing the $P_{CMAX,c}$ to the eNB 140 when the additional backoff changes may not be useful. If the additional backoff dominates, it may be useful for the eNB 140 to understand (e.g., be told) when there is a sufficiently large change.

Regardless of how the additional non-MPR backoff is included, it may be useful to the eNB scheduler to know when there is a large change in how the additional backoff affects the $P_{CMAX,c}$. The following example embodiments may be used to inform the eNB 140 when there is a significant change in how the additional backoff affects the $P_{CMAX,c}$.

Representative example 1 may include a PHR trigger when the impact of the additional backoff on a $P_{CMAX,c}$ changes by more than a threshold, for example, by computing $P_{CMAX,c}$ with the additional non-MPR backoff and without the additional backoff, and then trigger PHR when the delta between the two changes by more than a threshold. This example may be shown as follows:

Time 0 (last PHR report):
Compute:

$$P_{CMAX,c} \text{ with non-MPR backoff} - P_{CMAX,c} \text{ without non-MPR backoff} = K0 \quad \text{Equation (9)}$$

Time i (some subframe i since last PHR):
Compute:

$$P_{CMAX,c} \text{ with non-MPR backoff} - P_{CMAX,c} \text{ without non-MPR backoff} = Ki \quad \text{Equation (10)}$$

If $|Ki-K0| > threshold$, trigger PHR.

For non-MPR backoff greater than or equal to zero, $K0, Ki \leq 0$

In this example, the thresholds for positive and negative delta between the two values may be the same.

In another example, the $P_{CMAX,c}$ may be computed with the additional backoff and without the additional backoff and the PHR may be triggered when the positive delta or the negative delta between the two changes by more than a threshold where the positive and negative thresholds are different. This example may be shown as follows:

Perform the computations as above in Equations 9 and 10. Then:

If $Ki-K0 > threshold\_positive$, trigger PHR.
If $Ki-K0 < threshold\_negative$, trigger PHR.

It may be possible that there is only one threshold, and a corresponding trigger of PHR, for a positive delta or a negative delta (e.g., only a threshold_positive or a threshold_negative, and not both).

The trigger may be on a CC basis such that a PHR may be triggered if any threshold is exceeded for any CC. The trigger may be on a WTRU basis. For example, the $P_{CMAX}$ with and without the non-MPR backoff may be used to determine whether to trigger PHR instead of using the CC specific $P_{CMAX,c}$ criteria. For example, if the CCs (e.g., all CCs) have the same MPR backoff and non-MPR backoff, use of the $P_{CMAX}$ may result in the same effect.

In the following example, upon sending the PHR, the WTRU may compute and/or may store the following:

$$\text{PMPRimpact},c(0) = P_{CMAX,c} - P_{CMAX,c}\_\text{noPMPR}; \quad \text{Equation (11)}$$

where $P_{CMAX,c}$ noPMPR=$P_{CMAX,c}$ computed with PMPR=0.

For each transmission timing interval (TTI) (or for only the TTIs that are associated with or have an UL grant), the WTRU may compute the following:

$$\text{PMPRimpact},c(1) = P_{CMAX,c} - P_{CMAX,c}\_\text{noPMPR}. \quad \text{Equation (12)}$$

If |PMPRimpact,c(1)−PMPRimpact,c(0)|>threshold, trigger PHR. The PHR may be triggered if the threshold is crossed for any CC. In certain representative embodiments, the impact may be computed for the WTRU 102 as a whole. In that case, the CC subscript of c may be removed and the trigger may be based on the WTRU 102 specific determination of the threshold being crossed (e.g., using $P_{CMAX}$ instead of $P_{CMAX,c}$).

In another example, the case in which the MPR backoff and the non-MPR backoff are in parallel may be shown as set forth in Equation 13:

$$P_{CMAX,c}(i) = \text{MIN}\{P_{EMAX,c}, P_{PowerClass} - \text{MAX}(\text{MPR}_{actual,c}(i), P\text{backoff},c(i)) - \Delta T_{C,c}\}. \quad \text{Equation (13)}$$

In this example, in any given subframe i, either the effect of the MPR backoff, which may include MPR and/or A-MPR, or the non-MPR backoff may dominate. M may represent the MPR backoff, for example, Mj may be used at time j. P may represent the non-MPR backoff, and for example, Pj may be used at time j. M and P may be CC specific or applicable to the WTRU 102 as a whole. Time=0 may represent when the last PHR was sent. Time=1 may represent some time, for example, some number of subframes, since the last PHR was sent. There may be at least 4 possible relationships among the values of M and P.

Figure 2A:
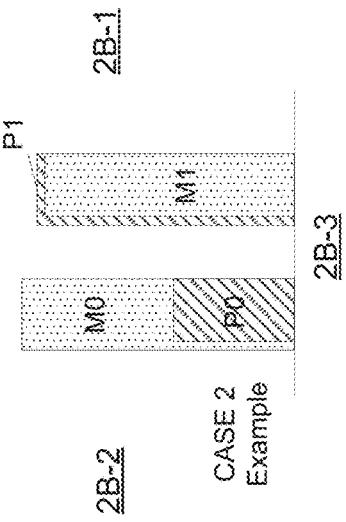
FIGS. 2A-2D are diagrams illustrating representative PHR triggering procedures as examples of how and when triggering may occur.
Figure 2B:
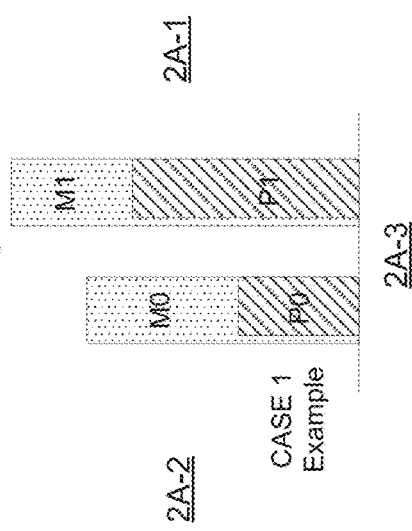
Figure 2C:
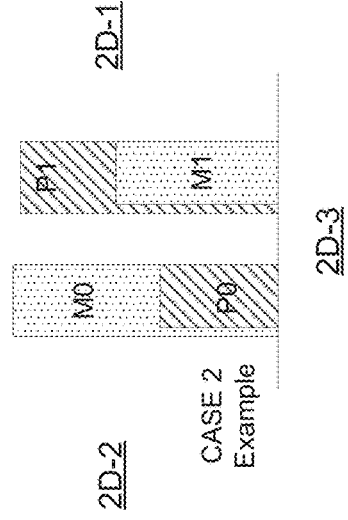
Figure 2D:
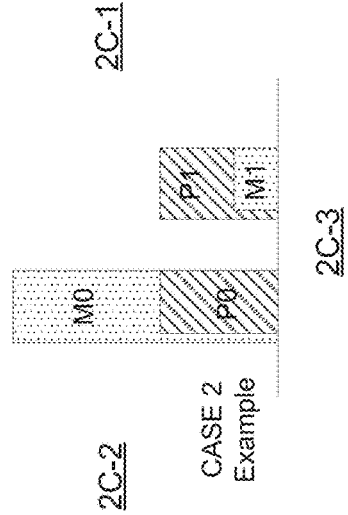

FIG. 2A-2D are diagrams illustrating representative trigging conditions for the WTRU 102 to trigger PHR. FIG. 2A relates to Case 1, as set forth below. FIGS. 2B-2D relate to Case 2, as set forth below. FIGS. 2A-2D show example relationships between MPR backoff (M) and non-MPR backoff (P) and their resulting impacts on PHR Triggering when M initially dominates.

Figure 4B:
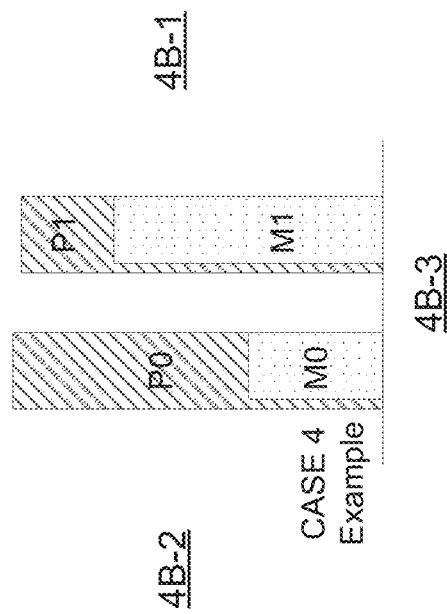
FIG. 4A-4B are diagrams illustrating further representative PHR triggering procedures as further examples of how and when triggering may occur.
Figure 4A:
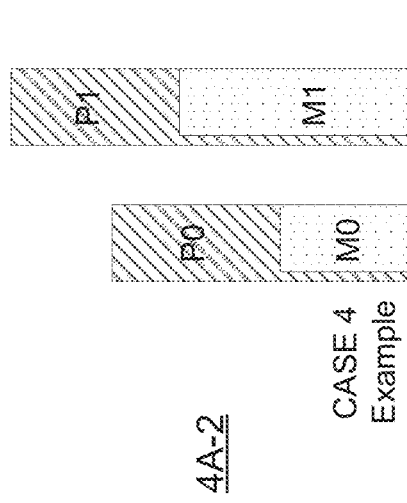

FIGS. 3A-3C are diagrams illustrating other representative triggering conditions for the WTRU 102 to trigger PHR. FIGS. 3A-3C relate to Case 3, as set forth below. FIGS. 4A and 4B are diagrams illustrating further representative triggering conditions for the WTRU 102 to trigger PHR. FIGS. 4A and 4B relate to Case 4, as set forth below. FIGS. 3A-3C and 4A-4B show example relationships between MPR backoff (M) and non-MPR backoff (P) and their resulting impacts on PHR triggering when P initially dominates.

For each case, it is indicated if and when the WTRU 102 may trigger a PHR in this example.

Case 1: M0>P0, M1>P1; in this case, M dominates both at time 0 and at time 1 and a trigger is not useful or not needed; the WTRU may not trigger a PHR in this case.

Case 2: M0>P0, M1<P1; in this case, M dominates at time 0 and P dominates at time 1; the WTRU may trigger a PHR if P1−M1>a threshold.

Case 3: M0<P0, M1>P1; in this case, P dominates at time 0 and M dominates at time 1; the WTRU may trigger a PHR if P0−M0>a threshold.

Case 4: M0<P0, M1<P1; in this case, P dominates both at time 0 and time 1; the WTRU may trigger PHR if |(P1−M1)−(P0−M0)|>a threshold.

The thresholds for each case may be the same or different. FIGS. 2 and 3 provide examples of how and when triggering may occur in these cases. The previous example in this section would achieve the same effect in the case of parallel MPR backoff and non-MPR backoff, but using a different formula.

In FIGS. 2A-2D and 3A-3C and 4A-4B, the triggering procedures may be compared to other procedures for triggering PHR, for example a trigger based on delta $P_{CMAX,c}$ and a trigger based on delta P. The representative procedures based on cases 1-4 may avoid unnecessary or not useful triggers and provide necessary or useful triggers relative to the other procedures based on delta $P_{CMAX,c}$ and/or delta P.

Referring now to FIG. 2A, for representative triggering condition 200A at a first time T0, M0 may dominate P0 and at a second time T1, M1 may increase relative to M0 and P1 may increase relative to P0. At time T1, M1 may dominate P1. The change in $P_{CMAX,c}$ and P may be large, but the non-MPR (e.g., SAR related) backoff may have no effect on $P_{CMAX,c}$. The change in $P_{CMAX,c}$ based on the change in MPR backoff may be expected or near what is expected by the eNB 140. A PHR trigger may not be useful and/or needed due to the change in non-MPR backoff.

Referring to FIG. 2B, for representative triggering condition 200B at the first time T0, M0 may dominate P0 and at the second time T1, M1 may decrease relative to M0 and P1 may increase relative to P0. At time T1, P1 may dominate M1. The change in $P_{CMAX},c$ may be small and the change in P may be large. The non-MPR (e.g., SAR related) backoff may have only a small effect on $P_{CMAX},c$. The change in $P_{CMAX,c}$ based on the change in MPR backoff may be expected or near what is expected by the eNB 140. A PHR trigger may not be useful and/or needed due to the change in non-MPR backoff.

Referring to FIG. 2C, for representative triggering condition 200C at the first time T0, M0 may dominate P0 and at the second time T1, M1 may decrease relative to M0 and P1 may remain about the same level relative to P0. At time T1, P1 may dominate M1. The change in $P_{CMAX,c}$ may be large and the change in P may be small. The non-MPR (e.g., SAR related) backoff may have an effect on $P_{CMAX,c}$. Because non-MPR backoff has an effect on $P_{CMAX,c}$, the value of or change in $P_{CMAX,c}$ may not be expected or near what is expected by the eNB 140. A PHR trigger may be useful and/or needed even though the non-MPR backoff remained about the same.

Referring to FIG. 2D, for representative triggering condition 200D, at the first time T0, M0 may dominate P0 and at the second time T1, M1 may decrease relative to M0 and P1 may increase relative to P0. At time T1, P1 may dominate M1. The change in $P_{CMAX,c}$ may be small and the change in P may be large. The non-MPR (e.g., SAR related) backoff may now have a large effect on the $P_{CMAX,c}$. Because non-MPR backoff now has an effect on $P_{CMAX},c$, the value of or change in $P_{CMAX,c}$ may not be expected or near what is expected by the eNB 140. A PHR trigger may be useful and/or needed due to the change in non-MPR backoff even though the change in $P_{CMAX,c}$ may be small.

Referring now to FIG. 3A, for representative triggering condition 300A at a first time T0, P0 may dominate M0 and at a second time T1, M1 may increase relative to M0 and P1 may decrease relative to P0. At time T1, M1 may dominate P1. The change in $P_{CMAX,c}$ and P may be small, but the non-MPR (e.g., SAR related) backoff may have had a large effect on $P_{CMAX,c}$ but now has no effect on $P_{CMAX,c}$. Because non-MPR backoff had an effect on $P_{CMAX,c}$, but no longer has an effect on $P_{CMAX,c}$, the value of $P_{CMAX,c}$ may not be expected or near what is expected by the eNB 140. A PHR trigger may be useful and/or needed even though $P_{CMAX,c}$ and P did not change significantly.

Referring to FIG. 3B, for representative triggering condition 300B at the first time T0, P0 may dominate M0 and at the second time T1, M1 may remain about the same relative to M0 and P1 may decrease relative to P0. At time T1, M1 may dominate P1. The change in $P_{CMAX,c}$ and the change in P may be large. The non-MPR (e.g., SAR related) backoff may have had a large effect but may now have no effect on $P_{CMAX,c}$. The value of or change in $P_{CMAX,c}$ may not be expected or near what is expected by the eNB 140. A PHR trigger may be useful and/or needed due to the change in non-MPR backoff.

Referring to FIG. 3C, for representative triggering condition 300C at the first time T0, P0 may dominate M0 and at the second time T1, M1 may increase relative to M0 and P1 may decrease relative to P0. At time T1, M1 may dominate P1. The change in $P_{CMAX,c}$ may be small and the change in P may be large. The non-MPR (e.g., SAR related) backoff may have had an effect on $P_{CMAX,c}$ at time T0 but not at time T1. The value of $P_{CMAX,c}$ may not be expected or near what is expected by the eNB 140. A PHR trigger may be useful and/or needed due to the change in non-MPR backoff even though $P_{CMAX,c}$ has not changed significantly.

Referring to FIG. 4A, for representative triggering condition 400A at the first time T0, P0 may dominate M0 and at the second time T1, M1 may increase relative to M0 and P1 may increase relative to P0 where the P1 increase may be similar to the M1 increase. At time T1, P1 may dominate M1. The change in $P_{CMAX,c}$ may be large and the change in P may be large, but since the non-MPR backoff change is similar to the MPR backoff change, the corresponding change in $P_{CMAX,c}$ may be expected or near what is expected by the eNB 140. A PHR trigger may not be useful and/or needed due to the change in non-MPR backoff.

Referring to FIG. 4B, for representative triggering condition 400B at the first time T0, P0 may dominate M0 and at the second time T1, M1 may increase relative to M0 and P1 may increase relative to P0. At time T1, P1 may dominate M1. The change in $P_{CMAX,c}$ may be small and the change in P may be small. The non-MPR (e.g., SAR related) backoff may have a much smaller effect on $P_{CMAX,c}$ at T1 versus T0. The value of $P_{CMAX,c}$ may not be expected or near what is expected by the eNB 140. A PHR trigger may be useful and/or needed due to the reduced effect of non-MPR backoff on $P_{CMAX,c}$.

In certain representative embodiments, the logic associated with FIGS. 2A-2D, 3A-3C, and 4A-4B may include:

If M0>P0 and M1<P1, WTRU may trigger PHR if P1−M1>a threshold;

If M0<P0 and M1>P1, WTRU may trigger PHR if P0−M0>a threshold; and

If M0<P0 and M1<P1, WTRU may trigger PHR if |(P1−M1)−(P0−M0)|>a threshold.

M0 and P0 may represent the MPR backoff and the non-MPR backoff, respectively, when the last PHR was sent by the WTRU 102. M1 and P1 may represent MPR backoff and non-MPR backoff, respectively, sometime later to determine whether to trigger PHR. Another representative logic may trigger PHR when |[MAX(P1,M1)−M1]−[MAX(P0, M0)−M0]|>a threshold.

The above is summarized in Table 1 below where $1^{st}$ term is MAX(P1,M1)−M1 and $2^{nd}$ term is MAX(P0,M0)−M0.

TABLE 1

|  | $1^{st}$ term | $2^{nd}$ term | \|$1^{st}$ term − $2^{nd}$ term\| | Trigger |
| --- | --- | --- | --- | --- |
| Case 1: M0 > P0, M1 > P1 | 0 | 0 | 0 | No |
| Case 2: M0 > P0, M1 < P1 | P1 − M1 | 0 | P1 − M1 | if \|$1^{st}$ term − $2^{nd}$ term\| > threshold |
| Case 3: M0 < P0, M1 > P1 | 0 | P0 − M0 | \|−P0 + M0\| = P0 − M0 | if \|$1^{st}$ term − $2^{nd}$ term\| > threshold |
| Case 4: M0 < P0, M1 < P1 | P1 − M1 | P0 − M0 | (P1 − M1) − (P0 − M0) | if \|$1^{st}$ term − $2^{nd}$ term\| > threshold |

The trigger may be on a CC basis such that the PHR may be triggered if any threshold is exceeded for any CC. The trigger may be on a WTRU basis. There may be MPR and non-MPR backoff defined for the WTRU 102 as a whole. In certain representative embodiments, these values may be used to determine whether to trigger PHR in lieu of using the CC specific MPR backoff and non-MPR backoff.

In certain representative embodiments, upon sending a PHR, the WTRU may compute and/or may store P0=PMPRactual and M0=MPRactual (which may include MPR and A-MPR). Each TTI (or each TTI for which the WTRU an UL grant), the WTRU may compute P1=PMPRactual and M1=MPRactual. If |[MAX(P1,M1)−M1]−[MAX(P0,M0)−M0]>a threshold, the WTRU may trigger a PHR.

The PHR may be triggered if the threshold is crossed for any CC. In this case, subscripts of c may be added to all the variable names. In certain representative embodiments, the impact may be computed for the WTRU 102 as a whole such that CC subscripts may be removed and a trigger may be based on the WTRU specific determination of a threshold being crossed.

Eliminating Triggers (e.g., Unnecessary or not Useful Triggers) which May be Caused by Virtual PHR A PHR may be triggered and may be sent by the WTRU 102 to the eNB 140 for various reasons. The PHR may include one or more PH values and other parameters providing additional information.

For example, when a PHR is sent by the WTRU 102 in a particular TTI, the PHR may include a real PH for each active CC that has a UL grant (e.g., actual resources assigned) in that TTI and a virtual PH for any active CC that does not have a UL grant in that TTI. A real PH may be computed using the parameters associated with the grant and any power reductions taken by the WTRU 102 to enable it to meet (e.g., satisfy) transmission limits or requirements such as spurious emission mask (SEM) and/or SAR, among others. A virtual PH may use a reference grant and/or may use zero for one or more of the power reductions. The WTRU 102 may include the configured maximum output power for each CC, $P_{CMAX,c}$ in the report, and $P_{CMAX,c}$ for a CC reporting virtual PH may be omitted.

The PHR may be triggered when the additional power backoff due to power management (e.g., P-MPR) for at least one activated Serving Cell changes by more than a threshold. The trigger may be defined to occur when a prohibit PHR-Timer expires or has expired and the additional power backoff due to power management (as allowed by P-MPR) for at least one activated Serving Cell with configured uplink has changed more than dl-PathlossChange dB since the last transmission of a PHR when WTRU 102 has UL resources for new transmission.

It is contemplated that when the last PHR was sent, it may have included a virtual PH for one or more of the serving cells (also referred to as CCs). In this case, for the virtual PH included in the last PHR, the additional power backoff allowed by P-MPR may be set to zero. When comparing the current additional power backoff to the additional power backoff used when the last PH was sent, the comparison may be made with a value of zero for the virtual PH. As long as the additional power backoff exceeds (e.g., itself exceeds) the threshold for triggering, there may be a trigger. Due to the comparison with zero for the virtual PH, the trigger may be based on a perceived change in additional power backoff which is not a real change. This may result in excessive unnecessary or not useful triggers whenever the scheduler chooses not to schedule a particular CC. A similar scenario may occur when the last PHR included a real PH for a given CC, with an actual additional backoff value, and in the current TTI in which the additional power backoff comparison may be made to determine whether to trigger the PHR, the CC does not have an UL grant and the additional backoff for the CC may be set to zero. The value of the real additional power backoff (e.g., if it is greater than the threshold) may be the source of a PHR trigger instead of a real change in the additional power backoff, which may again potentially cause excessive unnecessary or not useful triggers.

It is contemplated that in a given TTI, sending the PHR when the power management backoff changes may provide the eNB 140 with a PHR that includes the updated power management backoff so it may include the power management backoff in scheduling decisions. Sending a PHR based on this trigger may therefore only be useful for a CC if the actual power management backoff has changed in magnitude greater than a threshold amount and/or if the PH and/or any applicable associated parameters reported, for example $P_{CMAX,c}$, account for the actual power management backoff.

It is contemplated that one of the parameters used in the PHR is a V bit which may indicate if the PH value is based on a real transmission or a reference format. For Type 1 PH, V=0 may indicate a real transmission on the PUSCH and V=1 may indicate that a PUSCH reference format is used. For Type 2 PH, V=0 may indicate real transmission on the PUCCH and V=1 may indicate that a PUCCH reference format is used. For both Type 1 and Type 2 PH, V=0 may indicate the presence of the associated $P_{CMAX,c}$ field, and V=1 may indicate that the associated $P_{CMAX,c}$ field is omitted.

Certain Representative PHR Triggering Procedures

To eliminate excessive and/or unnecessary (or not useful) triggers due to comparisons based on virtual headroom reports, among other reasons, the WTRU 102 may trigger PHR when the power backoff (e.g., used for power management) for a given CC when compared with the power backoff (e.g., used for power management) for the given CC the last time the WTRU 102 sent a real PHR for the given CC changes by more than a threshold.

The WTRU 102 may use the last time the WTRU 102 transmitted a $P_{CMAX,c}$ value in the PHR for a given CC to determine the last time it sent a real PHR for the given CC.

The WTRU 102 may use the last time the WTRU 102 included an indication in the PHR for a given CC indicating it is a non-virtual CC (e.g., the last time the WTRU 102 included in a PHR a Vbit for the given CC that was set to 0) to determine the last time it sent a real PHR for the given CC.

For a PCell, which has 2 types of headroom reports (e.g., Type 1 for the PUSCH headroom report and Type 2 for the PUSCH+PUCCH headroom report), the WTRU 102 may use either the Type 1 PH, the Type 2 PH or both the Type 1 and Type 2 PHs when determining whether the trigger criteria is satisfied for the PCell (primary serving cell or CC). For example, the WTRU 102 may determine that a real PHR has been sent for this CC if one or more of the Type 1 and/or Type 2 PHs were real when the PHR was sent. For example if Vbit was not equal to 1 (e.g., virtual) for both PH types the PHR may be considered to be real. As a second example, if at least one of the Type 1 and Type 2 $P_{CMAX,c}$ values was sent in the PHR for the PCell the PHR may be considered to be real. In certain representative embodiments, the WTRU 102 may use one of the Type 1 PH or the Type 2 PH to determine whether the trigger criteria is satisfied.

The WTRU 102 may ignore any deactivations of an SCell (secondary serving cell) when determining the last real PHR for the SCell. For example if since the last real PHR for a given CC, the CC was deactivated and reactivated one or more times, the WTRU 102 may still use the last real PHR for that CC. In certain representative embodiments, the WTRU 102 may consider (e.g., only consider) PHR transmissions since the last activation or reactivation of the CC. If there was no real PHR for the CC since the last activation or reactivation, the WTRU 102 may delay evaluation of the triggering criteria to determine whether to trigger the PHR until there is a real PHR for this CC after the activation or reactivation, or the WTRU 102 may handle it as a special case and may trigger based on other criteria such as the value of the power management backoff (or the impact of the power management backoff on $P_{CMAX,c}$) greater than a threshold.

When a SCell is configured or reconfigured, the WTRU 102 may consider (e.g., only consider) the PHR transmissions for the SCell since the configuration or reconfiguration. If there was no real PHR for this CC since the last configuration or reconfiguration, the WTRU 102 may delay evaluation of the triggering criteria to determine whether to trigger PHR until there is a real PHR for this CC after the configuration or reconfiguration, or the WTRU 102 may handle this as a special case and trigger based on other criteria such as the value of the power management backoff (or the impact of the power management backoff on $P_{CMAX,c}$) greater than a threshold.

In certain representative embodiments, as an alternative to or in lieu of triggering based on a change in the additional power backoff exceeding a threshold, the trigger may be based on a change in the impact of the additional power backoff on $P_{CMAX,c}$ exceeding a threshold.

In certain representative embodiments, triggering the PHR based on changes related to additional power backoff (e.g., actual change or change in impact) may be gated by the prohibit timer in a similar manner as other PHR triggers.

In certain representative embodiments, triggering the PHR based on changes related to the additional power backoff may be applicable to (e.g., only to) active CCs with configured UL.

In certain representative embodiments, triggering the PHR based on changes related to additional power backoff may be applicable in (e.g. only in) TTIs in which the WTRU 102 has UL resources for new transmission for any CC.

To eliminate excessive and unnecessary or not useful triggers due to comparisons based on virtual headroom reports, and/or to ensure meaningful reports are sent by the WTRU 102, among other reasons, comparisons (e.g., of power management backoff values or impacts of power management backoff values) and triggering of the PHR based on changes related to power management backoff may be applicable for a given CC in (e.g., only in) TTIs in which the WTRU 102 has UL resources (e.g., which may be PUSCH and/or PUCCH resources) for that CC. For example, the WTRU 102 may evaluate (or consider) the triggering condition for a given CC in (e.g., only in) TTIs in which the WTRU 102 has a valid UL grant (or UL resources assigned) for the given CC, and/or may evaluate (or consider) the triggering condition for a given CC in (e.g., only in) TTIs in which the WTRU 102 has valid UL resources for a new transmission for the CC (or any CC).

Representative Examples of how to Define the Triggering Criteria (e.g., Equivalent Definitions Using Different Wording May Also be Used)

A prohibitPHR-Timer expires or has expired or may expire or may have expired and the additional power backoff due to power management (e.g., P-MPR or as allowed by P-MPR) for at least one activated Serving Cell with UL resources has changed or may have changed by more than a threshold (for example dl-PathlossChange dB), since the last transmission of a PHR when there were UL resources for this serving cell, when the WTRU 102 has or may have UL resources for new transmission.

A prohibitPHR-Timer expires or has expired or may expire or may have expired and the additional power backoff due to power management (e.g., P-MPR or as allowed by P-MPR) for at least one activated Serving Cell with a valid UL grant has changed or may have changed by more than a threshold (for example dl-PathlossChange dB), since the last transmission of a PHR when there was a valid UL grant for this serving cell, when the WTRU 102 has or may have UL resources for new transmission.

A prohibitPHR-Timer expires or has expired or may expire or may have expired and the additional power backoff due to power management (e.g., P-MPR or as allowed by P-MPR) for at least one activated Serving Cell with a valid UL grant has changed or may have changed by more than a threshold (for example dl-PathlossChange dB), since the last transmission of a real PHR for this serving cell when the WTRU 102 has or may have UL resources for new transmission.

A prohibitPHR-Timer expires or has expired or may expire or may have expired and the additional power backoff due to power management (e.g., P-MPR or as allowed by P-MPR) for at least one activated Serving Cell with a valid UL grant has changed or may have by changed by more than a threshold (for example dl-PathlossChange dB), since the last transmission of a PHR with Vbit=0 for this serving cell, when the WTRU 102 has or may have UL resources for new transmission.

A prohibitPHR-Timer expires or has expired or may expire or may have expired and the additional power backoff due to power management (e.g., P-MPR or as allowed by P-MPR) for at least one activated Serving Cell with a valid UL grant has changed or may have changed by more than a threshold (for example dl-PathlossChange dB), since the last transmission of a PHR with any Vbit=0 for this serving cell, when the WTRU 102 has or may have UL resources for new transmission.

A prohibitPHR-Timer expires or has expired or may expire or may have expired and the additional power backoff due to power management (e.g., P-MPR or as allowed by P-MPR) for at least one activated Serving Cell with a valid UL grant has changed or may have changed by more than a threshold (for example dl-PathlossChange dB), since the last transmission of a Type 1 PHR with the Vbit=0 for this serving cell, when the WTRU 102 has or may have UL resources for new transmission.

A prohibitPHR-Timer expires or has expired or may expire or may have expired and the additional power backoff due to power management (e.g., P-MPR or as allowed by P-MPR) for at least one activated Serving Cell with a valid UL grant has changed or may have changed by more than a threshold (for example dl-PathlossChange dB), since the last transmission of a real Type 1 PHR for this serving cell, when WTRU 102 has or may have UL resources for new transmission.

It is contemplated that "Serving Cell with a valid UL grant (or UL resources)" may be the same as "Serving Cell with configured uplink and a valid grant (or UL resources)." For all of the examples above, "the additional power backoff due to power management (e.g., P-MPR or as allowed by P-MPR) for at least one activated Serving Cell" may be replaced by "the effect (or impact) of additional power backoff due to power management (e.g., P-MPR or as allowed by P-MPR) on $P_{CMAX,c}$ for at least one activated Serving Cell," or by "the effect of additional power backoff due to power management (e.g., P-MPR or as allowed by P-MPR) on the configured maximum output power for at least one activated Serving Cell," or by "the effect (or impact) on $P_{CMAX,c}$ of power backoff due to power management (e.g., P-MPR or as allowed by P-MPR) for at least one activated Serving Cell" or by their equivalent.

It is contemplated to ensure that there is a real PHR for comparison for each CC following one or more of: configuration, reconfiguration, activation, and/or reactivation.

For any condition or event for or after which it may be useful to trigger a first real PHR (e.g., after the occurrence of the condition or event), the WTRU 102 may trigger the PHR for an active CC that has a valid UL grant (or UL resources) if the power management backoff itself exceeds a threshold, or the impact of the power management backoff on the $P_{CMAX,c}$ exceeds a threshold.

Representative triggering procedures may include a requirement or policies that a PHR be triggered based on any of the criteria described herein, for example for eliminating triggers (e.g., unnecessary or not useful triggers) which may be caused by virtual PHR, for example based on one of (1) the power backoff due to power management (e.g., P-MPR or as allowed by P-MPR) for at least one activated Serving Cell with configured uplink and a valid grant (or UL resources) has changed more than a threshold; (2) the effect (or impact) on $P_{CMAX,c}$ of power backoff due to power management (e.g., P-MPR or as allowed by P-MPR) for at least one activated Serving Cell with configured uplink and a valid grant (or UL resources) has changed more than a threshold; (3) the effect (or impact) of power backoff due to power management (e.g., P-MPR or as allowed by P-MPR) on $P_{CMAX,c}$ for at least one activated Serving Cell with configured uplink and a valid grant (or UL resources) has changed more than a threshold; among others, where the reference point for comparison to determine whether the change is more than a threshold may be a previous (e.g., most recent) time, time period, or interval when a PHR was transmitted and one of (1) the at least one activated Serving Cell with configured uplink had a valid grant (or UL resources); (2) the PHR included a real PH for the at least one activated Serving Cell with configured uplink; among others.

The threshold may be the dl-PathlossChange which may be in dB.

A representative power headroom reporting procedure may be used to provide the serving eNB 140 with information about the difference between the nominal WTRU maximum transmit power and the estimated power for the UL-SCH transmission per activated Serving Cell and with information about the difference between the nominal WTRU maximum power and the estimated power for the UL-SCH and the PUCCH transmission on the PCell. The RRC may control Power Headroom reporting by configuring the two timers periodicPHR-Timer and prohibitPHR-Timer, and by signalling a dl-PathlossChange which may set the change in a measured downlink pathloss to trigger a PHR.

A Power Headroom Report (PHR) may be triggered if any of the following events occur:

prohibitPHR-Timer expires or has expired and the path loss has changed more than dl-PathlossChange dB for at least one activated Serving Cell which is or may be used as a pathloss reference since the last transmission of a PHR when the WTRU 102 has or may have UL resources for new transmission;

periodicPHR-Timer expires;

upon configuration or reconfiguration of the power headroom reporting functionality by upper layers, which is not used to disable the function;

activation of an SCell with configured uplink; and/or a triggering criteria related to change in additional power backoff or change in the effect of additional power backoff such as any described herein, for example: the prohibitPHR-Timer expires or has expired and the effect on $P_{CMAX,c}$ of power backoff due to power management (as allowed by P-MPR) for at least one activated Serving Cell with configured uplink and a valid grant has or may have changed more than dl-PathlossChange dB since the last transmission of a PHR when the WTRU 102 has or may have UL resources for new transmission.

If the WTRU 102 has UL resources allocated for the new transmission for this TTI:

if it is the first UL resource allocated for a new transmission since the last MAC reset, start periodicPHR-Timer;

if the Power Headroom reporting procedure determines that at least one PHR has been triggered since the last transmission of a PHR or this is the first time that a PHR is triggered, and;

if the allocated UL resources can or may accommodate a PHR MAC control element plus its subheader as a result of logical channel prioritization:

if extendedPHR is configured:

for each activated Serving Cell with configured uplink:

obtain the value of the Type 1 power headroom and in certain cases the corresponding $P_{CMAX,c}$ associated with this Serving Cell from the physical layer;

if simultaneous PUCCH-PUSCH is configured:

obtain the value of the Type 2 power headroom for the PCell and in certain cases the corresponding $P_{CMAX,c}$ from the physical layer;

instruct the Multiplexing and Assembly procedure to generate and transmit an Extended PHR MAC control element based on the values reported by the physical layer;

else:

obtain the value of the Type 1 power headroom from the physical layer;

instruct the Multiplexing and Assembly procedure to generate and transmit a PHR MAC control element based on the value reported by the physical layer;

start or restart periodicPHR-Timer;

start or restart prohibitPHR-Timer;

cancel all triggered PHR(s).

In certain representative embodiments, procedures may be implemented that establish when to apply additional backoff to the $P_{CMAX,c}$ for use in the power control and the PHR.

Due to SAR or other, for example non-LTE, effects, the $P_{CMAX,c}$ may be reduced, or backed off, for transmit power determination and/or power headroom calculations.

When the amount of additional backoff needs or is to be changed, the WTRU 102 may begin to use or apply the changed backoff to change the value of $P_{CMAX,c}$ used to determine channel power, for example, the $P_{PUSCH,c}(i)$, in one of the following options (e.g., ways): (1) applied immediately upon changed condition, regardless of time of the eventual PHR; (2) waiting until the changed $P_{CMAX,c}$ has been reported by the WTRU 102 in a PHR before applying; (3) waiting no longer than a threshold amount of time before applying; and/or (4) applying immediately, or within a given amount of time, if the next periodic PHR may occur beyond a given amount of time. It is contemplated that some or all of the options may be combined such as items 2 and 3, for example. For example, the WTRU 102 may wait until the threshold amount of time passes or until it reports $P_{CMAX,c}$ in a PHR, whichever may come first, before applying.

Which of the four options (e.g., ways) to use may be dependent on whether the amount of additional backoff to use increases or decreases. In certain representative embodiments, it may be related to the effect of the additional backoff on $P_{CMAX,c}$ as opposed to the absolute change in the additional backoff.

For example, if the situation occurs that the amount of additional backoff or the impact of additional backoff on $P_{CMAX,c}$ increases (which may potentially result in a decrease in transmit power), waiting to apply the backoff change may result in undesirable radio frequency (RF) effects towards a mammal, for example, a human. In this case, it may be best to apply the change to the backoff immediately, regardless of when PHR may be sent. It may be useful to send the PHR (e.g., with the changed $P_{CMAX,c}$) as soon as possible after applying the change. Until the PHR is sent, the eNB 140 may assign UL grants that the WTRU 102 may not support.

If the situation occurs that the amount of additional backoff or the impact of additional backoff on the $P_{CMAX,c}$ decreases (which may potentially result in the ability to increase transmit power), waiting to apply the backoff change may delay the ability of the WTRU 102 to handle larger grants, which the eNB 140 may send once it becomes aware of the decreased backoff via PHR. In this case, the delay in sending a PHR may be more acceptable.

One or more of the following representative procedures may apply.

(1) If the additional backoff (or the additional backoff effect) decreases, the WTRU 102 may apply the changed backoff immediately or within a given timeframe or, alternatively, the WTRU 102 may wait until a PHR is sent to apply the backoff. In certain representative embodiments, if a PHR is not sent for some predetermined time, the WTRU 102 may apply a changed backoff and may not wait any longer for a PHR. In other representative embodiments, the WTRU 102 may apply a backoff within a given amount of time if a next periodic PHR may occur beyond a given amount of time.

(2) If the additional backoff (or the additional backoff effect) increases, the WTRU 102 may apply the changed backoff immediately or within a given timeframe. In certain representative embodiments, the WTRU 102 may wait until a PHR is sent to apply the backoff. In other representative embodiments, if a PHR is not sent for some predetermined time, the WTRU 102 may apply a changed backoff and may not wait any longer for a PHR. In yet other representative embodiments, the WTRU 102 may apply a backoff within a given amount of time if the next periodic PHR may occur beyond a given amount of time.

It is contemplated that even if a PHR is triggered due to additional backoff (e.g., a changing requirement for additional backoff), transmission of the PHR may be delayed (e.g., because there may not be space (e.g., capacity) for the MAC CE). There may be a non-zero time period between when the requirement for changed additional backoff occurs and the sending of the PHR.

In certain representative embodiments, representative procedures for handling rapidly changing additional backoff may be implemented.

Previous sections describe, for example, triggering of a PHR based on changes to additional backoff or changes to impacts of additional backoff. Representative procedures may handle rapid changes to additional backoff. Such representative procedures may also be applied in the case of non-rapidly changing additional backoff.

As an example, a 1×EV-DO transmission may be very bursty (e.g., down to 2.5 ms ON and up to 17.5 ms OFF in a 20 msec frame), although it may also be continuously ON. There may be problems associated with reporting a PHR at the start and end of each such high-rate burst. If PHRs triggered by changes in additional backoff or changes in impacts of additional backoff were subject to a prohibit timer (e.g., a timer used to prohibit a PHR from being triggered for a time period after the last PHR was sent), the PHR triggers at the start and end of such high-rate bursts may become lost, for example, as the toggling rate may be faster than the prohibit timer period. If the PHRs triggered by these changes are not subject to a prohibit timer, there may be excessive signaling overhead of the PHR.

Representative procedures for handling rapidly changing additional backoff are described in the following. Representative procedure 1 may keep the backoff stable at a level consistent with the ON state as long as the ON state is possible. For example, if 1× or another air interface operation is enabled or if a 1× or other call is connected or in progress, the backoff for the ON state may be used regardless of whether there are bursts or not.

Representative procedure 2 for 1× may be that the WTRU 102 may detect or accept an indication that it is either in or not in a mode of sending fast 1× bursts (which may be referred to as burst mode), and that while in the mode of sending fast 1× bursts, $P_{CMAX,c}$ in PHR may be signaled as if the 1× transmissions were continuously ON. This representative procedure may be used to: (1) trigger a PHR including a reduced $P_{CMAX,c}$ (e.g., due to increased backoff), when fast bursts begin (e.g., first begin); (2) include in a (e.g., any) PHR triggered for another reason (e.g., periodic or significantly changed pathloss), while in the mode of sending fast 1× bursts, the $P_{CMAX,c}$ as if increased backoff is used, regardless of the actual backoff (e.g., backoff needed) at the time of the PHR; and/or (3) trigger a PHR including increased $P_{CMAX,c}$, (due to no longer using the increased backoff), when bursts (e.g., all such bursts) have ended.

An example algorithm to determine the 1× burst mode and trigger a PHR at the start and end of burst mode may include:
  in every subframe, observe if 1× is either transmitting or not transmitting
  if 1× is transmitting
    burst mode=ON
    if 1× was not transmitting in the previous subframe
      note the time (denoted as "burst-ON start time")
      If burst mode in previous subframe was OFF,
        trigger PHR, to report reduced $P_{CMAX,c}$
  if 1× is not transmitting
    if burst mode in previous subframe was ON
      if time since burst-ON start time is more than 20 ms ago
        burst mode=OFF
        Trigger PHR, to report increased $P_{CMAX,c}$ Representative procedure 3, for example, may handle a rapidly changing additional backoff requirement, such as due to SAR. The WTRU 102 may determine when any additional backoff is needed (or to be used), such as when proximity is detected, and may keep the level of additional backoff consistent (e.g., at the worst case or at another amount) until additional backoff is not needed (or not used) for some length of time.

Representative procedure 4, for example, may include reporting in the PHR, $P_{CMAX,c}$ including the worst case additional backoff or additional backoff impact that occurred in the period since the last PHR. For example:
  Time 0 (last PHR report): Backoff=b0;
  Time 1 (next subframe): Backoff=b1;
  Time 2 (next subframe): Backoff=b2;
  Time p (subframe in which next PHR may be sent): Backoff=bp; and
  $P_{CMAX,c}$ may be reported by the WTRU using backoff=Max (b0, b1, b2, . . . , bp).

Although 1×EV-DO and SAR are shown as examples, it is contemplated that the representative procedures may be used for any bursty or non-bursty application and/or any rapidly or non-rapidly changing backoff situation.

In certain representative embodiments, representative procedures for handling virtual PHR when there is additional backoff may be implemented.

There may be various representative procedures for handling the reporting of $P_{CMAX,c}$ for a virtual PHR. The representative procedures may include: (1) always reporting $P_{CMAX,c}$ for both non-virtual PHR and virtual PHR; or (2) reporting $P_{CMAX,c}$ for non-virtual PHR but not for virtual PHR since for virtual PHR, MPR, A-MPR, and $\Delta T_C$ may be zero such that the eNB 140 may determine $P_{CMAX,c}$ for virtual PHRs without it being reported. These representative procedures may be based on the allowed power reductions of MPR, A-MPR, and $\Delta T_C$.

Representative procedures may be implemented for handling virtual PHR and $P_{CMAX,c}$ when implementing additional backoff. For a virtual PHR, the WTRU 102 may include the effect of additional backoff (e.g., associated with SAR and/or 1× effects) in the determination of $P_{CMAX,c}$. In certain representative embodiments, if the WTRU 102 includes the effect of additional backoff in $P_{CMAX,c}$, the WTRU 102 may report $P_{CMAX,c}$ for virtual PHRs when (e.g., only when) $P_{CMAX,c}$ is affected by the additional backoff. In other representative embodiments, for virtual PHR, the WTRU 102 may exclude the effect of additional backoff (e.g., associated with SAR and/or 1x) from the determination of $P_{CMAX,c}$ and $P_{CMAX,c}$ may not be reported in virtual PHR.

It is contemplated that if the WTRU 102 reports (e.g., always reports) $P_{CMAX,c}$ in the PHR, the $P_{CMAX,c}$ may be reported for virtual PHR regardless of the type of backoff that is or is not included in the $P_{CMAX,c}$.

Representative procedures may be implemented for addressing maximum power per WTRU and maximum power per CC.

A maximum power range may be defined for the WTRU 102 at a CC level and at a WTRU level. By extension of the equations already defined herein, an example per CC configured maximum output power, $P_{CMAX,c}$, may be defined as set forth in Equation 14 and the WTRU 102 may be allowed to set its configured maximum output power per CC within the bounds set forth in that equation.

$$P_{CMAX\_L,c} \leq P_{CMAX,c} \leq P_{CMAX\_H,c} \qquad \text{Equation (14)}$$

where:

$P_{CMAX\_L,c}=\text{MIN}\{P_{EMAX,c}-\Delta T_C, P_{PowerClass}-\text{MAX}(\text{MPR}+A\text{-MPR, P-MPR})-\Delta T_C\}$ $P_{CMAX\_H,c}=\text{MIN}\{P_{EMAX,c}, P_{PowerClass}\}$ $P_{EMAX,c}$ may be a maximum power limit signaled by higher layers (for the CC), for example, signalled to the WTRU by the eNB 140 in the P-Max IE.

An MPR, an A-MPR, a $\Delta T_C$, and a P-MPR may each be defined as having one common value for the WTRU 102 and for all CCs. For example, an MPR may be the same for all CCs and for the WTRU 102 as an entirety. Use of the same value for each CC and for the WTRU may be possible due to the powers of the CCs being summed. For example, a reduction of 3 dB for the WTRU 102 may be accomplished by applying a 3 dB reduction to each individual CC.

In certain representative embodiments, CC specific values may be defined for one or more of the values for one or more of the CCs. For any CC specific value, the CC specific value may be used in the equation and may be represented by adding a subscript c to the value, for example, $\text{MPR}_c$, $A\text{-MPR}_c$, $\text{P-MPR}_c$, and $\Delta T_{Cc}$.

Instead of, or in addition to, the per CC configured maximum output power, $P_{CMAX,c}$, an overall WTRU configured maximum output power, $P_{CMAX}$, may be defined, for example as previously described herein, and the WTRU 102 may be allowed to set its configured maximum output power within the following bounds:

$$P_{CMAX\_L} \leq P_{CMAX} \leq P_{CMAX\_H} \qquad \text{Equation (15)}$$

where, using as an example the lower limit $P_{CMAX\_L}$ from Equation 3 and referring to the nonMPR power reduction value as P-MPR, $P_{CMAX\_L}$ is as set forth in Equation 16:

$P_{CMAX\_L}=\text{MIN}\{P_{EMAX}-\Delta T_C, P_{PowerClass}-\text{MAX}(\text{MPR}+A\text{-MPR,P-MPR})-\Delta T_C\} \qquad \text{Equation (16)}$ and where, the upper limit $P_{CMAX\_H}$ may be defined as:

$P_{CMAX\_H}=\text{MIN}\{P_{EMAX}, P_{PowerClass}\} \qquad \text{Equation (17)}$ where $P_{EMAX}$ may be a power limit signaled by the eNB via higher layers, for example the RRC, or it may be a value computed, for example by the WTRU, from the individual signaled power limits for each CC, $P_{EMAX,c}$.

As an example, $P_{EMAX}=10 \log_{10} \Sigma p_{EMAX,c}$, where $P_{EMAX,c}$ may be the RRC signalled power limit in the P-Max IE for each CC. $P_{EMAX,c}$ may be a value expressed in dB and $p_{EMAX,c}$ may be the value of $P_{EMAX,c}$ expressed in linear notation.

It is contemplated that the $P_{CMAX}$ value may be used as a limit for a decision to scale channel powers and/or as a limit not to be exceeded in the power control procedure.

In certain representative embodiments the $P_{CMAX}$ and/or the $P_{CMAX,c}$ may be determined for subframe i and may be denoted as $P_{CMAX}(i)$ and $P_{CMAX,c}(i)$, respectively.

In another example, the lower limit $P_{CMAX\_L}$ may be defined, determined and/or computed from per-CC values.

The lower limit of the $P_{CMAX}$ may be defined, determined and/or computed from per-CC values as follows:

$P_{CMAX\_L,c}=\text{MIN}\{P_{EMAX,c}-\Delta T_{C,c}, P_{PowerClass}-\text{MAX}(\text{MPR}_c+A\text{-MPR}_c,\text{P-MPR}_c)-\Delta T_{C,c}\} \qquad \text{Equation (18)}$ where the subscript of c indicates a CC specific value. The CC values may be the same or different. For example, for intra-band CCs, for one or more of the MPR, the A-MPR, the P-MPR, and/or the $\Delta T_C$, WTRU-specific values or band specific values may be provided and those values may be used for the individual CC values.

Using linear notation, where lowercase (for example for at least the first character of a value) may indicate linear values, Equation 18 may be expressed as set forth in Equation 19:

$10 \log_{10} p_{CMAX\_L,c} = \text{MIN}\{10 \log_{10}(p_{EMAX,c}/(\Delta t_{C,c})), 10 \log_{10} p_{PowerClass}/(\text{mpr}_c \cdot a\text{-mpr}_c \cdot \Delta t_{C,c}), 10 \log_{10} p_{PowerClass}/(\text{pmpr}_c \cdot \Delta t_{C,c})\}, \qquad \text{Equation (19)}$ hence: $p_{CMAX\_L,c}=\text{MIN}\{p_{EMAX,c}/(\Delta t_{C,c}), p_{PowerClass}/(\text{mpr}_c \cdot a\text{-mpr}_c \cdot \Delta t_{C,c}), p_{PowerClass}/(\text{pmpr}_c \cdot \Delta t_{C,c})\}. \qquad \text{Equation (20)}$ The lowest value that the sum of the powers of multiple CCs is:

$\Sigma p_{CMAX\_L,c}=\Sigma \text{MIN}\{p_{EMAX,c}/(\Delta t_{C,c}), p_{PowerClass}/(\text{mpr}_c \cdot a\text{-mpr}_c \cdot \Delta t_{C,c}), p_{PowerClass}/(\text{pmpr}_c \cdot \Delta t_{C,c})\} \qquad \text{Equation (21)}$ Thus:

$P_{CMAX\_L}=10 \log_{10} \Sigma p_{CMAX\_L,c}=10 \log_{10} \Sigma \text{MIN}\{p_{EMAX,c}/(\Delta t_{C,c}), p_{PowerClass}/(\text{mpr}_c \cdot a\text{-mpr}_c \cdot \Delta t_{C,c}), p_{PowerClass}/(\text{pmpr}_c \cdot \Delta t_{C,c})\} \qquad \text{Equation (22)}$ The lower limit for $P_{CMAX}$ as set forth in Equation 22 may be applied to (or for) intra-band band CCs and/or inter-band CCs. It is contemplated that for low power reductions (for example MPR and others), this may result in a $P_{CMAX\_L}$ value that is larger than the PowerClass (for example a value close to the number of CCs×$p_{PowerClass}$). It may therefore be useful to ensure the value does not exceed $P_{PowerClass}$. The lower limit for $P_{CMAX}$ as set forth in Equation 22 may be modified as set forth in Equation 23:

$P_{CMAX\_L}=\text{MIN}\{10 \log_{10} \Sigma \text{MIN}[p_{EMAX,c}/(\Delta t_{C,c}), p_{PowerClass}/(\text{mpr}_c \cdot a\text{-mpr}_c \cdot \Delta t_{C,c}), p_{PowerClass}/(\text{pmpr}_c \cdot \Delta t_{C,c})], P_{PowerClass}\} \qquad \text{Equation (23)}$ In certain representative embodiments, it may be expressed as:

$P_{CMAX\_L}=P_{PowerClass}+10 \log_{10} \Sigma \text{MIN}[p_{EMAX,c}/(p_{PowerClass} \cdot \Delta t_{C,c}), 1/(\text{mpr}_c \cdot a\text{-mpr}_c \cdot \Delta t_{C,c}), 1/(\text{pmpr}_c \cdot \Delta t_{C,c})] \qquad \text{Equation (24)}$ Or, with a $P_{PowerClass}$ limit as set forth in Equation 25:

$P_{CMAX\_L}=\text{MIN}\{P_{PowerClass}+10 \log_{10} \Sigma \text{MIN}[p_{EMAX,c}/(p_{PowerClass} \cdot \Delta t_{C,c}), 1/(\text{mpr}_c \cdot a\text{-mpr}_c \cdot \Delta t_{C,c}), 1/(\text{pmpr}_c \cdot \Delta t_{C,c})], P_{PowerClass}\} \qquad \text{Equation (25)}$ There may be additional power reduction allowed, for example, for the inter-band case. This reduction may be referred to as $\text{IBR}_c$ (e.g., $\text{ibr}_c$ in linear notation) for a given CC. These values may be the same or different for different CCs. In that case, the $P_{CMAX\_L}$ may be defined by one of the following equations:

$$P_{CMAX\_L}=10\ \log_{10}\Sigma MIN\{p_{EMAX,c}/(\Delta t_{C,c}),p_{PowerClass}/(mpr_c\cdot a\text{-}mpr_c\cdot \Delta t_{C,c}\cdot ibr_c),p_{PowerClass}/(pmpr_c\cdot \Delta t_{C,c}\cdot ibr_c)\};\quad \text{Equation (26)}$$

$$P_{CMAX\_L}=10\ \log_{10}\Sigma MIN\{p_{EMAX,c}/(\Delta t_{C,c}\cdot ibr_c),p_{PowerClass}/(mpr_c\cdot a\text{-}mpr_c\cdot \Delta t_{C,c}\cdot ibr_c),p_{PowerClass}/(pmpr_c\cdot \Delta t_{C,c}\cdot ibr_c)\};\quad \text{Equation (27)}$$

$$P_{CMAX\_L}=MIN\{10\ \log_{10}\Sigma MIN\{p_{EMAX,c}/(\Delta t_{C,c}),p_{PowerClass}/(mpr_c\cdot a\text{-}mpr_c\cdot \Delta t_{C,c}\cdot ibr_c),p_{PowerClass}/(pmpr_c\cdot \Delta t_{C,c}\cdot ibr_c)\},P_{PowerClass}\};\quad \text{Equation (28)}$$

$$P_{CMAX\_L}=MIN\{10\ \log_{10}\Sigma MIN\{p_{EMAX,c}/(\Delta t_{C,c}\cdot ibr_c),p_{PowerClass}/(mpr_c\cdot a\text{-}mpr_c\cdot \Delta t_{C,c}\cdot ibr_c),p_{PowerClass}/(pmpr_c\cdot \Delta t_{C,c}\cdot ibr_c)\},P_{PowerClass}\};\ \text{and Equation (29)}$$

$$P_{CMAX\_L}=MIN\{10\ \log_{10}\Sigma MIN\{p_{EMAX,c}/(\Delta t_{C,c}\cdot ibr_c),p_{PowerClass}/(mpr_c\cdot a\text{-}mpr_c\cdot \Delta t_{C,c}\cdot ibr_c),p_{PowerClass}/(pmpr_c\cdot\cdot \Delta t_{C,c}\cdot ibr_c)\},P_{PowerClass}\text{-}IBR\}.\quad \text{Equation (30)}$$

The $P_{CMAX\_L}$ may also be defined as one of the following to allow an overall P-MPR reduction for the WTRU 102:

$$P_{CMAX\_L}=MIN\{10\ \log_{10}\Sigma MIN[p_{EMAX,c}/(\Delta t_{C,c}),p_{PowerClass}/(mpr_c\cdot a\text{-}mpr_c\cdot \Delta t_{C,c}),p_{PowerClass}/(pmpr_c\cdot \Delta t_{C,c})],P_{PowerClass}\text{-}MAX(P\text{-}MPR_c)\},\quad \text{Equation (31)}$$

where MAX(P-MPR$_c$) is the largest P-MPR$_c$ value among the CCs;

$$P_{CMAX\_L}=MIN\{10\ \log_{10}\Sigma MIN\{p_{EMAX,c}/(\Delta t_{C,c}),p_{PowerClass}/(mpr_c\cdot a\text{-}mpr_c\cdot \Delta t_{C,c}),p_{PowerClass}/(pmpr_c\cdot \Delta t_{C,c})],P_{PowerClass}\text{-}IBR\text{-}MAX(P\text{-}MPR_c)\};\quad \text{Equation (32)}$$

$$P_{CMAX\_L}=MIN\{10\ \log_{10}\Sigma MIN\{p_{EMAX,c}/(\Delta t_{C,c}),p_{PowerClass}/(mpr_c\cdot a\text{-}mpr_c\cdot \Delta t_{C,c}\cdot ibr_c),p_{PowerClass}/(pmpr_c\cdot \Delta t_{C,c}\cdot ibr_c)\},P_{PowerClass}\cdot MAX(P\text{-}MPR_c)\};\quad \text{Equation (33)}$$

$$P_{CMAX\_L}=MIN\{10\ \log_{10}\Sigma MIN\{p_{EMAX,c}/(\Delta t_{C,c}),p_{PowerClass}/(mpr_c\cdot a\text{-}mpr_c\cdot \Delta t_{C,c}\cdot ibr_c),p_{PowerClass}/(pmpr_c\cdot \Delta t_{C,c}\cdot ibr_c)\},P_{PowerClass}\text{-}IBR\text{-}MAX(P\text{-}MPR_c)\};\quad \text{Equation (34)}$$

$$P_{CMAX\_L}=MIN\{10\ \log_{10}\Sigma MIN\{p_{EMAX,c}/(\Delta t_{C,c}\cdot ibr_c),p_{PowerClass}/(mpr_c\cdot a\text{-}mpr_c\cdot \Delta t_{C,c}\cdot ibr_c),p_{PowerClass}/(pmpr_c\cdot \Delta t_{C,c}\cdot ibr_c)\},P_{PowerClass}\text{-}MAX(P\text{-}MPR_c)\};\ \text{and Equation (35)}$$

$$P_{CMAX\_L}=MIN\{10\ \log_{10}\Sigma MIN\{p_{EMAX,c}/(\Delta t_{C,c}\cdot ibr_c),p_{PowerClass}/(mpr_c\cdot a\text{-}mpr_c\cdot \Delta t_{C,c}\cdot ibr_c),p_{PowerClass}/(pmpr_c\cdot \Delta t_{C,c}\cdot ibr_c)\},P_{PowerClass}\text{-}IBR\text{-}MAX(P\text{-}MPR_c)\}.\quad \text{Equation (36)}$$

IBR in the above equations may be a WTRU specific relaxation. The IBR may be: (1) an independent value from the CC specific IBRc values, (2) the same as those values; or (3) a combination of those values such as the maximum, the average, or the sum, among others. Combinations may be performed in a linear format before converting to log format for the IBR.

It is contemplated that the equations described herein for inter-band aggregation may be applied for intra-band aggregation, for example intra-band non-contiguous aggregation. In this case, one or more of the MPR, A-MPR, $\Delta T_C$ and/or the P-MPR may be specified per carrier or per aggregated contiguous carrier group.

For a WTRU 102 capable of supporting intra-band contiguous carrier aggregation (CA) and also capable of supporting inter-band CA, it may be useful to, for example, an additional diplexer or other components in the RF front end. In this case, and/or other cases, the equations above may use an additional term to account for that insertion loss. The insertion loss may instead or in addition (for example in whole or in part) be included in the allowed power reduction specified for one of the existing terms in the equations.

In certain representative embodiments, a relationship between CC specific values and WTRU specific values may be used in the maximum power equations.

The relationship between certain values defined for the individual CCs and the values defined for the WTRU 102 may include one or more of the following. For the intra-band CA case, the MPR may be defined for the WTRU 102 and each CC specific MPR$_c$ may be set equal to the MPR. For example, with two CCs in the same band and with the MPR=1 dB for the WTRU 102, the WTRU 102 may be able to relax the $P_{CMAX,c}$ for each CC by 1 dB and if both CCs are near the maximum such that their sum is to or would exceed $P_{CMAX}$ (or alternatively Ppowerclass) the WTRU 102 may be allowed to scale back power to not exceed the $P_{CMAX}$ (or alternatively Ppowerclass) which may include the allowance to reduce the WTRU maximum power by, for example, 1 dB overall.

The term $\Delta T_{C,c}$ for a CC may be based on where the CC is in frequency in the band. For the intra-band CA case, when the CC specific $\Delta T_{C,c}$ (e.g., all of the CC specific $\Delta T_{C,c}$) are the same, $\Delta T_C$ for the WTRU 102 may be set equal to $\Delta T_{C,c}$. For the inter-band CA case, this may be applicable on a per band (e.g., frequency band) basis.

For the intra-band CA case, when any of the CC specific $\Delta T_{C,c}$ are different, $\Delta T_C$ may be set equal to the largest of the $\Delta T_{C,c}$ values. For the inter-band CA case, this may be applicable on a per band (e.g., frequency band) basis.

For the intra-band CA case, when any of the CC specific $\Delta T_{C,c}$ are different, when frequency hopping is enabled, the $\Delta T_C$ may be set equal to the largest $\Delta T_{C,c}$ over both slots of a sub-frame. For the inter-band CA case, this may be applicable on a per band (e.g., frequency band) basis.

For intra-band CA, if the A-MPR$_c$ for any of the CCs is different, then the largest value may be used for the A-MPR value.

In certain representative embodiments, if frequency hopping is enabled and the RBs are changing from one slot to another and the A-MPR$_c$ per slot changes for one or more CCs (e.g., any CC), the largest A-MPR$_c$ value over the sub-frame may be used for the A-MPR value.

For intra-band CA, if the A-MPR$_c$ values are equal for the aggregated CCs, the A-MPR may be set equal to the A-MPR$_c$. For the inter-band CA case, this may be applicable on a per band (e.g., frequency band) basis. For the inter-band CA case, the A-MPR$_c$ values may be applied per CC, as they have an additive effect.

One or more of the relationships described above for inter-band CA may be applicable for intra-band CA with non-contiguous allocation.

In certain representative embodiments, a measured maximum power may be implemented.

The maximum power values discussed earlier may be "configured" or target values. When the WTRU 102 transmits, it may not transmit the exact value it calculated since components from WTRU 102 to WTRU 102 may have variations in performance, even from the same manufacturer. The WTRU 102 may be permitted tolerances around the configured values when actually transmitting and in tests performed to determine if the WTRU 102 maximum output power is staying within the specified limits.

The measured maximum output power may be defined as follows. The measured maximum output power of the WTRU 102, which may be the measured maximum sum of the individual CC powers, $(\Sigma p_{U,c})_{MAX}$ may be (or may be required to be) within the following bounds:

$$P_{CMAX\_L} - T(P_{CMAX\_L}) \leq 10 \log_{10}(\Sigma p_{U,c})_{MAX} \leq P_{CMAX\_H} + T(P_{CMAX\_H}) \quad \text{Equation (37)}$$

where $p_{U,c}$ may be output power of a component carrier c in linear scale;

$P_{CMAX\_L}$ and $P_{CMAX\_H}$ may be as defined previously, and $T(P_{CMAX})$ may be a tolerance value, for example defined by a tolerance table, and may apply to $P_{CMAX\_L}$ and $P_{CMAX\_H}$ separately.

Representative procedures may be implemented for preventing the WTRU 102 from exceeding maximum transmit power with the UCI simultaneously on the PUCCH and the PUSCH for one-band operations.

A representative procedure of preventing the WTRU 102 from exceeding maximum transmit power while transmitting the UCI simultaneously on the PUCCH and the PUSCH for one band operation, which may be expressed in several different forms, that are functionally equivalent, follows.

In certain representative embodiments, the $\hat{P}_{CMAX}(i)$ may be replaced by either $\hat{P}_{CMAX}$ or $\hat{P}_{PowerClass}$.

In all forms, scaling of a channel (e.g., scaling the channel power) generally refers to multiplying the channel (e.g., the channel power) by a factor w, $0 \leq w \leq 1$ such that scaling a channel by a factor of one is equivalent to not scaling the channel, and scaling the channel by a factor of zero is equivalent to not transmitting the channel.

The representative procedure may also be applicable in general to the cases of: (1) a PUCCH not being transmitted; and/or (2) a PUSCH (e.g., with or without the UCI) not being transmitted, by setting the respective linear power terms of any non-transmitted channels to zero.

In a first form (e.g., form 1), when the UCI is simultaneously transmitted on the PUCCH and the PUSCH, if the total transmit power of the WTRU 102 is to or would exceed $P_{CMAX}$, and the sum of the PUCCH power plus PUSCH with UCI power may not or would not exceed $P_{CMAX}$, the WTRU 102 may scale the PUSCHs (for example, all PUSCHs) without UCI equally. If the total transmit power of the WTRU 102 is to or would exceed $P_{CMAX}$, and the sum of PUCCH power plus PUSCH with UCI power is to or would exceed $P_{CMAX}$, the WTRU 102 may scale PUSCH with UCI, and may not transmit any PUSCH without the UCI.

In a second form (e.g., form 2), when the UCI is simultaneously transmitted on the PUSCH in cell c=j and on the PUCCH, if $\hat{P}_{CMAX}(i) - \hat{P}_{PUCCH}(i) - \hat{P}_{PUSCH,j}(i) \geq 0$ then the WTRU 102 may scale for $\hat{P}_{PUSCH,c}(i)$ for serving cells (e.g., all serving cells) c≠j in subframe i such that the condition $$\sum_{c \neq j} w(i) \cdot \hat{P}_{PUSCH,c}(i) \leq \hat{P}_{CMAX}(i) - \hat{P}_{PUCCH}(i) - \hat{P}_{PUSCH,j}(i)$$

is satisfied. Otherwise, the WTRU 102 may not transmit, $\hat{P}_{PUSCH,c \neq j}(i)$ and may scale $\hat{P}_{PUSCH,c \neq j}(i)$ in subframe i such that the condition $w(i) \cdot \hat{P}_{PUSCH,j}(i) \leq \hat{P}_{CMAX}(i) - \hat{P}_{PUCCH}(i)$ is satisfied. It is contemplated that w(i) values are the same across serving cells c≠j when w(i)>0, but for certain serving cells w(i) may be zero. It is also contemplated that $\hat{P}_{CMAX}$ may be the linear equivalent of $P_{CMAX}$, and/or $\hat{P}_{PUSCH,c}$ may be the linear equivalent of $P_{PUSCH,c}$, among others.

In a third form (e.g., form 3), when the UCI is simultaneously transmitted on the PUSCH in cell c=j and on the PUCCH, if the total transmit power of the WTRU 102 may or would exceed the $P_{CMAX}$, the WTRU 102 may scale $\hat{P}_{PUSCH,c}(i)$ for all serving cells c in subframe i such that the condition:

$$\sum_{c \neq j} w_c(i) \cdot \hat{P}_{PUSCH,c}(i) + w_j(i) \cdot \hat{P}_{PUSCH,j}(i) \leq \hat{P}_{CMAX}(i) - \hat{P}_{PUCCH}(i) \quad \text{Equation (38)}$$

$$w_c = \begin{cases} 1 & c = j, \hat{P}_{CMAX}(i) - \hat{P}_{PUCCH}(i) - \hat{P}_{PUSCH,j}(i) \geq 0 \\ 0 & c \neq j, \hat{P}_{CMAX}(i) - \hat{P}_{PUCCH}(i) - \hat{P}_{PUSCH,j}(i) \leq 0 \end{cases}$$

$$w_{c=n} = \{w_{c=m} \mid 0\} \forall m \neq j, n \neq j$$

is satisfied. It is contemplated that $\hat{P}_{CMAX}$ may be the linear equivalent of $P_{CMAX}$, and/or $\hat{P}_{PUSCH,c}$ may be the linear equivalent of $P_{PUSCH,c}$, among others.

In a fourth form (e.g., form 4), when UCI is simultaneously transmitted on the PUSCH in cell c=j and on the PUCCH, if the total transmit power of the WTRU 102 may or would exceed the $P_{CMAX}$, the WTRU 102 may scale $\hat{P}_{PUSCH,c}(i)$ for all serving cells c in subframe i such that the condition:

$$\sum_c w_c(i) \cdot \hat{P}_{PUSCH,c}(i) \leq \hat{P}_{CMAX}(i) - \hat{P}_{PUCCH}(i) \quad \text{Equation (39)}$$

$$w_c = \begin{cases} 1 & c = j, \hat{P}_{CMAX}(i) - \hat{P}_{PUCCH}(i) - \hat{P}_{PUSCH,j}(i) \geq 0 \\ 0 & c \neq j, \hat{P}_{CMAX}(i) - \hat{P}_{PUCCH}(i) - \hat{P}_{PUSCH,j}(i) \leq 0 \end{cases}$$

$$w_{c=n} = \{w_{c=m} \mid 0\} \forall m \neq j, n \neq j$$

It is contemplated that $\hat{P}_{CMAX}$ may be the linear equivalent of $P_{CMAX}$, and/or $\hat{P}_{PUSCH,c}$ may be the linear equivalent of $P_{PUSCH,c}$, among others.

In certain representative embodiments, representative procedures may be implemented for handling maximum power, for example for setting band-specific power limits, when the WTRU 102 may be operating in more than one band, for example in inter-band carrier aggregation.

For inter-band operation, MPR, A-MPR, and $\Delta T_C$ may be different for each band. P-MPR may be the same or different per band, for example, power reduction for a SAR (for example related to proximity of a WTRU to a human) may be the same for each band, but the power reduction for simultaneous 1×-EVDO may be different for each band.

To support this case, an MPR, an A-MPR, and/or a $\Delta T_C$ may be defined as functions of the band (e.g., frequency band) in addition to the other parameters they may be a function of. The P-MPR may be defined as the maximum allowed power reduction for the WTRU 102 that, if applied equally to the bands, may become the maximum allowed reduction per band and per CC. In certain representative embodiments, a P-MPR may be defined per band or there may be a P-MPR component for the WTRU 102 and a P-MPR per band.

The power of each band may be limited by the power class and the reduction factors for that band. For example, the WTRU 102 may determine the allowed maximum output power per band, $P_{CMAX,b}$, from (or the WTRU 102 may be allowed to set its configured maximum output power on band b, $P_{CMAX,b}$, within the following bounds):

$$P_{CMAX\_L,b} < P_{CMAX,b} < P_{CMAX\_H,b} \quad \text{Equation (40)}$$

where for the case when there may be one P-MPR for the WTRU 102:

$$P_{CMAX\_L,b} = \text{MIN}\{P_{EMAX,b} - \Delta T_{C,b}, P_{PowerClass} - \text{MAX}(MPR_b + A\text{-}MPR_b, P\text{-}MPR) - \Delta T_{C,b}\} \quad \text{Equation (41)}$$

$$P_{CMAX\_H,b} = \text{MIN}\{P_{EMAX,b}, P_{PowerClass}\} \quad \text{Equation (42)}$$

where $P_{EMAX,b}$ may be a power limit signaled by the eNB 140, e.g., via RRC signaling, for the band or may be a value computed from the individual signaled power limits for each CC, $P_{EMAX,c}$ in the band.

As an example, $P_{EMAX,b} = 10 \log 10 \Sigma p_{EMAX,c}$ where the sum may be computed for the CCs c in the band b and where $P_{EMAX,c}$ may be the power limit signaled by the eNB 140, e.g., via RRC signaling, for example, in the P-Max IE, for each CC in band b. $p_{EMAX,c}$ may be the value of $P_{EMAX,c}$ expressed in linear notation. A subscript of b may indicate a value for band b. For example, if P-MPR is different for different bands, P-MPR may be replaced by P-MPR$_b$. It is contemplated that the b subscripts may not be used in the equations for values that are understood to be a function of the band.

For each CC, the following may apply:

$$P_{CMAX\_L,c} \leq P_{CMAX,c} \leq P_{CMAX\_H,c} \quad \text{Equation (43)}$$

where $$P_{CMAX\_L,c} = \text{MIN}\{P_{EMAX,c} - \Delta T_C, \ P_{PowerClass} - \text{MAX}(MPR_c + A\text{-}MPR_c, P\text{-}MPR_c - \Delta T_{Cc})\};$$

$$P_{CMAX\_H,c} = \text{MIN}\{P_{EMAX,c}, P_{PowerClass}\};$$

$P_{EMAX,c}$ may be a maximum power limit signaled by the higher layers (for the CC), for example signaled to the WTRU 102 by the eNB 140 in the P-Max IE;

and where $MPR_c$, $A\text{-}MPR_c$, and $\Delta T_{Cc}$ may be equal to the values for the band the CC may be in. $P\text{-}MPR_c$ may be equal to the $P\text{-}MPR_b$ value for the band the CC is in if it is specified per band or it may be equal to the WTRU 102 specified P-MPR value.

The WTRU may configure an overall WTRU configured maximum output power, $P_{CMAX}$, in addition to a configured maximum output power per band $P_{CMAX,b}$, which may be in addition to a configured maximum output power per CC, $P_{CMAX,c}$. $P_{CMAX}$ may be limited by the power class and may be further limited by power reductions intended to compensate for effects that are additive over the bands. For example, the adjacent channel interference due to transmitting in one band may not be additive with the adjacent channel interference due to transmitting in another band. The bounds of $P_{CMAX}$ may be defined as follows:

$$P_{CMAX\_L} \leq P_{CMAX} \leq P_{CMAX\_H} \quad \text{Equation (44)}$$

where:

$P_{CMAX\_L}$ may account for the signaled maximum power values for the CCs and the allowed power reductions. $P_{CMAX\_H}$ may allow for the signaled maximum power values for the CCs as well as the power class.

The decision point for power scaling and the rules for power scaling may be modified to account for the band specific maximum power, $P_{CMAX,b}$, in addition to the overall WTRU maximum power $P_{CMAX}$. Example procedures are described below.

In certain representative embodiments, representative procedures may be implemented for handling maximum power, for example for setting rules for scaling, when the WTRU 102 may be operating in more than one band, for example in inter-band carrier aggregation.

The power scaling rules (or policies) may be defined such that if the sum of the computed powers of the CCs would or is to exceed the maximum power of the power class, $P_{PowerClass}$, the individual PUSCH channel powers are or may be scaled, with a priority given to a PUSCH carrying the UCI, for example a higher priority than that of a PUSCH not carrying the UCI. A priority higher than that given to the PUSCH carrying UCI may be given to a PUCCH and the PUCCH power may not be reduced in the scaling process. The $P_{CMAX}$ may be used as the power limit instead of $P_{PowerClass}$ as shown in the following example which may be applicable for the case of intra-band (e.g., single or contiguous band) CA.

In this example, if the total transmit power of the WTRU 102 would or is to exceed $\hat{P}_{CMAX}$, the WTRU 102 scales or may scale $\hat{P}_{PUSCH,c}(i)$ for the serving cell C in subframe i by a weight w(i) such that the condition:

$$\sum_c w(i) \cdot \hat{P}_{PUSCH,c}(i) \leq \left(\hat{P}_{CMAX} - \hat{P}_{PUCCH}(i)\right) \quad \text{Equation (45)}$$

is satisfied.

If the WTRU 102 has a PUSCH transmission with the UCI on cell j, a PUSCH without the UCI on one or more of the remaining cells, and the total transmit power of the WTRU 102 would or is to exceed $\hat{P}_{CMAX}$, the WTRU 102 scales or may scale $\hat{P}_{PUSCH,c}(i)$ for the serving cells without the UCI in subframe i by a weight w(i) such that the condition:

$$\sum_{c \neq j} w(i) \cdot \hat{P}_{PUSCH,c}(i) \leq \left(\hat{P}_{CMAX} - \hat{P}_{PUSCH,j}(i)\right) \quad \text{Equation (46)}$$

is satisfied.

It is contemplated that in certain representative embodiments it may be appropriate to use $\hat{P}_{CMAX}(i)$ instead of $\hat{P}_{CMAX}$ in some or all of the above equations. It is also contemplated that $\hat{P}_{CMAX}$ or $\hat{P}_{CMAX}$ may be the linear equivalent of $P_{CMAX}$, and/or $\hat{P}_{PUSCH,c}$ or $\hat{P}_{PUSCH,c}$ may be the linear equivalent of $P_{PUSCH,c}$, among others.

For the case in which there may be band specific power limits, for example for inter-band CA which may have different values of MPR and other backoffs for each of the bands, there may be an additional constraint or constraints imposed by the maximum allowed power for each band, $P_{CMAX,b}$.

One or more of the following may apply. In a first example, the WTRU 102 may perform scaling in a given band b if the sum of the computed powers of the CCs in that band would or is to exceed a maximum power for that band. That maximum power may be $P_{CMAX,b}$ or its linear equivalent. That maximum power may be subframe specific and may be $P_{CMAX,b}(i)$ for subframe i or its linear equivalent.

In a second example, the WTRU 102 may perform scaling on the computed channel powers if one or more of the following is true: (1) the sum of the computed powers of the CCs in any band would or is to exceed a maximum power for that band (for example, the maximum power may be $P_{CMAX,b}$ or its linear equivalent and/or the maximum power may be subframe specific and may be $P_{CMAX,b}(i)$ for subframe i or its linear equivalent); (2) the sum of the computed powers over CCs (e.g., all CCs) in bands (e.g., all bands) would exceed or is to exceed the maximum power defined for the WTRU 102 (for example, the maximum power may be $P_{CMAX}$ or its linear equivalent and/or the maximum power may be subframe specific and may be $P_{CMAX}(i)$ for subframe i or its linear equivalent).

In a third example, the WTRU 102 may perform scaling such that weights (e.g., all weights) of the PUSCHs not carrying the UCI may be equal regardless of the band each PUSCH may be in. The following constraints may be applied in determining the scaling weights for transmission in subframe i. It is contemplated that the weights w(i) greater than 0 may be equal and for certain cells the weights may be zero. Applying the rule/provisioning that PUSCHs (e.g., all PUSCHs not carrying the UCI) may be scaled equally, the following representative scaling algorithm may be applied separately to each band (e.g., frequency band), as set forth in Equation 47:

$$\sum_{c \in b} w(i) \cdot \tilde{P}_{PUSCH,c}(i) \le \tilde{P}_{CMAX,b}(i) - \tilde{P}_{PUCCH}(i) \quad \text{Equation (47)}$$

if one of the CCs in that band carries the PUCCH, or $$\sum_{c \in b, c \ne j} w(i) \cdot \tilde{P}_{PUSCH,c}(i) \le \tilde{P}_{CMAX,b}(i) - \tilde{P}_{PUSCH,j}(i) \quad \text{Equation (48)}$$

if one of the CCs, j, in that band carries a PUSCH with a UCI, or $$\sum_{c \in b} w(i) \cdot \tilde{P}_{PUSCH,c}(i) \le \tilde{P}_{CMAX,b}(i) \quad \text{Equation (49)}$$

if one of the CCs in that band carries a PUSCH with a UCI, where: c∈b indicates or means all carriers, c, in band b, w(i) may be the scaling weight applied to PUSCHs (e.g., all PUSCHs) not carrying the UCI in subframe i, $P_{PUCCH}(i)$ may be the transmit power of the PUCCH (e.g., the PUCCH in band b or the PUCCH in any band) in subframe i, and $\tilde{P}$ may be the linear equivalent of a quantity expressed in dBm or in log form.

The one (e.g., the one non-zero) scaling weight w(i) may be chosen by the WTRU 102 such that for each band the applicable (e.g., all of the applicable) above constraints may be satisfied. The WTRU 102 may choose the weight such that the applicable constraint or constraints for maximum per-band transmit power, for each band (for example the applicable above constraints for each band), and also the following applicable constraint for maximum WTRU transmit power may be satisfied.

If there is a PUCCH transmitted in subframe i, the WTRU 102 transmit power constraint may be:

$$\sum_{c} w(i) \cdot \tilde{P}_{PUSCH,c}(i) \le \tilde{P}_{PowerClass} - \tilde{P}_{PUCCH}(i) \quad \text{Equation (50)}$$

or $$\sum_{c} w(i) \cdot \tilde{P}_{PUSCH,c}(i) \le \tilde{P}_{CMAX}(i) - \tilde{P}_{PUCCH}(i) \quad \text{Equation (51)}$$

If there is a PUSCH with UCI transmitted in subframe i in CC j, the WTRU 102 transmit power constraint may be:

$$\sum_{c \ne j} w(i) \cdot \tilde{P}_{PUSCH,c}(i) \le \tilde{P}_{PowerClass} - \tilde{P}_{PUSCH,j}(i) \quad \text{Equation (52)}$$

or $$\sum_{c \ne j} w(i) \cdot \tilde{P}_{PUSCH,c}(i) \le \tilde{P}_{CMAX}(i) - \tilde{P}_{PUSCH,j}(i) \quad \text{Equation (53)}$$

If there is neither a PUCCH nor a PUSCH with a UCI transmitted in subframe i, the WTRU 102 transmit power constraint may be:

$$\sum_{c} w(i) \cdot \tilde{P}_{PUSCH,c}(i) \le \tilde{P}_{PowerClass} \quad \text{Equation (54)}$$

or $$\sum_{c} w(i) \cdot \tilde{P}_{PUSCH,c}(i) \le \tilde{P}_{CMAX}(i) \quad \text{Equation (55)}$$

A fourth example may be an alternative to using one scaling weight factor, w(i), for all PUSCHs which may not be carrying UCI. In this example, the WTRU 102 may use a separate scaling weighting factor, $w_b(i)$, for the PUSCHs (e.g., all PUSCHs not carrying UCI) in band b. It is contemplated that for a given band b the weights $w_b(i)$ greater than 0 may be equal, and for certain cells the weights may be 0. The WTRU 102 may choose the weights $w_b(i)$ such that the applicable constraint or constraints for maximum per-band transmit power, for each band, may be satisfied. In this example, the per band constraint may be:

$$\sum_{c \in b} w_b(i) \cdot \tilde{P}_{PUSCH,c}(i) \le \tilde{P}_{CMAX,b}(i) - \tilde{P}_{PUCCH}(i) \quad \text{Equation (56)}$$

if one of the CCs in that band carries the PUCCH, or $$\sum_{\substack{c \in b, \\ c \ne j}} w_b(i) \cdot \tilde{P}_{PUSCH,c}(i) \le \tilde{P}_{CMAX,b}(i) - \tilde{P}_{PUSCH,j}(i) \quad \text{Equation (57)}$$

if one of the CCs, j, in that band carries a PUSCH with a UCI, or $$\sum_{c \in b} w_b(i) \cdot \tilde{P}_{PUSCH,c}(i) \le \tilde{P}_{CMAX,b}(i) \quad \text{Equation (58)}$$

if none of the CCs in that band carry a PUCCH or a PUSCH with a UCI.

The WTRU 102 may choose the weights $w_b(i)$ such that the applicable constraint or constraints for maximum per-band transmit power, for each band, and also the applicable constraint for maximum WTRU transmit power may be satisfied. In this example, the maximum WTRU 102 transmit power constraint may be:

$$\sum_b \sum_{c \in b} w_b(i) \cdot \tilde{P}_{PUSCH,c}(i) \leq \tilde{P}_{PowerClass} - \tilde{P}_{PUCCH}(i) \quad \text{Equation (59)}$$

if one of the CCs in any band carries the PUCCH; or $$\sum_b \sum_{\substack{c \in b, \\ c \neq j}} w_b(i) \cdot \tilde{P}_{PUSCH,c}(i) \leq \tilde{P}_{PowerClass} - \tilde{P}_{PUSCH,j}(i) \quad \text{Equation (60)}$$

if one of the CCs in any band carries the PUSCH with a UCI, or $$\sum_b \sum_{c \in b} w_b(i) \cdot \tilde{P}_{PUSCH,c}(i) \leq \tilde{P}_{PowerClass} \quad \text{Equation (61)}$$

if none of the CCs in any band carries the PUCCH or the PUSCH with the UCI. In each of the above equations, $\tilde{P}_{PowerClass}$ may be replaced by $\tilde{P}_{CMAX}(i)$ or $\tilde{P}_{CMAX}$.

A fifth example may be another alternative where the WTRU 102 may use a weighting factor $w_b(i)$, for PUSCHs (e.g., all PUSCHs not carrying the UCI) in band b and may use a weighting factor $w_u(i)$ to further scale the channel powers to satisfy the WTRU maximum power constraint. It is contemplated that the weights $w_b(i)$ greater than 0 may be equal for a given band b and weights $w_u(i)$ greater than 0 may be equal, and for certain cells the weights may be 0. The WTRU 102 may choose the weights to satisfy the per band constraint for each band and the WTRU transmit power constraint. Satisfying all the combinations of band and WTRU constraints may be accomplished by satisfying the per band constraint first and then the WTRU constraint. In this example, the per band constraint may be:

$$\sum_{c \in b} w_b(i) \cdot \tilde{P}_{PUSCH,c}(i) \leq \tilde{P}_{CMAX,b}(i) - \tilde{P}_{PUCCH}(i) \quad \text{Equation (62)}$$

if one of the CCs in that band carries the PUCCH, or $$\sum_{\substack{c \in b, \\ c \neq j}} w_b(i) \cdot \tilde{P}_{PUSCH,c}(i) \leq \tilde{P}_{CMAX,b}(i) - \tilde{P}_{PUSCH,j}(i) \quad \text{Equation (63)}$$

if one of the CCs, j, in that band carries a PUSCH with a UCI, or $$\sum_{c \in b} w_b(i) \cdot \tilde{P}_{PUSCH,c}(i) \leq \tilde{P}_{CMAX,b}(i) \quad \text{Equation (64)}$$

if none of the CCs in that band carry a PUCCH or a PUSCH with a UCI. In this example, the maximum WTRU transmit power constraint may be:

$$w_u(i) \sum_b \sum_{c \in b} w_b(i) \cdot \tilde{P}_{PUSCH,c}(i) \leq \tilde{P}_{PowerClass} - \tilde{P}_{PUCCH}(i) \quad \text{Equation (65)}$$

if one of the CCs in any band carries the PUCCH; or $$w_u(i) \sum_b \sum_{\substack{c \in b, \\ c \neq j}} w_b(i) \cdot \tilde{P}_{PUSCH,c}(i) \leq \tilde{P}_{PowerClass} - \tilde{P}_{PUSCH,j}(i) \quad \text{Equation (66)}$$

if one of the CCs in any band carries a PUSCH with a UCI, or $$w_u(i) \sum_b \sum_{c \in b} w_b(i) \cdot \tilde{P}_{PUSCH,c}(i) \leq \tilde{P}_{PowerClass} \quad \text{Equation (67)}$$

if none of the CCs in any band carries a PUCCH or a PUSCH with a UCI. In each of the above equations, $\tilde{P}_{PowerClass}$ may be replaced by $\tilde{P}_{CMAX}(i)$ or $\tilde{P}_{CMAX}$.

One of skill understands that these constraints, in all of the alternative embodiments, may be extended to cover the case of multiple PUCCHs in a subframe and/or one or more PUCCH(s) and/or one or more PUSCH(s) with UCI in the same subframe.

In certain representative embodiments, representative procedures may be implemented for preventing the WTRU 102 from exceeding maximum transmit power, including the case of the UCI simultaneously on the PUCCH and the PUSCH for multiple band operation.

It is contemplated that the WTRU may at times transmit PUCCH carrying certain UCI (e.g., ACK/NACK) and PUSCH carrying certain (e.g., other) UCI simultaneously. The PUCCH and the PUSCH carrying UCI may be in the same or different bands. The power scaling rules (or policies), the constraints for maximum per-band transmit power, and the constraints for maximum WTRU transmit power described previously may be modified and new power scaling rules (or policies) and constraints may be added to include this possibility.

One or more of the following may apply. In a first example, the WTRU 102 may perform scaling in a given band b if the sum of the computed powers of the CCs in that band would or is to exceed a maximum power for that band. That maximum power maybe $P_{CMAX,b}$ or its linear equivalent. That maximum power may be subframe specific and may be $P_{CMAX,b}(i)$ for subframe i or its linear equivalent.

In a second example, the WTRU 102 may perform scaling on the computed channel powers if one or more of the following is true: (1) the sum of the computed powers of the CCs in any band would or is to exceed a maximum power for that band (for example, the maximum power maybe $P_{CMAX,b}$ or its linear equivalent and/or the maximum power may be subframe specific and may be $P_{CMAX,b}(i)$ for subframe i or its linear equivalent); (2) the sum of the computed powers over CCs (e.g., all CCs) in bands (e.g., all bands) would or is to exceed the maximum power defined for the WTRU 102 (for example, that maximum power may be $P_{CMAX}$ or its linear equivalent and/or the maximum power may be subframe specific and may be $P_{CMAX}(i)$ for subframe i or its linear equivalent).

In a third example, the WTRU 102 may perform scaling such that weights (e.g., all weights) of the PUSCHs not carrying the UCI may be equal regardless of the band each PUSCH may be in. In this case, the following constraints may be applied in determining the scaling weight for transmission in subframe i. It is contemplated that for scaling the weights w(i) greater than 0 may be equal, and for certain cells the weights may be 0. Applying the rule/provisions that PUSCHs (e.g., all PUSCHs not carrying the UCI) may be scaled equally, the following example scaling algorithm may be applied separately to each band, as set forth in Equation 68:

$$\sum_{c \in b} w(i) \cdot \tilde{P}_{PUSCH,c}(i) \leq \tilde{P}_{CMAX,b}(i) - \tilde{P}_{PUCCH}(i) \quad \text{Equation (68)}$$

if one of the CCs in that band carries the PUCCH and there is no PUSCH with a UCI in the band, or $$\sum_{c \in b, c \neq j} w(i) \cdot \tilde{P}_{PUSCH,c}(i) \leq \tilde{P}_{CMAX,b}(i) - \tilde{P}_{PUSCH,j}(i) \quad \text{Equation (69)}$$

if one of the CCs, j, in that band carries a PUSCH with a UCI and there is no PUCCH in the band, or $$\sum_{c \in b} w(i) \cdot \tilde{P}_{PUSCH,c}(i) \leq \tilde{P}_{CMAX,b}(i) \quad \text{Equation (70)}$$

if none of the CCs in that band carry a PUCCH or a PUSCH with a UCI, or $$\hat{P}_{PUSCH,j}(i) = \min\left(\hat{P}_{PUSCH,j}(i), \left(\hat{P}_{CMAX}(i) - \hat{P}_{PUCCH}(i)\right)\right) \quad \text{Equation (71)}$$

and $$\sum_{\substack{c \in b \\ c \neq j}} w(i) \cdot \tilde{P}_{PUSCH,c}(i) \leq \quad \text{Equation (72)}$$

$$\left(\hat{P}_{CMAX}(i) - \hat{P}_{PUCCH}(i) - \hat{P}_{PUSCH,j}(i)\right)$$

if one of the CCs in that band carries a PUCCH and one of the CCs in that band (which may or may not be the same CC carrying the PUCCH) carries a PUSCH with a UCI, where: c∈b indicates or means all carriers, c, in band b, w(i) may be the scaling weight applied to PUSCH (e.g., all PUSCHs) not carrying a UCI in subframe i, $P_{PUCCH}(i)$ may be the transmit power of the PUCCH in subframe i, and $\tilde{P}$ or $\hat{P}$ may be the linear equivalent of a quantity expressed in dBm or in log form.

The one (e.g., the one non-zero) scaling weight w(i) or $w_{c \neq j}(i)$, may be chosen by the WTRU 102 such that the applicable (e.g., all of the applicable) above constraints may be satisfied. The WTRU 102 may choose the weight such that the applicable constraint or constraints for maximum per-band transmit power, for each band (for example the applicable above constraints for each band), and also the following applicable constraint for maximum WTRU 102 transmit power may be satisfied: If there is a PUCCH transmitted in subframe i, the WTRU 102 transmit power constraint may be:

$$\sum_{c} w(i) \cdot \tilde{P}_{PUSCH,c}(i) \leq \tilde{P}_{PowerClass} - \tilde{P}_{PUCCH}(i) \quad \text{Equation (73)}$$

or $$\sum_{c} w(i) \cdot \tilde{P}_{PUSCH,c}(i) \leq \tilde{P}_{CMAX}(i) - \tilde{P}_{PUCCH}(i) \quad \text{Equation (74)}$$

If there is a PUSCH with a UCI transmitted in subframe i in CC j, the WTRU transmit power constraint may be:

$$\sum_{c \neq j} w(i) \cdot \tilde{P}_{PUSCH,c}(i) \leq \tilde{P}_{PowerClass} - \tilde{P}_{PUSCH,j}(i) \quad \text{Equation (75)}$$

or $$\sum_{c \neq j} w(i) \cdot \tilde{P}_{PUSCH,c}(i) \leq \tilde{P}_{CMAX}(i) - \tilde{P}_{PUSCH,j}(i) \quad \text{Equation (76)}$$

If there is neither a PUCCH nor a PUSCH with a UCI transmitted in subframe i, the WTRU transmit power constraint may be:

$$\sum_{c} w(i) \cdot \tilde{P}_{PUSCH,c}(i) \leq \tilde{P}_{PowerClass} \quad \text{Equation (77)}$$

or $$\sum_{c} w(i) \cdot \tilde{P}_{PUSCH,c}(i) \leq \tilde{P}_{CMAX}(i) \quad \text{Equation (78)}$$

If there is both a PUCCH and PUSCH with UCI in subframe i, the WTRU transmit power constraint may be:

$$\hat{P}_{PUSCH,j}(i) = \min\left(\hat{P}_{PUSCH,j}(i), \left(\hat{P}_{PowerClass} - \hat{P}_{PUCCH}(i)\right)\right) \quad \text{Equation (79)}$$

Or $$\hat{P}_{PUSCH,j}(i) = \min\left(\hat{P}_{PUSCH,j}(i), \left(\hat{P}_{CMAX}(i) - \hat{P}_{PUCCH}(i)\right)\right) \quad \text{Equation (80)}$$

And $$\sum_{c \neq j} w(i) \cdot \tilde{P}_{PUSCH,c}(i) \leq \quad \text{Equation (81)}$$

$$\left(\hat{P}_{PowerClass} - \hat{P}_{PUCCH}(i) - \hat{P}_{PUSCH,j}(i)\right)$$

or $$\sum_{c \neq j} w(i) \cdot \tilde{P}_{PUSCH,c}(i) \leq \left(\hat{P}_{CMAX}(i) - \hat{P}_{PUCCH}(i) - \hat{P}_{PUSCH,j}(i)\right) \quad \text{Equation (82)}$$

A fourth example may be an alternative to using one scaling weight factor, w(i), for PUSCHs (e.g., all PUSCHs which may not be carrying UCI). In this example, the WTRU 102 may use a separate scaling weighting factor, $w_b(i)$, for PUSCHs (e.g., all PUSCHs not carrying UCI) in band b. It is contemplated that for a given band b the weights $w_b(i)$ greater than 0 may be equal, and for certain cells the weights may be 0. The WTRU 102 may choose the weights $w_b(i)$ such that the applicable constraint or constraints for maximum per-band transmit power, for each band, may be satisfied. In this example, the per band constraint may be:

$$\sum_{c \in b} w_b(i) \cdot \tilde{P}_{PUSCH,c}(i) \leq \tilde{P}_{CMAX,b}(i) - \tilde{P}_{PUCCH}(i) \quad \text{Equation (83)}$$

if one of the CCs in that band carries the PUCCH and there is no PUSCH with a UCI in the band, or $$\sum_{\substack{c \in b, \\ c \neq j}} w_b(i) \cdot \tilde{P}_{PUSCH,c}(i) \leq \tilde{P}_{CMAX,b}(i) - \tilde{P}_{PUSCH,j}(i) \quad \text{Equation (84)}$$

if one of the CCs, j, in that band carries a PUSCH with a UCI and there is no PUCCH in the band, or $$\sum_{c \in b} w_b(i) \cdot \tilde{P}_{PUSCH,c}(i) \leq \tilde{P}_{CMAX,b}(i) \quad \text{Equation (85)}$$

if none of the CCs in that band carry a PUCCH or a PUSCH with a UCI, or $$\hat{P}_{PUSCH,j}(i) = \min(\hat{P}_{PUSCH,j}(i), (\hat{P}_{CMAX}(i) - \hat{P}_{PUCCH}(i))) \quad \text{Equation (86)}$$
and
$$\sum_{c \neq j} w_b(i) \cdot \tilde{P}_{PUSCH,c}(i) \leq \quad \text{Equation (87)}$$
$$(\hat{P}_{CMAX}(i) - \hat{P}_{PUCCH}(i) - \hat{P}_{PUSCH,j}(i))$$

if one of the CCs in that band carries a PUCCH and one of the CCs in that band (which may or may not be the same CC carrying the PUCCH) carries a PUSCH with a UCI.

The WTRU 102 may choose the weights $w_b(i)$ such that the applicable constraint or constraints for maximum per-band transmit power, for each band, and also the applicable constraint for maximum WTRU transmit power may be satisfied. In this example, the maximum WTRU 102 transmit power constraint may be:

$$\sum_b \sum_{c \in b} w_b(i) \cdot \tilde{P}_{PUSCH,c}(i) \leq \tilde{P}_{PowerClass} - \tilde{P}_{PUCCH}(i) \quad \text{Equation (88)}$$

if one of the CCs in any band carries the PUCCH and there is no PUSCH with a UCI in any band; or $$\sum_b \sum_{\substack{c \in b, \\ c \neq j}} w_b(i) \cdot \tilde{P}_{PUSCH,c}(i) \leq \tilde{P}_{PowerClass} - \tilde{P}_{PUSCH,j}(i) \quad \text{Equation (89)}$$

if one of the CCs in any band carries the PUSCH with a UCI and there is no PUCCH in any band, or $$\sum_b \sum_{c \in b} w_b(i) \cdot \tilde{P}_{PUSCH,c}(i) \leq \tilde{P}_{PowerClass} \quad \text{Equation (90)}$$

if none of the CCs in any band carries the PUCCH or the PUSCH with the UCI or $$\hat{P}_{PUSCH,j}(i) = \min(\hat{P}_{PUSCH,j}(i), (\hat{P}_{PowerClass} - \hat{P}_{PUCCH}(i))) \quad \text{Equation (91)}$$
and
$$\sum_b \sum_{\substack{c \neq j \\ c \in b}} w_b(i) \cdot \tilde{P}_{PUSCH,c}(i) \leq \quad \text{Equation (92)}$$
$$\hat{P}_{PowerClass} - \hat{P}_{PUCCH}(i) - P_{PUSCH,j}(i)$$

if a CC in any band carries the PUCCH and a CC in any band carries the PUSCH with a UCI.

In each of the above equations, $\tilde{P}_{PowerClass}$ or $\hat{P}_{PowerClass}$ may be replaced $\tilde{P}_{CMAX}(i)$ or $\hat{P}_{CMAX}(i)$ or by $\hat{P}_{CMAX}$ or $\tilde{P}_{CMAX}$.

A fifth example may be another alternative where the WTRU 102 may use a weighting factor $w_b(i)$, for PUSCH (e.g., all PUSCHs not carrying the UCI) in band b and use a weighting factor $w_u(i)$ to further scale the channel powers to satisfy the WTRU maximum power constraint. It is contemplated that the weights $w_b(i)$ greater than 0 may be equal for a given band b and weights $w_u(i)$ greater than 0 may be equal, and for certain cells the weights may be 0. The WTRU 102 may choose the weights to satisfy the per band constraint for each band and the WTRU transmit power constraint. Satisfying all the combinations of band and WTRU constraints may be accomplished by satisfying the per band constraint first and then the WTRU constraint. In this example, the per band constraint may be:

$$w_u(i) \sum_{c \in b} w_b(i) \cdot \tilde{P}_{PUSCH,c}(i) \leq \tilde{P}_{CMAX,b}(i) - \tilde{P}_{PUCCH}(i) \quad \text{Equation (93)}$$

if one of the CCs in that band carries the PUCCH, or $$w_u(i) \sum_{\substack{c \in b, \\ c \neq j}} w_b(i) \cdot \tilde{P}_{PUSCH,c}(i) \leq \tilde{P}_{CMAX,b}(i) - \tilde{P}_{PUSCH,j}(i) \quad \text{Equation (94)}$$

if one of the CCs, j, in that band carries a PUSCH with a UCI, or $$w_u(i) \sum_{c \in b} w_b(i) \cdot \tilde{P}_{PUSCH,c}(i) \leq \tilde{P}_{CMAX,b}(i) \quad \text{Equation (95)}$$

if none of the CCs in that band carry the PUCCH or the PUSCH with the UCI. In this example, the maximum WTRU transmit power constraint may be:

$$w_u(i) \sum_b \sum_{c \in b} w_b(i) \cdot \tilde{P}_{PUSCH,c}(i) \leq \tilde{P}_{PowerClass} - \tilde{P}_{PUCCH}(i) \quad \text{Equation (96)}$$

if one of the CCs in any band carries the PUCCH; or $$w_u(i) \sum_b \sum_{\substack{c \in b, \\ c \neq j}} w_b(i) \cdot \tilde{P}_{PUSCH,c}(i) \leq \tilde{P}_{PowerClass} - \tilde{P}_{PUSCH,j}(i) \quad \text{Equation (97)}$$

if one of the CCs in any band carries a PUSCH with a UCI, or $$w_u(i) \sum_b \sum_{c \in b} w_b(i) \cdot \tilde{P}_{PUSCH,c}(i) \le \tilde{P}_{PowerClass} \quad \text{Equation (98)}$$

if none of the CCs in any band carries a PUCCH or a PUSCH with a UCI, or $$\tilde{P}_{PUSCH,j}(i) = \min(\tilde{P}_{PUSCH,j}(i), (\tilde{P}_{PowerClass} - \tilde{P}_{PUCCH}(i))) \quad \text{Equation (99)}$$

and $$w_u(i) \sum_b \sum_{\substack{c \ne j \\ c \in b}} w_b(i) \cdot \tilde{P}_{PUSCH,c}(i) \le \quad \text{Equation (100)}$$

$$\tilde{P}_{PowerClass} - \tilde{P}_{PUCCH}(i) - P_{PUSCH,j}(i)$$

if a CC in any band carries the PUCCH and a CC in any band carries the PUSCH with a UCI. In each of the above equations, $\tilde{P}_{PowerClass}$ may be replaced by $\tilde{P}_{CMAX}(i)$ or $\tilde{P}_{CMAX}$.

One of skill understands that these constraints, in all of the alternatives, may be extended to cover the case of multiple PUCCHs in a subframe and/or one or more PUCCHs and PUSCHs with UCI in the same subframe.

In certain representative embodiments, representative procedures may be implemented including signaling related to additional or non-MPR backoff.

New signaling may be added from the WTRU 102 to the eNB 140 to assist the eNB 140 in understanding when and how additional backoff (or non-MPR effects) may be impacting (or providing an influence to) the WTRU 102. Signaling by the WTRU 102 to the eNB 140 may include one or more of the following. The WTRU 102 may provide an indication as to whether the MPR or non-MPR effects may be dominating in the determination of the $P_{CMAX}$ and/or the $P_{CMAX,c}$. The WTRU 102 may include this indication with the PHR. The WTRU 102 may include this (e.g., the domination) information in a MAC CE. The WTRU 102 may send this (e.g., the domination) information via RRC signaling. The indication may be per CC or may be one indication (e.g., composite indication) for the WTRU 102. The WTRU 102 may trigger a PHR report when the dominating factor (MPR backoff or non-MPR backoff) changes.

In certain representative embodiments, representative procedures may be implemented relating to power headroom and PHR triggering.

A WTRU's simultaneous transmission on LTE and another air interface technology, or SAR requirements/limits may result in power management based backoff (P-MPR). These effects may be referred to as bursty traffic. An example of bursty traffic may be a 1×EV-DO data transmission, 1×RTT talk spurt and/or SAR requirements/limits (which may for example be associated with certain scenarios such as when a WTRU is in close proximity to a human), among others.

During bursty traffic or SAR requirement/limits, among other scenarios, the P-MPR backoff may vary and/or the impact of P-MPR backoff on the $P_{CMAX}$ or the $P_{CMAX,c}$ may vary. Other conditions related to P-MPR may vary such as whether or not the P-MPR dominates, (e.g., has an effect on), the value of $P_{CMAX}$ (or $P_{CMAX,c}$). It may be useful to trigger PHR based on changes to one or more of the conditions above, such as changes in P-MPR greater than a threshold, changes in the impact of P-MPR on the $P_{CMAX}$ or the $P_{CMAX,c}$, and/or other changes related to the P-MPR, among others.

In certain representative embodiments, such as in the case of bursty traffic or SAR requirements/limits, the triggering conditions may have short-term variations. These may be so short that the scheduler may not have time to act on them and effect grants in the given time period.

Representative procedures for handling rapidly changing additional backoff have already been presented herein which include, for example, ignoring changes (e.g., drops in P-MPR) until such changes persist for some period of time.

When triggering PHR based on changes in P-MPR, it may be useful to ignore short-term drops in P-MPR backoff, and not ignore increases in P-MPR backoff. It may be useful to minimize cases where the scheduler may be unaware of the highest P-MPR backoff level in a time period to minimize scheduling of uplink grants that exceed available transmission power.

It is contemplated that for multiple CCs, there may be a separate P-MPR value per CC, P-MPR,c. When there is P-MPR,c, the changes (for example changes which may result in a PHR trigger) described may be changes in P-MPR,c, impact of P-MPR,c on $P_{CMAX,c}$, and/or whether or not P-MPR,c dominates $P_{CMAX,c}$, among others.

In certain representative embodiments, representative procedures may be implemented for handling short-term variations in PHR triggering conditions.

Representative procedures for reducing PHR triggers due to short-term variations in the PHR triggering conditions are disclosed herein. For example, PH reporting for short-term drops in P-MPR backoff may be minimized while fast reporting of increases in P-MPR backoff may be maintained. For fast varying P-MPR backoff, the higher P-MPR backoff value may be reported to the scheduler so that uplink grants exceeding available transmission power may be minimized. In some representative embodiments, the procedures may include determining a P-MPR backoff value that may be different from the value in the current TTI for determination of P-MPR change (e.g., as compared to a) threshold triggering and calculation of the $P_{CMAX,c}$ in the PHR. In certain representative embodiments, the determined P-MPR backoff value may be the maximum value recorded in a given time period preceding the current TTI.

One of skill understands that elements/portions of representative procedures/embodiments described herein may be used individually or in any combination.

In certain representative embodiments, representative procedures may be implemented using a lookback window.

The WTRU 102 may use a lookback window or the equivalent to determine the value of P-MPR backoff and/or P-MPR,c backoff, among other purposes. For example, the P-MPR may be replaced by P-MPR,c for the case of multiple CCs or for the case of CC-specific P-MPR. The lookback window may have the same size (duration) as the PHR prohibit timer, a size relative to the PHR prohibit timer, and/or a different duration. The PHR prohibit timer may be the prohibit timer used for triggering PHR due to pathloss change or may be a different timer (e.g., prohibit timer) that may be used for triggering PHR for other purposes such as P-MPR changes or changes in effect of P-MPR on the $P_{CMAX}$ or the $P_{CMAX,c}$ or any other prohibit timer, among others.

One lookback window (e.g., a single lookback window) or multiple lookback windows may be implemented. When multiple lookback windows are implemented, one may be used for increases (such as in P-MPR or effects of P-MPR), and another may be used for decreases (such as in P-MPR or effects of P-MPR). The lookback window may be configurable by dedicated signaling (e.g., RRC signaling). The value may be specified in number of TTIs.

The lookback window is a generic term representing its function and any name may be used for the function. In one example when the lookback window relates to P-MPR backoff, it may be referred to as a P-MPR backoff window or P-MPRbackoffWindow.

The use of the lookback window may be as follows. The PHR trigger related to the P-MPR may be based on changes in the P-MPR backoff. In certain representative embodiments, the trigger may be based on: (1) changes in the effect of P-MPR on the $P_{CMAX}$; (2) changes in the effect of P-MPR on one or more $P_{CMAX,c}$ values; (3) changes in the effect of CC specific P-MPR, P-MPR,c, on $P_{CMAX,c}$, and/or (4) changes in $P_{CMAX,c}$, among other conditions. The lookback window may be applied in other scenarios to accomplish a similar function as described herein.

The WTRU 102 may use the lookback window in one or more of the following ways. The WTRU 102 may use the lookback window to look back in time over a set of values and choose one value such as the highest value, the lowest value, the average value or other combination of the values, the worst case value, the value with the most impact, or another value representative of the set of values in the window. As an example, for the case of P-MPR, the WTRU 102 may choose the highest P-MPR backoff value calculated within the lookback window, where the highest value may be or means the one value which results in the most scaling or reduction in power, (e.g., this may or may not be the highest numerical value depending on whether a dB scale or a linear scale is used).

The WTRU 102 may use the chosen value in the determination of whether or not an event such as a PHR triggering event occurred. The event may be to determine whether a change threshold has been crossed and the chosen value in the lookback window may be used by the WTRU 102 for this determination.

If a change threshold has been crossed, it may result in the WTRU 102 triggering a PHR.

When a PHR is triggered based on a P-MPR triggering event, the highest (or other chosen) value of P-MPR (or P-MPR,c) within the lookback window may be the value the WTRU 102 uses in the computation of $P_{CMAX}$,c provided in the PHR.

When PHR is triggered based on a P-MPR triggering event, the highest (or other chosen) value of P-MPR (or P-MPR,c) within the lookback window may be the value the WTRU 102 uses in the computation of $P_{CMAX}$,c and for determining power headroom (PH) for a given CC which the WTRU 102 may include in the PHR. This may be applicable to Type 1 (PUSCH) and/or Type 2 (PUSCH+PUCCH) power headroom.

When the PHR is triggered based on a P-MPR triggering event, the highest (or other chosen) value of P-MPR (or P-MPR,c) within the lookback window may be the value the WTRU 102 may use in the determination as to whether P-MPR (or P-MPR,c) is dominating (e.g., is affecting) the $P_{CMAX}$,c value the WTRU 102 is reporting.

When the PHR is triggered based on another triggering event such as a change in pathloss, reconfiguration, SCell activation, periodic PHR report, or other event, the highest (or other chosen) value of P-MPR (or P-MPR,c) within the lookback window may be the value the WTRU 102 uses in the computation of $P_{CMAX}$,c provided in the PHR.

When the PHR is triggered based on another triggering event such as a change in pathloss, reconfiguration, SCell activation, periodic PHR report, or other event, the highest (or other chosen) value of P-MPR (or P-MPR,c) within the lookback window may be the value the WTRU 102 uses in the computation of $P_{CMAX}$,c and for determining power headroom (PH) for a given CC which the WTRU 102 may include in the PHR. This may be applicable to Type 1 (PUSCH) and/or Type 2 (PUSCH+PUCCH) power headroom.

When the PHR is triggered based on another triggering event such as a change in pathloss, reconfiguration, SCell activation, periodic PHR report, or other event, the highest (or other chosen) value of P-MPR (or P-MPR,c) within the lookback window may be the value the WTRU 102 uses in the determination as to whether P-MPR (or P-MPR,c) is dominating (e.g., is affecting) the $P_{CMAX}$,c value the WTRU 102 is reporting.

The WTRU 102 may use the lookback window as follows. In each TTI (except possibly in TTIs in which the WTRU 102 is unable or not permitted to send PHR such as when a prohibit timer prohibits it or the WTRU 102 has no UL grant or no room in the MAC-CE to send the PHR), the WTRU 102 may do one or more of the following. The WTRU 102 may look back in time over the lookback window time and determine the highest power management based backoff (e.g., P-MPR) value (e.g., the one resulting in the most power reduction) used by the WTRU 102 in that time period. This value may be less than or equal to the maximum allowed P-MPR value. In certain representative embodiments, the WTRU 102 may choose (or determine) one P-MPR value from the values in the lookback window. If there are multiple CCs, a value may be separately chosen or determined for each CC, and P-MPR may be P-MPR,c for each CC.

The WTRU 102 may compare the P-MPR value (e.g., the chosen or determined P-MPR value) to the P-MPR value that was used in the last PHR to determine if a PHR triggering event has occurred. If there are multiple CCs, this may be done separately for each CC and P-MPR may be P-MPR,c for each CC.

The WTRU 102 may compare the effect of the P-MPR value (e.g., the chosen or determined P-MPR value) on $P_{CMAX}$ or $P_{CMAX,c}$ to the effect the P-MPR value had on $P_{CMAX}$ or $P_{CMAX,c}$ in the last PHR to determine if a PHR triggering event has occurred. If there are multiple CCs, this may be done separately for each CC and P-MPR may be P-MPR,c for each CC.

The WTRU 102 may compare the $P_{CMAX,c}$ value computed using the P-MPR value (e.g., the chosen or determined P-MPR value) to the $P_{CMAX,c}$ value reported in the last PHR to determine if a PHR triggering event has occurred. If there are multiple CCs, this may be done separately for each CC and P-MPR may be P-MPR,c for each CC.

The WTRU 102 may, alternatively, use some other comparison criteria using the P-MPR value (e.g., the chosen or determined P-MPR value) and the P-MPR value from the previous PHR to determine if a PHR triggering event has occurred. If there are multiple CCs, this may be done separately for each CC and P-MPR may be P-MPR,c for each CC.

If the difference in P-MPR values, or other criteria such as the difference in the impact of P-MPR on $P_{CMAX}$ or $P_{CMAX,c}$, or the change in $P_{CMAX,c}$ changes by more than a threshold, the WTRU 102 may trigger the PHR. If there are multiple CCs, this may be done separately for each CC and P-MPR may be P-MPR,c for each CC. The WTRU 102 may trigger PHR, if the criteria is met for any one or more of the CCs.

If separate P-MPR values are defined for each CC, the comparison on a CC basis may use the CC specific values.

The WTRU 102 may trigger PHR, if the threshold criteria for any one or more CCs is met.

If no threshold criteria is met, the WTRU 102 may not trigger PHR.

If PHR is triggered, the WTRU 102 may start the related prohibit timer or timers.

If PHR is triggered, the WTRU 102 may start any other prohibit timers that may exist.

When sending the PHR report, the WTRU 102 may compute the reported $P_{CMAX,c}$ c values using the P-MPR or P-MPR,c value or values it obtained within the lookback window (e.g., the highest value or values in the lookback window).

When computing the PH for the PHR with respect to $P_{CMAX,c}$ for each CC, the WTRU 102 may compute the $P_{CMAX,c}$ values to be used for the PH computation using the P-MPR or P-MPR,c value or values it obtained within the lookback window (e.g., the highest value or values in that window).

The values used for comparisons or triggering may be in linear form or log form.

Figure 5:
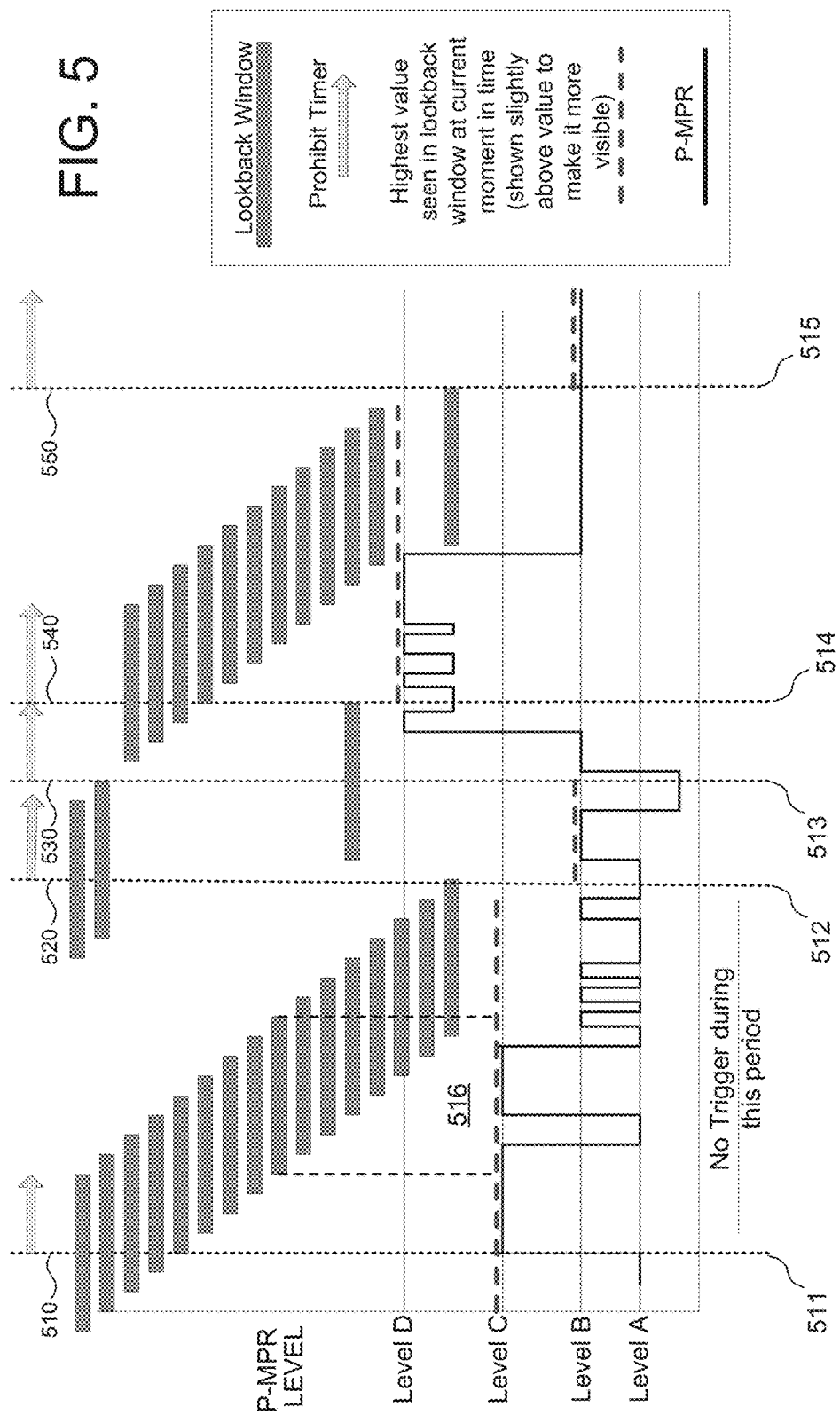
FIG. 5 is a diagram illustrating additional PHR representative triggering procedures using prohibit timers and lookback windows.
Figure 6:
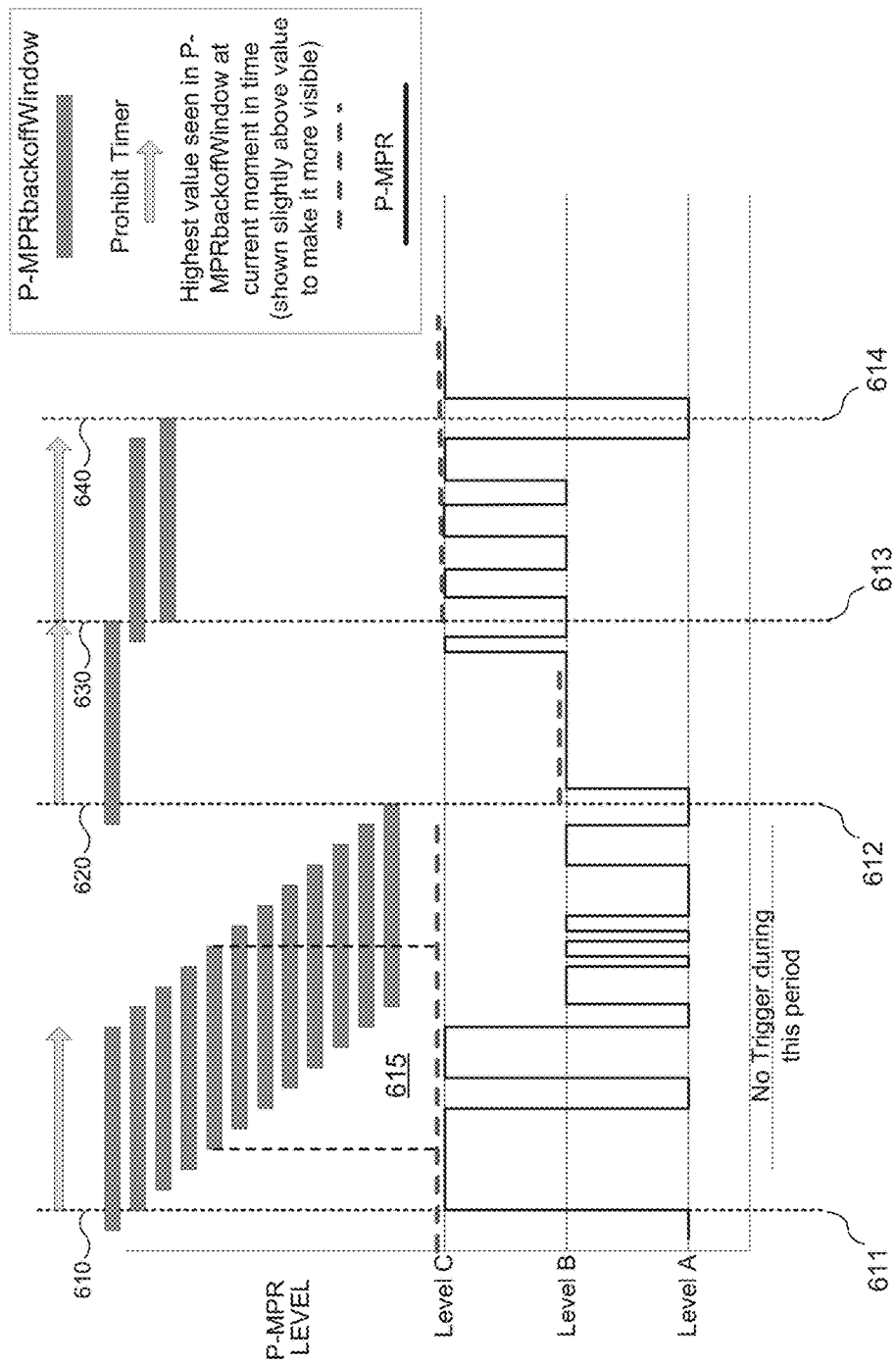
FIG. 6 is a diagram illustrating still other PHR representative triggering procedures using prohibit timers and backoff windows.

FIGS. 5 and 6 are diagrams illustrating representative triggering procedures using lookback windows (e.g., how the lookback window operates).

In certain representative procedures, reporting P-MPR or a level of P-MPR (for example P-MPR level X) may be equivalent to including in a PHR $P_{CMAX,c}$ which may include or account for P-MPR backoff which may be at, of, or have a value of level X.

Referring to FIG. 5, in representative triggering procedure 500, the WTRU 102 may monitor or determine the P-MPR, which may vary over time. At a first time 510, the PHR may be triggered based on the P-MPR being monitored (or determined) to be at level C and the P-MPR may be reported to network resources (e.g., eNB 140) in the PHR. At the first time, a prohibit timer may be set for a specified period. During the specified period until the prohibit timer expires another PHR may be prohibited from being triggered. A lookback window may be established to determine a condition associated with the P-MPR during the lookback window. The condition may include one or more of: (1) the highest value of P-MPR in the lookback window; (2) the worst value of the P-MPR in the lookback window; and/or (3) the lowest value of P-MPR in the lookback window; among many others previously described above. The WTRU 102 may determine a value associated with a current interval (e.g., the current TTI) based on the condition. For example, during a first interval (e.g., associated with a TTI) which may correspond to (for example begin at) a first time 510, an associated lookback window may have a highest P-MPR in the lookback window which is at level C. Based on the determination that the level C P-MPR value corresponds to the first interval, the WTRU 102 may determine that the P-MPR has changed more than a threshold or the P-MPR dominates and/or other triggering criteria is satisfied and may send a PHR.

At a second time 520, after the prohibit timer has expired, and the lookback window no longer includes P-MPR values at level C, the highest P-MPR value in the lookback window associated with the second time 520 is at level B. The WTRU 102 may trigger a PHR due to the change in P-MPR from level C to level B, for example, because the P-MPR may no longer dominate or the change may be larger than a threshold. After each triggering event the prohibit timer may be set for a specified time.

At a third time 530, after the prohibit timer expires, the P-MPR value may change to below level A and a pathloss trigger may occur and the WTRU 102 may report level B based on the highest P-MPR value corresponding to the lookback window instead of the actual level below level A.

At a fourth time 540, just after the prohibit timer expires, the value of P-MPR may be between level C and level D, having increased to level D during the time when PHR was prohibited and then decreasing to between level C and D. The WTRU 102 may trigger a PHR due to P-MPR dominating and/or changing by a threshold amount (compared with the previously reported level B) and the WTRU 102 may report P-MPR level D based on the highest P-MPR value corresponding to the lookback window instead of the actual level between levels C and D. Another prohibit timer may be set for a specified time.

At a fifth time 550, after the prohibit timer expires, the value of P-MPR may be at level B, having decreased to level B during the time when PHR was prohibited and remaining at level B. When the value of P-MPR has been at level B sufficiently long such that the value corresponding to the lookback window is at level B, which occurs at time 550, the WTRU 102 may trigger a PHR due to P-MPR dominating and/or changing by a threshold amount and may report P-MPR level B.

In certain representative embodiments, the WTRU 102 may first determine whether changes related to the P-MPR may be used as triggering criteria. This determination may be based on whether or not P-MPR is the dominating factor in (i.e., whether it has an effect on) the calculation of the $P_{CMAX}$ (or $P_{CMAX,c}$). If there are multiple CCs, each of these determinations may be done separately for each CC.

If the P-MPR was not the dominating factor when the last PHR was sent and is not the dominating factor now (e.g., in this TTI), it may not be useful to report PHR for changes related to P-MPR greater than a configured threshold. The WTRU 102 may skip the procedure for determining whether to trigger PHR based on changes related to the P-MPR. If there are multiple CCs, each of these determinations (e.g., of which factor dominates or whether to trigger PHR) may be done separately for each CC. The WTRU 102 may skip the procedure for determining whether to trigger PHR based on changes related to the P-MPR for any CC for which this is true (e.g., for any CC for which the P-MPR, or P-MPR,c, was not the dominating factor when the last PHR was sent and is not the dominating factor now).

If the P-MPR was not the dominating factor when the last PHR was sent but is the dominating factor now (e.g., in this TTI), then it may be useful to report the PHR for changes related to P-MPR greater than a configured threshold. The WTRU 102 may apply the procedure for determining whether to trigger the PHR based on changes related to the P-MPR. If there are multiple CCs, each of these determinations (e.g., of which factor dominates) may be done separately for each CC, the application of the procedure to determine whether to trigger PHR may be done separately for each CC, and P-MPR,c may be used instead of P-MPR.

If the P-MPR was the dominating factor when the last PHR was sent and continues to be the dominating factor now (e.g., in this TTI), then it may be useful to report the PHR for changes related to the P-MPR greater than a configured threshold. The WTRU 102 may apply the procedure for determining whether to trigger the PHR based on changes related to the P-MPR. If there are multiple CCs, each of these determinations (e.g., of which factor dominates) may be done separately for each CC, the application of the procedure to determine whether to trigger PHR may be done separately for each CC, and P-MPR,c may be used instead of P-MPR.

In certain representative embodiments, representative MAC procedures may include a PHR trigger, which may use the lookback window.

For example, a prohibitPHR-Timer may be implemented. A PHR may be reported if the prohibitPHR-Timer expires or has expired or may expire or may have expired and the highest additional power backoff due to power management (as allowed by P-MPR) during the backoff window (e.g., P-MPRbackoffWindow) for at least one activated Serving Cell with configured uplink has changed or may have changed more than a threshold (e.g., dl-PathlossChange dB) since the last transmission of a PHR when the WTRU 102 has or may have UL resources for new transmission.

The P-MPRbackoffWindow may specify the number of consecutive subframes during which the WTRU 102 determines the highest additional power backoff due to power management (as allowed by P-MPR). Alternatively, a P-MPRbackoffWindow may specify the number of subframes during which the WTRU 102 may determine the highest additional power backoff due to power management (as allowed by P-MPR). In a second alternative, the P-MPR-backoffWindow may specify the number of uplink subframes during which the WTRU 102 may determine the highest additional power backoff due to power management (as allowed by P-MPR). In a third alternative, a P-MPR-backoffWindow may specify the number of consecutive uplink subframes during which the WTRU 102 may determine the highest additional power backoff due to power management (as allowed by P-MPR).

The Extended Power Headroom MAC Control Element (CE) may include a $P_{CMAX,c}$ field which may be defined as follows. $P_{CMAX,c}$: This field contains or may include the $P_{CMAX,c}$ used for calculation of the preceding PH field. The calculation of $P_{CMAX,c}$ takes into account or may take into account the highest additional power backoff due to power management (as allowed by P-MPR) during the P-MPR-backoffWindow.

The threshold used for comparison above, identified as dl-PathlossChange, may be a different configurable threshold such as one specified for this purpose.

FIG. 6 shows, for example, the use of a lookback window, for example P-MPRbackoffWindow. In this example, the P-MPR backoff trigger may be based on the highest P-MPR value during a time period preceding the trigger (e.g., P-MPRbackoffWindow).

Referring to FIG. 6, in representative triggering procedure 600, the WTRU 102 may monitor or determine the P-MPR, which may vary over time. At a first time 610, the PHR may be triggered based on the P-MPR being monitored (or determined) to be at level C and the P-MPR may be reported to network resources (e.g., eNB 140) in the PHR. At the first time, a prohibit timer may be set for a specified period. During the specified period until the prohibit timer expires another PHR may be prohibited from being triggered. A lookback window may be established to determine a condition associated with the P-MPR during the lookback window. The condition may include one or more of: (1) the highest value of P-MPR in the lookback window; (2) the worst value of the P-MPR in the lookback window; and/or (3) the lowest value of P-MPR in the lookback window; among many others previously described above. The WTRU 102 may determine a value associated with a current interval (e.g., current TTI) based on the condition. For example, during a first interval (e.g., associated with a TTI) which may correspond to (for example begin at) a first time 610, an associated lookback window (e.g., P-MPRbackoffWindow) may have a highest P-MPR in the lookback window which is at level C. Based on the determination that the level C P-MPR value corresponds to the first interval, the WTRU 102 may determine that the P-MPR has changed more than a threshold or the P-MPR dominates and/or other triggering criteria is satisfied and may send a PHR.

At a second time 620, after the prohibit timer has expired, and the lookback window no longer includes P-MPR values at level C, the highest P-MPR value in the lookback window associated with the second time 620 is at level B. The WTRU 102 may trigger a PHR due to the change in P-MPR from level C to level B, for example because the P-MPR may no longer dominate or the change may be larger than a threshold. After each triggering event the prohibit timer may be set for a specified time.

At a third time 630, just after the prohibit timer expires, the value of P-MPR may be at level B, having increased to level C for a short period of time during the time when PHR was prohibited and then decreasing to level B. Based on level C which is the highest P-MPR value corresponding to the lookback window, the WTRU 102 may trigger a PHR due to P-MPR dominating and/or changing by a threshold amount (compared with the previously reported level B) and the WTRU 102 may report P-MPR level C instead of the actual level B. Another prohibit timer may be set for a specified time.

At a fourth time 640, after the prohibit timer expires, the P-MPR value may be at level A and a pathloss trigger may occur and the WTRU 102 may report level C based on the highest P-MPR value corresponding to the lookback window instead of level A.

In certain representative embodiments, if the prohibit-PHR-Timer is not running and the highest value of P-MPR backoff during the P-MPRbackoffWindow increases or decreases more than dl-PathLossChange dB since the last PHR, PHR is triggered and this largest P-MPR backoff value is used in the $P_{CMAX,c}$ calculation.

Certain representative procedures may restrict or prevent PHR triggering when P-MPR backoff may decrease for a short time (for example, a spike-down in backoff which may result in a spike-up in allowed or configured maximum output power) while allowing for fast triggering when the P-MPR backoff increases (for example, a spike-up in backoff which may result in a spike-down in allowed or configured maximum output power). The representative procedures may ensure that the $P_{CMAX,c}$ value for a PHR is not based on an occasional or temporary backoff value (e.g., low backoff value) to avoid scheduling grants that exceed the available WTRU transmit power.

In certain representative embodiments, representative procedures may be implemented using modified Time-to-Trigger (TTT).

A TTT reporting delay may be applied when determining whether to trigger PHR when P-MPR (e.g., the amount of power management based backoff) is reduced by more than a threshold since the last PHR was sent. It is contemplated that use of this delay may prevent excessive triggers due to intermittent drops in P-MPR, but allow increases in P-MPR to trigger PHR without waiting (e.g., except for waiting due to the prohibit timer). Once the TTT timer is started, if the criteria (e.g., the P-MPR having dropped by more than a threshold) is met for the duration of the TTT timer, the PHR may be triggered when the TTT timer expires. The PHR may be sent using the current value of $P_{CMAX,c}$ for each CC at the time of the PHR triggering.

The above procedure may not work as well in cases in which during the TTT time period, the P-MPR fluctuates while the drop in the P-MPR continues to be below a threshold. The PH report may use the P-MPR value that happens at the time of the trigger and that value may not be representative of the P-MPR. For example, if at the moment of TTT expiration the P-MPR fluctuates down and the WTRU 102 sends a PHR based on that P-MPR, then the eNB 140 may schedule UL grants using more power than available when the P-MPR fluctuates back up.

In certain representative embodiments, a modified version of the TTT procedure may be implemented. The WTRU 102 may take one or more of the following actions.

When the WTRU 102 triggers and reports the PHR as a result of reduced P-MPR TTT expiry, the WTRU 102 may use the highest P-MPR value (e.g., the value resulting in the most power reduction) during a preceding time period, which may be equal to, for example: (1) the TTT timer length; (2) the prohibit timer length, or (3) another window of time such as a lookback window, in the calculation of the $P_{CMAX,c}$ it uses for the PHR. The WTRU 102 may use the P-MPR value for the calculation of the $P_{CMAX,c}$ value it reports for each CC in the PHR. The WTRU 102 may use the P-MPR value for the calculation of the $P_{CMAX,c}$ value it uses in the computation of the PH it reports in the PHR for each CC. This may be applicable to Type 1 (PUSCH) and/or Type 2 (PUSCH+PUCCH) PH. If there are multiple CCs, the calculation may be done separately for each CC and the P-MPR may be the P-MPR,c for each CC.

When the WTRU 102 triggers and reports PHR for another triggering event such as a change in pathloss, reconfiguration, SCell activation, and/or periodic PHR report, among others, the WTRU 102 may use the highest P-MPR value (e.g., the value resulting in the most power reduction), during a preceding time period, which may be equal to: (1) the TTT timer length; (2) the prohibit timer length; or (3) another window of time such as a lookback window, in the calculation of the $P_{CMAX,c}$ it uses for the PHR. The WTRU 102 may use the P-MPR value for the calculation of the $P_{CMAX,c}$ value it reports for each CC in the PHR. The WTRU 102 may use the P-MPR value for the calculation of the $P_{CMAX,c}$ value it uses in the computation of the PH it reports in the PHR for each CC. This may be applicable to Type 1 (PUSCH) and/or Type 2 (PUSCH+PUCCH) PH. If there are multiple CCs, the calculation may be done separately for each CC and the P-MPR may be P-MPR,c for each CC.

As an alternative to using the highest P-MPR value in the window, the WTRU 102 may use another value in the window or a value computed based on the values in the window, such as an average value, median value or these values excluding extreme high or low values over a preceding time period.

As an alternative to (or in addition to) using a drop in the P-MPR since the last PHR being greater than a threshold, as the criteria for initiating the TTT, the WTRU 102 may use the change, such as an increase or a decrease, in impact of P-MPR on the $P_{CMAX}$ or the $P_{CMAX,c}$ since the last PHR being greater than a threshold, as the criteria for initiating the TTT. If there are multiple CCs, this may be done separately for each CC. The P-MPR may be P-MPR,c for each CC. The WTRU 102 may initiate the TTT if the criteria is met for at least one CC.

As an alternative to (or in addition to) maintaining a drop in the P-MPR since the last PHR that is greater than a threshold for the duration of the TTT time, as the criteria for triggering the PHR, the WTRU 102 may use maintaining a change, such as an increase or a decrease in impact of the P-MPR on $P_{CMAX}$ or $P_{CMAX,c}$ since the last PHR that is greater than a threshold as the criteria for triggering the PHR. If there are multiple CCs, this may be done separately for each CC. The P-MPR may be P-MPR,c for each CC. The WTRU 102 may trigger the PHR if the criteria is met for at least one CC.

As an alternative to (or in addition to) using a drop in the P-MPR since the last PHR being greater than a threshold, as the criteria for initiating the TTT, the WTRU 102 may use the increase in the $P_{CMAX}$ or the $P_{CMAX,c}$ since the last PHR being greater than a threshold, as the criteria for initiating the TTT. If there are multiple CCs, this may be done separately for each CC. The P-MPR may be the P-MPR,c for each CC. The WTRU 102 may initiate the TTT if the criteria is met for at least one CC.

As an alternative to (or in addition to) maintaining a drop in the P-MPR since the last PHR that is greater than a threshold for the duration of the TTT time, as the criteria for triggering the PHR, the WTRU 102 may use maintaining an increase in the $P_{CMAX}$ or the $P_{CMAX,c}$ since the last PHR that is greater than a threshold, as the criteria for triggering the PHR. If there are multiple CCs, this may be done separately for each CC. The P-MPR may be the P-MPR,c for each CC. The WTRU 102 may trigger PHR if the criteria is met for at least one CC.

The WTRU 102 may use the chosen the P-MPR (or PMPR,c) value or values in its power calculations (for example PH and/or $P_{CMAX}$ and/or $P_{CMAX,c}$ calculations) as described previously regarding, for example, the lookback windows and as described later.

Figure 7:
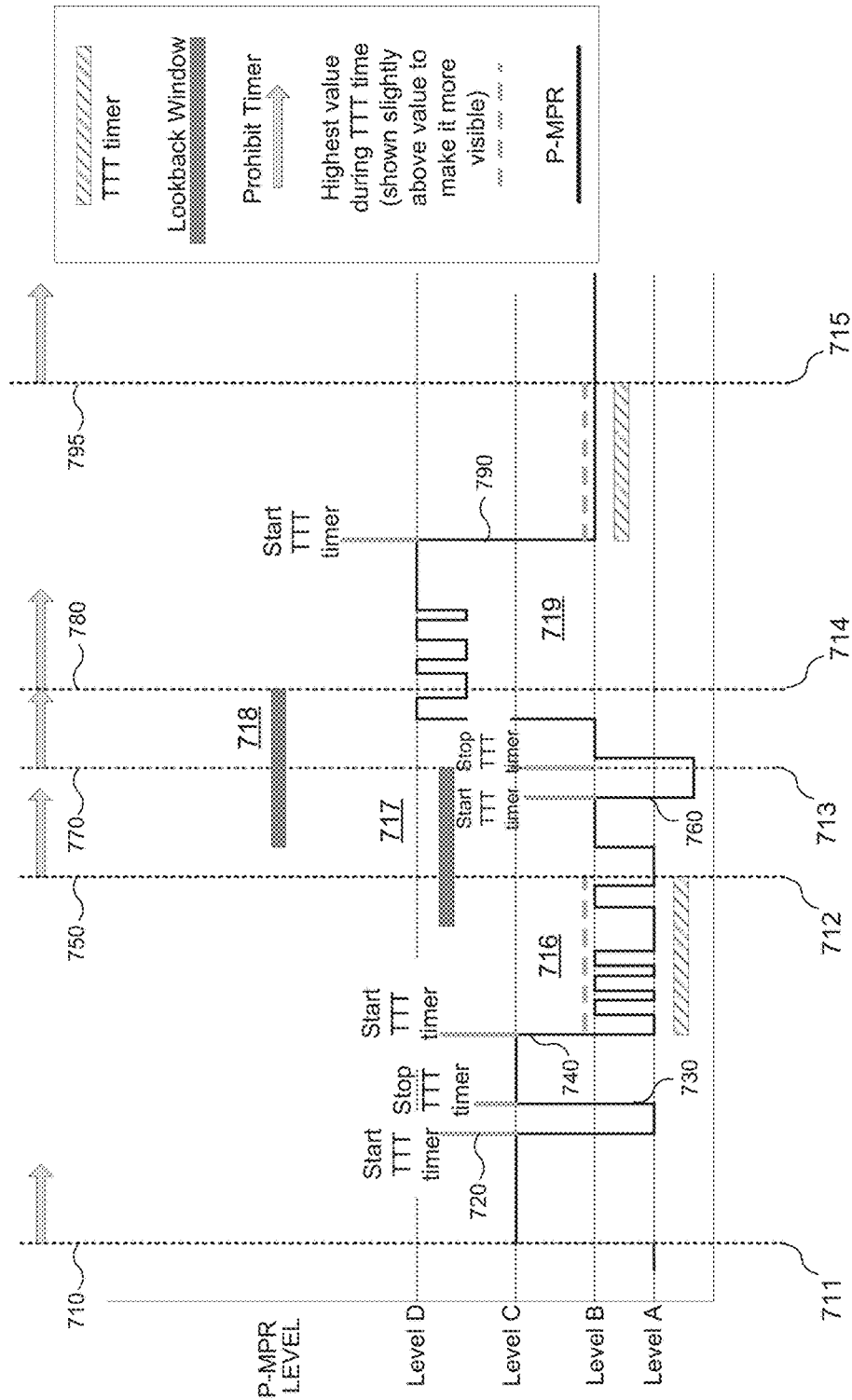
FIG. 7 is a diagram illustrating still further PHR representative triggering procedures using time-to-trigger timers.

FIG. 7 is a diagram illustrating a representative triggering procedure 700 using a modified TTT for the PHR.

In certain representative procedures reporting P-MPR or a level of P-MPR (for example P-MPR level X) may be equivalent to including in a PHR $P_{CMAX,c}$ which may include or account for P-MPR backoff which may be at, of, or have a value of level X Referring to FIG. 7, in the representative triggering procedure 700, the WTRU 102 may monitor or determine the P-MPR, which may vary over time. At a first time 710, the PHR may be triggered based on the P-MPR being monitored (or determined) to be at level C and the P-MPR may be reported to network resources (e.g., eNB 140) in the PHR. At the first time 710, a prohibit timer may be set for a specified period. During the specified period until the prohibit timer expires another PHR may be prohibited from being triggered.

At a second time 720, the P-MPR value may drop from level C to level A and that may start the TTT timer. At a third time 730, the P-MPR may increase from level A to level C and the TTT timer may be stopped. Because the TTT timer may not have expired, no PHR trigger occurs. At a fourth time 740, the P-MPR value may drop from level C to level A which may start the TTT timer. The P-MPR may vary (e.g., be bursty) between levels A and B for the duration of the TTT time (e.g., which may not stop the TTT timer because the change in P-MPR may not exceed a threshold). Responsive to the TTT timer expiring, at a fifth time 750, the WTRU may trigger the PHR reporting and include in the PHR, the level of the P-MPR at, for example, the highest level in the P-MPR TTT window (e.g., level B) and a prohibit timer may be set for a specified period. At a sixth time 760, the TTT timer may start (e.g., based on a drop in the P-MPR value from level B to below level A).

At a seventh time 770, after the prohibit timer expires, the level of the P-MPR was maintained at below level A. The WTRU 102 may trigger a PHR for a reason other than P-MPR such as a significant pathloss change and may report P-MPR at the level associated with a value (for example, a highest value, e.g., level B) associated with a lookback window for the seventh time 770. The TTT timer may also be stopped, responsive to the pathloss trigger and a prohibit timer may be set for a specified period.

At an eighth time 780, after the prohibit timer expires, the level of the P-MPR has changed to a level between levels C and D such that a PHR may be triggered reporting a P-MPR level D based on the value (e.g., highest value) associated with the corresponding lookback window. It is contemplated that the drops associated with the downward spikes in the P-MPR value after the eighth time 780 do not exceed the threshold for starting the TTT timer. At the eighth time 780 a prohibit timer may be set for a specified period At a ninth time 790, which is after the prohibit timer expires, the level of the P-MPR has changed from the level D to a level B such that the TTT timer may start and at a tenth time 795, a PHR may be triggered reporting P-MPR level B based on the value (e.g., highest value) associated with the corresponding P-MPR TTT window.

Variations on the representative procedure above may include one or more of the following.

The WTRU 102 may first determine whether changes related to the P-MPR may be used as triggering criteria. The determination may be based on whether or not the P-MPR is the dominating factor in (e.g., whether it has an effect on) the calculation of $P_{CMAX}$ (or $P_{CMAX,c}$). If there are multiple CCs, each of the determinations may be done separately for each CC.

If the P-MPR was not the dominating factor when the last PHR was sent and is not the dominating factor now (e.g., in this TTI), then it may not be useful to report the PHR for changes related to the P-MPR and the WTRU 102 may skip the procedure for determining whether to trigger the PHR based on changes related to the P-MPR. If there are multiple CCs, each of these determinations (e.g., of which factor dominates or whether to trigger PHR) may be done separately for each CC. The WTRU 102 may skip the procedure for determining whether to trigger the PHR based on changes related to the P-MPR for any CC for which the conditions are true (e.g., for any CC for which the P-MPR, or P-MPR,c, was not the dominating factor when the last PHR was sent and is not the dominating factor now).

If the P-MPR was not the dominating factor when the last PHR was sent and is not the dominating factor now (e.g., in this TTI), then it may not be useful to report the PHR for changes related to the P-MPR and the WTRU 102 may skip the procedure for initiating the TTT timer based on changes related to P-MPR. If there are multiple CCs, each of these determinations (e.g., of which factor dominates or whether to initiate the TTT timer) may be done separately for each CC. The WTRU 102 may skip the procedure for initiating the TTT timer based on changes related to the P-MPR (or the P-MPR,c) for any CC for which the conditions are true (e.g., for any CC for which the P-MPR, or P-MPR,c, was not the dominating factor when the last PHR was sent and is not the dominating factor now).

In certain representative embodiments, the chosen P-MPR may be used by the WTRU 102 in its power calculations.

The WTRU 102 may choose a P-MPR value to use in the calculation of PH and/or $P_{CMAX,c}$ for the PHR (e.g., the $P_{CMAX,c}$ to be included in the PHR) that is not the actual power management power backoff (e.g., backoff needed). The WTRU 102 may use a P-MPR backoff value in its power control computations in one or more of the following ways where the P-MPR may be replaced by the P-MPR,c in the case of multiple CCs.

In a given subframe, if the actual power management power backoff (e.g., backoff needed) is less than or equal to the P-MPR backoff value chosen for the last PHR (or the current PHR, if a PHR may be sent in this subframe), the WTRU 102 may use the chosen P-MPR as the power management power backoff value when computing $P_{CMAX,c}$ for the UL power control. The WTRU 102 may, alternatively, use the actual power management power backoff (e.g., backoff needed) when computing $P_{CMAX,c}$ for the UL power control. In the case of maximum power conditions, this (e.g., use of the actual backoff) may avoid unnecessary power clipping or scaling due to an unnecessarily high P-MPR.

In a given subframe, if the actual power management power backoff (e.g., backoff needed) is greater than the P-MPR backoff value chosen for the last PHR (or the current PHR, if a PHR may be sent in this subframe), the WTRU 102 may use this value, as the P-MPR value, when computing the $P_{CMAX,c}$ for the power control. The WTRU 102 may, alternatively, use the actual power management power backoff (e.g., backoff needed) when computing the $P_{CMAX,c}$ for the UL power control. This may be advantageous for sustained higher actual P-MPR which cannot be reported for some reason such as an active prohibit timer.

In certain representative embodiments, a triggering procedure may be implemented for triggering the PHR based on which factor dominates in the calculation of the $P_{CMAX}$ and the $P_{CMAX,c}$.

In some cases, the P-MPR (or the P-MPR,c) may have an impact on the calculation of the $P_{CMAX}$ and/or the $P_{CMAX,c}$ and in some cases it/they may not. This is also referred to as whether the P-MPR (or the P-MPR,c) dominates the value of $P_{CMAX}$ and/or $P_{CMAX,c}$. It is contemplated that even when the P-MPR (or the P-MPR,c) is at a non-zero value, the value of $P_{CMAX}$ and/or $P_{CMAX,c}$ may be unaffected if the P-MPR (or the P-MPR,c) is not dominating the calculation. The $P_{CMAX}$ may be the configured maximum output power for the WTRU 102. The $P_{CMAX,c}$ may be the configured maximum output power for a given CC. Example procedures for triggering the PHR based on which factor dominates in the calculation of the $P_{CMAX}$ and/or the $P_{CMAX,c}$ are provided.

Although specific elements of these representative procedures are described either individually or in certain combinations, it is contemplated that they may also be used in any combination with other elements described herein.

In certain representative embodiments, example procedures may be implemented in which the PHR is triggered when there is a change in which factor dominates the $P_{CMAX,c}$ calculation.

The WTRU 102 may take one or more of the following actions. The WTRU 102 may trigger the PHR when the P-MPR dominates (e.g., in the current TTI) the calculation of the $P_{CMAX,c}$ (or the $P_{CMAX}$), and did not dominate the calculation of the $P_{CMAX,c}$ (or the $P_{CMAX}$) in the last PHR. For multiple CCs, the WTRU 102 may trigger the PHR, if for any one or more CCs there is a change from the P-MPR not dominating in the last PHR to the P-MPR dominating (e.g., in the current TTI). For multiple CCs, the P-MPR may be CC specific, P-MPR,c for each CC. One or more of the prohibit, TTT, or lookback timers or windows may be used to exclude or delay the P-MPR domination triggering.

The WTRU 102 may trigger the PHR, when P-MPR does not dominate (e.g., in the current TTI) the calculation of the $P_{CMAX,c}$ (or the $P_{CMAX}$), and dominated the calculation of the $P_{CMAX,c}$ (or the $P_{CMAX}$) in the last PHR. For multiple CCs, the WTRU 102 may trigger PHR, if for any one or more CCs there is a change from the P-MPR dominating in the last PHR to the P-MPR not dominating (e.g., in the current TTI). For multiple CCs, the P-MPR may be CC specific, P-MPR,c for each CC. One or more of the prohibit, TTT, or lookback timers or windows may be used to exclude or delay the P-MPR domination triggering.

In certain representative embodiments, the WTRU 102 may determine if PHR triggering criteria has been satisfied as follows. The PHR triggering criteria may be satisfied, if the P-MPR was not the dominating $P_{CMAX,c}$ (or $P_{CMAX}$) factor in the last PHR, and is now the dominating factor and/or if the P-MPR was the dominating $P_{CMAX,c}$ (or $P_{CMAX}$) factor in the last PHR, and now is not the dominating factor.

The following calculation of the $P_{CMAX,c}$ may be used as an example to help illustrate the procedure:

$$P_{CMAX,c}(i) - \text{MIN}\{P_{EMAX,c} - \Delta T_{C,c}, P_{PowerClass} - \text{MAX}(\text{MPR}_{actual,c}, P\text{-MPR},c(i)) - \Delta T_{C,c}\} \quad \text{Equation (101)}$$

In this example, P-MPR,c may affect the value of $P_{CMAX,c}$ when P-MPR,c>MPRactual,c and $[P_{PowerClass} - \text{P-MPR},c] < P_{EMAX,c}$ When the P-MPR (used generically to represent the P-MPR or the P-MPR,c) does not dominate the calculation of the $P_{CMAX,c}$, the eNB 140 may be able to track changes in the MPR and other related factors (e.g., LTE related factors) affecting the $P_{CMAX,c}$ based on information it may have, may receive, or may control such as the $P_{CMAX,c}$ values reported in the PHR and the UL grants the eNB 140 may provide for each CC of the WTRU 102.

When the P-MPR dominates, a PHR may provide the eNB 140 with the $P_{CMAX,c}$ value. Using the example equation, $P_{CMAX,c} = P_{PowerClass} - \text{P-MPR},c(i) - \Delta T_{C,c}$ when the P-MPR dominates, if the eNB 140 knows that P-MPR is dominating (such as by an indication that the P-MPR is dominating included in the PHR as described herein), the eNB 140 may be able to determine the power management power backoff used by the WTRU 102.

FIG. 8 is a diagram illustrating representative triggering and PHR procedure 800 relating to additional power backoff domination.

Referring to FIG. 8, in the representative triggering and PHR procedure 800, at a first time 810, any trigger may have occurred (e.g., a trigger due to a significant pathloss change). The WTRU 102 may send a PHR to the eNB 140 which may include PH for the active CCs and may also include $P_{CMAX,c}$ for the CCs. The WTRU 102 may also send an indication (e.g., included in the PHR) for each CC as to whether the P-MPR is affecting the calculation of the $P_{CMAX,c}$. The prohibit timer may be set, in response to the trigger. Until the next PHR, the eNB 140 may track the MPR (which may include MPR and/or A-MPR) and estimate the PH since the MPR dominates the calculation of $P_{CMAX,c}$. At a second time 820, after the prohibit timer expires, the P-MPR value may change in value (e.g., an increase) greater than a threshold amount and the P-MPR may dominate the calculation of $P_{CMAX,c}$. The WTRU 102 may trigger the PHR due to the change in P-MPR. The eNB 140 may determine the P-MPR (which is at level B at time 820) from the PHR (e.g., from the $P_{CMAX,c}$). At a third time 830, after the prohibit timer expires, the P-MPR value may change in value (e.g., an increase) greater than a threshold amount and the MPR may have also changed (e.g., increased) and may dominate the calculation of $P_{CMAX,c}$. The WTRU 102 may trigger the PHR due to the change in P-MPR. The eNB 140 may no longer be able to determine the P-MPR (which is at level C at time 830) from the PHR (e.g., from the $P_{CMAX,c}$) since the MPR dominates the calculation of $P_{CMAX,c}$ at time 830.

At a fourth time 840, after the prohibit timer expires, the MPR value may change in value (e.g., decrease) such that the P-MPR now may dominate the calculation of $P_{CMAX,c}$. The WTRU 102 may trigger the PHR report due to the change in domination. The eNB 140 may now determine the P-MPR (which is at level C at time 840) from the PHR. Without this trigger, the eNB 140 may not know the P-MPR and may over schedule the WTRU 102.

In certain representative embodiments, a PHR trigger may be implemented when the $P_{CMAX,c}$ (or $P_{CMAX}$) dominating factor changes. For example, the trigger may be implemented when the dominating factor of the $P_{CMAX,c}$ changes from the P-MPR not dominating to the P-MPR dominating. The trigger associated with the first time 810 may be any PHR trigger such as a trigger due to a pathloss change greater than a threshold. As a result of the trigger, the WTRU 102 may send a PHR including PH values for the active CCs along with the $P_{CMAX,c}$ values for the CCs. The WTRU 102 may also send an indication (e.g., included in the PHR) for each CC as to whether the P-MPR is affecting the calculation of $P_{CMAX,c}$. In this case, P-MPR is not dominating. Until the next PHR, as long as the P-MPR continues not to dominate, the eNB 140 may schedule UL grants as if the P-MPR did not exist. If the eNB 140 tracks the MPR, the A-MPR, etc, it may estimate power headroom that it may use in its scheduling decisions.

The trigger associated with the second time 820 in this example may be due to a large change in P-MPR, (e.g., a change in P-MPR since the last PHR that is greater than a threshold). As a result of the trigger, the WTRU 102 may send a PHR including PH values for the active CCs along with the $P_{CMAX,c}$ values for the CCs. The WTRU 102 may also send an indication (e.g., included in the PHR) for each CC as to whether the P-MPR is affecting the calculation of $P_{CMAX,c}$. In this case, the P-MPR is dominating. Having $P_{CMAX,c}$ and an indication that P-MPR is dominating may enable the eNB 140 to determine the P-MPR value (e.g., level B) used by the WTRU 102.

Until the next PHR, if the eNB 140 tracks the MPR, the A-MPR, etc., it may compare the appropriate values with the P-MPR value to determine which is dominating and use either the tracked values or the P-MPR value to estimate PH, accordingly. This may be possible because the P-MPR may be known from the last PHR.

The trigger associated with the third time 830 in this example may be due to a large change in the P-MPR, (e.g., a change in P-MPR since the last PHR that is greater than a threshold). As a result of the trigger, the WTRU 102 may send a PHR including the PH values for the active CCs along with the $P_{CMAX,c}$ values for the CCs. The WTRU 102 may also send an indication (e.g., included in the PHR) for each CC as to whether the P-MPR is affecting the calculation of the $P_{CMAX,c}$. In this case, the P-MPR is not dominating. The eNB 140 now knows that the P-MPR no longer dominates, and because the P-MPR is not dominating, it cannot determine the current P-MPR value even though it changed significantly (e.g., by greater than a threshold amount).

Until the next PHR, as long as the P-MPR continues not to dominate, the eNB 140 may schedule the UL grants as if the P-MPR did not exist. If the eNB 140 tracks the MPR, the A-MPR, etc, it can estimate power headroom that it may use in its scheduling decisions.

If the situation changes and the P-MPR dominates, without a large change that may trigger a PHR, the eNB 140 may have no way of knowing that the P-MPR is dominating or the P-MPR value. The eNB 140 may over schedule the WTRU 102, which may result in power scaling at the WTRU 102.

At the fourth time 840, a trigger may be useful, due to the change to the P-MPR dominating from the P-MPR not dominating in the last PHR, to inform the eNB 140 that the P-MPR is now dominating and provide the $P_{CMAX,c}$ values which may enable the determination of the P-MPR.

Similar to the time between the second and third triggers associated with times 820 and 830, until the next PHR, if the eNB 140 tracks the MPR, the A-MPR, etc., it may compare the appropriate values with the P-MPR value to determine which is dominating and may use either the tracked values or the P-MPR value to estimate the PH, accordingly.

FIG. 9 is a diagram illustrating representative triggering and PHR procedure 900.

Referring to FIG. 9, in the representative triggering and PHR procedure 900, at a first time 910, any trigger may have occurred (e.g., a trigger due to a significant pathloss change). The WTRU 102 may send a PHR to the eNB 140 which may include PH for the active CCs and may also include $P_{CMAX,c}$ for the CCs. The WTRU 102 may also send an indication (e.g., included in the PHR) for each CC as to whether the P-MPR is affecting the calculation of the $P_{CMAX,c}$. The prohibit timer may be set, in response to the trigger. Until the next PHR, the eNB 140 may track the MPR (which may include MPR and/or A-MPR) and estimate the PH since the MPR dominates the calculation of $P_{CMAX,c}$. At a second time 920, after the prohibit timer expires, the P-MPR value may change in value (e.g., an increase) greater than a threshold amount and the P-MPR may dominate the calculation of $P_{CMAX,c}$. The WTRU 102 may trigger the PHR due to the change in P-MPR. The eNB 140 may determine the P-MPR (which is at level C at time 920) from the PHR (e.g., from the $P_{CMAX,c}$). At a third time 930, after the prohibit timer expires, the P-MPR value may change in value (e.g., a decrease) greater than a threshold amount and at that time the MPR may dominate the calculation of $P_{CMAX,c}$. The WTRU 102 may trigger the PHR due to the change in P-MPR. The eNB 140 may no longer be able to determine the P-MPR (which is at level B at time 930) from the PHR (e.g., from the $P_{CMAX,c}$) since the MPR dominates the calculation of $P_{CMAX,c}$ at time 930.

At a fourth time 940, after the prohibit timer expires, the MPR value may change in value (e.g., decrease) such that the P-MPR now may dominate the calculation of $P_{CMAX,c}$. The WTRU 102 may trigger the PHR report due to the change in domination. The eNB 140 may now determine the P-MPR (which is at level B at time 940) from the PHR. Without this trigger, the eNB 140 may not know that the P-MPR is dominating and may incorrectly schedule the WTRU 102.

In certain representative embodiments, if the trigger at the fourth time did not exist, the eNB 140 may assume that P-MPR is the same as it was when the trigger at the second time occurred. In this case, when the eNB 140 assumes the P-MPR is dominating, it may under schedule the WTRU 102 since it may assume level C continued. In other representative embodiments, if the eNB 140 assumes that the MPR is dominating (e.g., always dominating) since the last PHR indicated the MPR was dominating, then the eNB 140 may over schedule the WTRU 102 when the P-MPR does indeed dominate.

In certain representative embodiments, procedures (e.g., MAC procedures) may include a PHR trigger based on a change in $P_{CMAX,c}$ domination. A representative example PHR trigger based on $P_{CMAX,c}$ domination may be defined to occur when a prohibitPHR-Timer expires or has expired or may expire or may have expired and a field (e.g., a domination indication field or a P field) in the PHR (e.g., the MAC PHR) which may indicate that $P_{CMAX,c}$ would have had (or may have had) a different value if no additional power management had been applied has changed (or may have changed) since the last transmission of a PHR when the WTRU 102 has or may have UL resources for new transmission.

In certain representative embodiments, a determination of whether to trigger a PHR may include the use of a dominating factor.

The WTRU 102 may determine if and on what basis to trigger PHR based on one or more of the following representative procedures. The WTRU 102 may determine whether changes related to the P-MPR may be used as triggering criteria. This determination may be based on whether or not the P-MPR is the dominating factor in (e.g., whether it has an effect on) the calculation of the $P_{CMAX,c}$ (or the $P_{CMAX}$). If there are multiple CCs, each of these determinations may be done separately for each CC. The P-MPR may be the P-MPR,c for each CC.

If the P-MPR was not the dominating factor when the last PHR was sent and is not the dominating factor now (e.g., in the current TTI), then it may not be useful to report the PHR for changes related to the P-MPR (e.g., when the P-MPR changes by more than a threshold). The WTRU 102 may skip the procedure for determining whether to trigger the PHR based on changes related to the P-MPR. If there are multiple CCs, each of these determinations (e.g., which factor dominates or whether to trigger PHR) may be done separately for each CC. The WTRU 102 may skip the procedure for determining whether to trigger the PHR based on changes related to the P-MPR for any CC for which the conditions are true (e.g., for any CC for which the P-MPR, or P-MPR,c, was not the dominating factor when the last PHR was sent and is not the dominating factor now). The P-MPR may be the P-MPR,c for each CC.

In certain representative embodiments, the $P_{CMAX}$ value in the PHR may support inter-band UL transmission. It is contemplated that the CC and the serving cell may be used interchangeably and the TTI may be substituted for the subframe and still be consistent with these embodiments.

The $P_{CMAX}$ may be the WTRU's total configured maximum output power. If the sum of the WTRU 102 computed powers for the UL CCs without scaling would or is to exceed the $P_{CMAX}$, the WTRU 102 may scale the CC powers before transmission to avoid exceeding its maximum power. Sending the $P_{CMAX}$ in the PHR may be useful to the eNB scheduler to enable the eNB scheduler to determine if the WTRU 102 scaled CC powers and, if so, by how much. It is contemplated that for the case of intra-band UL, the eNB 140 may be able to determine or estimate the $P_{CMAX}$ from the $P_{CMAX,c}$ and may not be able to determine or estimate the $P_{CMAX}$ from the $P_{CMAX,c}$ for inter-band UL.

In certain representative embodiments, $P_{CMAX}$ may be sent by the WTRU 102 in the PHR (e.g., always including $P_{CMAX}$ in the PHR or including it in an Extended PHR report, for example only for Release 11 and/or later Release WTRUs 102). If the WTRU 102 is always sending $P_{CMAX}$ in the PHR, unnecessary or not useful signaling may occur when $P_{CMAX}$ may be determined based on other signaled parameters. It may be useful to send (e.g., only send) $P_{CMAX}$ in the PHR when it is useful or needed which may reduce signaling overhead.

The following are representative procedures for reducing the PHR signaling by including $P_{CMAX}$ in the PHR when (e.g., only when) certain criteria are met.

The WTRU 102 may include the $P_{CMAX}$ in the PHR, which may be in the Extended PHR MAC CE, based on one or more of the following criteria being met (or satisfied).

A first criteria may include a configuration criteria, which may be satisfied if the WTRU 102 is configured for inter-band UL (e.g., the WTRU 102 is configured with at least one UL CC in each of at least two bands, for example 800 MHz band and 2.1 GHz band).

A second criteria may include an activated/CC criteria, which may be satisfied if the PHR includes (or will or is to include) reports for CCs in at least two bands which may, for example, mean that, or be such that (1) there may be at least one activated CC in each of at least two bands for which a PH is included (or will be or is to be included) in the PHR and the PH for each of those CCs may be real or virtual; and/or (2) there may be at least one CC in each of at least two bands for which the PH is included (or will be or is to be included) in the PHR and the PH for each of those CCs may be real or virtual, among others.

A third criteria may include a real PH criteria, which may be satisfied if the PHR includes (or will or is to include) real PH for CCs in at least two bands which may, for example mean that, or be such that (1) a V-bit may indicate real PH for at least one CC in each of at least 2 bands; and/or (2) the $P_{CMAX,c}$ may be (or will be or is to be) included in the PHR for at least one CC in each of at least 2 bands; and/or (3) for at least one CC in each of at least 2 bands, there may be UL resources (e.g., PUSCH and/or PUCCH) in the subframe for which (or in which) the PHR is being reported; and/or (4) for at least one CC in each of at least 2 bands, there may be UL resources allocated in the subframe for which (or in which) the PHR is being reported where UL resources may be allocated by UL grant or by configured Semi-Persistent Scheduling (SPS) and such allocations may result in a PUSCH transmission; and/or (5) for at least one CC in each of at least 2 bands, there may be UL resources allocated or a PUCCH transmission in the subframe for which (or in which) the PHR is being reported where UL resources may be allocated by UL grant or by configured SPS and may result in a PUSCH transmission, among others.

A fourth criteria may include a scaling criteria, which may be satisfied if in the subframe for which (or in which) the PHR is being reported, the WTRU 102 scales or may scale one or more of the CC (or CC channel) powers it computed, for example, because the sum of the CC computed powers would or is to exceed the overall allowed power for the WTRU 102, which may be the WTRU total configured maximum output power, $P_{CMAX}$.

It is contemplated that the third criteria may be a subset of the second criteria and the second criteria may be a subset of the first criteria for the case in which a CC with real PH is also an activated CC and an activated CC is also a configured CC. In this case, non-redundant criteria may include each of the first, second, third, and fourth criteria alone and the combinations of the first and fourth, second and fourth, and third and fourth criteria, for example.

The following are examples of how a WTRU 102 may determine whether to include the $P_{CMAX}$ in the PHR the WTRU 102 may send, and how an eNB 140 may determine if the $P_{CMAX}$ is present in a PHR the eNB 140 may receive.

In certain representative examples, the WTRU 102 may include (e.g., only include) the $P_{CMAX}$ in the PHR if both the third criteria and the fourth criteria are met such that in the subframe of the PHR, there is at least one CC in each of at least 2 bands for which a real PH is being included in the PHR and the WTRU 102 performed scaling to not exceed its maximum power, (e.g., which may be $P_{CMAX}$).

In other representative examples, the WTRU 102 may include (e.g., only include) the $P_{CMAX}$ in the PHR if the second criteria is met such that in the subframe of the PHR, there is (e.g., based on what the WTRU 102 knows or determines) at least one activated CC in each of at least 2 bands and for each of those CCs the reported PH may be real or virtual.

In further representative examples, since the PHR may include a bitmap indicating the CCs which are both configured and activated and for which the PH is included, and the eNB 140 knows which CCs are in each band (e.g., since the eNB 140 may configure the CCs), the eNB 140 may use the PHR MAC-CE bitmap which may identify for which CCs the PH is included to determine whether the PH is included for CCs in more than one band. If the criteria for including the $P_{CMAX}$ is the second criteria, the eNB 140 may know enough information to determine if the $P_{CMAX}$ is present in the PHR.

In yet other representative examples, the eNB 140 may use the bitmap to determine which CCs may be included in the PHR and the V-bit associated with each PH to determine which CCs have real PH to determine whether there are real PH values for CCs in different bands in the PHR. If the criteria for including $P_{CMAX}$ is the third criteria, which may be met (e.g., may only be met) if the first and second criteria are also met, if the eNB 140 finds V-bits indicating real PH for CCs in each of at least two different bands, the eNB 140 may have enough information (e.g., from the V-bits) to determine if the $P_{CMAX}$ is present in the PHR.

If the criteria for including $P_{CMAX}$ is the fourth criteria alone or combined with any of the other criteria, the eNB 140 may not have sufficient information to determine if the $P_{CMAX}$ is included in the PHR.

In certain representative embodiments, the WTRU 102 may include one or more of the following in the PHR.

(1) An indication as to whether the WTRU 102 performed scaling when computing output power, which may provide an indication as to whether the WTRU 102 scaled one or more of the computed CC (or CC channel) powers, (e.g., to avoid the situation of exceeding the WTRU maximum allowed transmit power that may be the WTRU total configured maximum output power, $P_{CMAX}$). The indication may be a bit and may use a reserved (or unused) bit in the MAC CE such as the reserved bit in the first octet of the PHR that identifies 7 of the bits to be used for indicating CCs included in the PHR and one bit as a reserved bit. The indication, e.g., bit, may be used to indicate if the $P_{CMAX}$ is present in the PHR. For example if the criteria for including the $P_{CMAX}$ is the third and fourth criteria, the eNB 140 may use the bitmap indicating the CCs to know if there are CCs in the PHR that are in different bands, the V-bits to determine if the PH for CCs in at least 2 bands are real, and the scaling bit to know if scaling occurred. If all of these criteria are met, the eNB 140 may expect the $P_{CMAX}$ in the headroom. The WTRU 102 may set the indication, e.g., the bit, to the state indicating scaling whenever the WTRU 102 performed scaling in the subframe for which (or in which) the PHR is sent. The WTRU 102 may set the indication, e.g., the bit, to the state indicating scaling (and/or the $P_{CMAX}$ included) when one or more criteria for including the $P_{CMAX}$ has been met and the WTRU 102 performed scaling in the subframe for which (or in which) the PHR is sent.

(2) An indication as to whether the $P_{CMAX}$ is included in the PHR, e.g., a presence indicator, for example which may be a single bit in the PHR and may be in addition to (or in lieu of) the scaling indication. The presence indication may use a reserved (or unused) bit in the MAC CE such as the reserved bit in the first octet of the PHR that identifies 7 of the bits to be used for indicating CCs included in the PHR and a reserved 8th bit. The WTRU 102 may set the bit to indicate that $P_{CMAX}$ is present when the appropriate criteria such as one or more of those described above are met.

Although providing an indication of $P_{CMAX}$ in the PHR is disclosed for inter-band type operations, it is contemplated that it may be used for other situations than inter-band, such as non-contiguous intra-band or even contiguous intra-band CA, and may provide useful information. One or more of the criteria for including the $P_{CMAX}$ (e.g., which are based on having CCs in multiple bands) may be applied in the case of non-contiguous intra-band and/or contiguous intra-band operations. Criteria relating to CCs in different bands may be extended to criteria relating to CCs in different scenarios of other types such as CCs with different carrier frequencies, for example in the case of non-contiguous intra-band CA or CCs which are non-colocated serving cells, among others.

In other representative embodiments, radio link monitoring (RLM) may be performed (e.g., only performed) on the PCell, which may be sufficient for intra-band operation and for serving cells which are co-located (e.g., since in these cases reception quality may be similar for such cells). Performing RLM only for the PCell may not be sufficient for inter-band operation, for example, with inter-band DL and/or UL scenarios, or for the case in which cells such as those with remote radio heads (RRH) may not be co-located. RLM may be extended to SCells. The RLM may be used to determine the quality of the DL reception that may result in detection of in-sync/out-of-sync condition.

In certain representative embodiments, the RLM (or some other measurement or mechanism) may be used to determine if the pathloss measurements being made on a DL CC being used as a pathloss reference for an UL CC are of good quality and/or reliable.

If a pathloss reference is determined to be of poor quality (e.g., based on some criteria), the WTRU 102 may take one or more of the following actions. The WTRU 102 may report the problem (e.g., poor quality) in the PHR, (e.g., include a quality indicator for each CC or group of CCs where the group may be based on a band, a location (e.g., RRH), or a Timing Advance (TA) (e.g., TA group). The WTRU 102 may disable the PH triggers for a CC whose pathloss reference is poor quality (e.g., based on the RLM procedures of the associated CC or group of CC's).

In certain representative embodiments, the following events may trigger the PHR: (1) a pathloss change (e.g., exceeding a threshold and/or a significant pathloss change) on one or more CCs (e.g., any CC) used as a pathloss reference; (2) a P-MPR change (e.g., exceeding a threshold and/or a significant P-MPR change) on one or more CCs (e.g., any CC); (3) a periodic timer expires; (4) a configuration/reconfiguration of the PHR function; and/or (5) an activation of an SCell with a configured UL, among others.

When operating with co-located intra-band cells, fading in each cell may be correlated with that in other cells and the P-MPR may be the same for the cells, so the cells may operate in a similar fashion. If the pathloss or the P-MPR changes (e.g., significantly) for one CC, it is contemplated to change similarly for another. When a trigger criteria is met and the PHR is sent for CCs (e.g., all CCs) it may include the changes for CCs (e.g., all CCs) and may prohibit the PHR on CCs (e.g., all CCs) for a period of time. Treating CCs (e.g., all CCs) similarly may be reasonable for co-located intra-band cells since they may operate in a similar fashion.

When cells may be in different bands or different locations, the pathloss and the P-MPR for those cells may be uncorrelated. In this case, when triggering the PHR based on criteria being met for one CC, it may or may not be that the trigger criteria is met for another CC in another band or location. If the PHR is sent as a result of meeting the triggering criteria for a first CC, the prohibit timer may be restarted. If during the prohibited time (e.g., the time until the prohibit timer expires), a trigger criteria was met for another CC, a report including the change that resulted in the trigger may be blocked until the prohibit timer expires. Upon timer expiry, if the trigger condition still exists, the PH may be reported (e.g., in effect delaying the report of the triggering condition). If the trigger condition no longer exists, the PH based on that triggering condition may not be reported.

In certain representative embodiments, the WTRU 102 may have multiple PHR prohibit timers such that the prohibiting effect of each timer may be (e.g., only be) for CCs associated with a respective prohibit timer.

In certain representative embodiments, CCs may be grouped based on one or more of the following: (1) UL band; (2) DL band; (3) location; (4) timing advance reference; (5) pathloss reference; and/or (6) band or location of the pathloss reference, among others. A group of CCs may include one or more CCs.

In certain representative embodiments, the WTRU 102 may have a separate PHR prohibit timer per group of CCs. For each group of CCs, the WTRU 102 may restart the PHR prohibit timer based on a PHR being triggered for the group of CCs. For example, the WTRU 102 may have one PHR prohibit timer per band, pathloss reference and/or each location (e.g., RRH). The WTRU 102 may also, or instead, have separate PHR prohibit timers based upon a different grouping of cells, for example, one prohibit timer for each TA group.

For a trigger gated by the PHR prohibit timer, such as the pathloss change trigger, the WTRU 102 may treat the trigger for CCs in different groups separately. For example, the current pathloss change trigger criteria may be satisfied when the prohibitPHR-Timer expires or has expired and the path loss has changed more than dl-PathlossChange dB for at least one activated Serving Cell which is used as a pathloss reference since the last transmission of a PHR when the WTRU 102 has UL resources for new transmission.

The pathloss change trigger may be modified to reflect one or more of the following including: (1) a CC group specific PHR prohibit timer expiry; (2) a trigger based on change of pathloss on a serving cell used by a CC in the CC group; (3) a requirement/provision for transmission of a real PHR (e.g., in the TTI in which the trigger criteria are being evaluated) for at least one CC in the CC group, which may, for example mean that, or be such that UL resources (e.g., PUSCH) are allocated, e.g., via UL grant or configured SPS, for transmission for at least one CC in the CC group and/or that there is a PUCCH to be transmitted for at least one CC in the CC group, among others; (4) a requirement/provision for UL resources for new transmission on at least one of the CCs in the group, or there are UL resources for new transmission on any CC.

Examples of a modified trigger are as follows. A first example may include a trigger when the prohibitPHR-Timer for a CC group expires or has expired and the path loss has changed more than dl-PathlossChange dB for at least one activated Serving Cell which is used as a pathloss reference for a CC in that CC group since the last transmission of a PHR when the WTRU 102 has UL resources for new transmission for a CC in that CC group. A second example may include a trigger when the prohibitPHR-Timer for a CC group expires or has expired and the path loss has changed more than dl-PathlossChange dB for at least one activated Serving Cell which is used as a pathloss reference for a CC in that CC group since the last transmission of a PHR when the WTRU 102 has UL resources allocated for transmission for a CC in that CC group and UL resources for new transmission.

In the second example, the UL resources for the new transmission may be on any CC.

In the case of UL CCs in multiple bands, it is possible that every time a PHR is sent, the PH for the CCs in one of the bands may all be virtual. To ensure the WTRU 102 at least occasionally sends a real PH for CCs in all bands in which the WTRU 102 has active UL CCs, modifications may be implemented in certain representative embodiments.

There may be one PHR periodic timer, periodicPHR-Timer, such that when it expires the PHR may be triggered and the PHR may be transmitted if any cell has UL resources for new transmission. One modification may include that for each group of CCs, the WTRU 102 may have a separate PHR periodic timer. When a PHR periodic timer expires for a CC group, the WTRU 102 may trigger the PHR and send the PHR when one or more of the following conditions are met. A first condition for triggering and sending the PHR may include that there are UL resources allocated (e.g., PUSCH) for transmission for at least one CC in the CC group. A second condition may include that there is a PUCCH to be transmitted for at least one CC in the CC group. A third condition may include that there are UL resources for new transmission on at least one of the CCs in the CC group, or there are UL resource for new transmission on any CC.

UL resources allocated for transmission may be allocated by configured SPS or via UL grant.

The WTRU 102 may restart the PHR periodic timer for a group of CCs when the WTRU 102 sends a PHR with a real PH for one or more CCs in that group.

There may be a trigger such that when a SCell with configured UL is activated, the PHR is triggered and sent by the WTRU 102 when any cell has UL resources for new transmission. If this activation is not a reactivation, the PHR may be sent with a virtual PH for the newly activated SCell (e.g., since there may be a grant on the PCell or another SCell before there has been time for the WTRU 102 to receive an UL grant for the newly activated SCell).

In the case of intra-band CA, this triggering procedure may be acceptable or applicable since at least one UL CC in the same band as the newly activated SCell had UL resources for new transmission and a real PH is to be included for at least that CC which may provide $P_{CMAX,c}$. The $P_{CMAX,c}$ for CCs in the same band are contemplated to be the same unless $P_{EMAX,c}$ is different for each, and the eNB 140 may know whether the $P_{EMAX,c}$ are the same or a different value for CCs in the same band (e.g., since the eNB 140 may configure the $P_{EMAX,c}$ values). It is contemplated the $P_{CMAX}$ may be determined from $P_{CMAX,c}$ in the same band. In the intra-band case, the eNB 140 may have sufficient information for scheduling (e.g., intelligently scheduling) the newly activated SCell.

In the case of inter-band CA, it may not be acceptable to receive virtual PH if no other CC in the band is providing $P_{CMAX,c}$ (e.g., since the $P_{CMAX,c}$ value in different bands may be unrelated).

In certain representative embodiments, the triggering and sending of the PHR based on the event of SCell activation (e.g., activation after deactivation, and/or first activation after configuration or reconfiguration, among others) may be delayed by the WTRU 102 based on certain criteria being met. The WTRU 102 may delay the triggering and sending of the PHR until there are UL resources allocated on at least one CC in the CC group of the SCell that was activated (e.g., where the group may be based on the frequency band) and/or there are UL resources for new transmission for at least one CC in that group. The WTRU 102 may delay the triggering and sending of the PHR if one or more of the following criteria is met: (1) the SCell is or may be the only UL CC, or the only CC with configured uplink, in a CC group, such as a group based on band; and/or (2) the PHR that is to be sent as a result of the activation trigger, for example in the first TTI that satisfies the activation trigger requirements, may include virtual PH for all the CCs in the group of that activated SCell; among others.

In certain representative embodiments, while still maintaining the PHR trigger upon SCell activation, the WTRU 102 may additionally trigger PHR sometime after the activation event (e.g., as soon as possible after the activation event) when there are UL resources allocated on at least one CC in the CC group of the SCell that was activated (e.g., where the group may be based on the frequency band) and/or there are UL resources for new transmission for at least one CC in that group.

A representative example of how the PHR may be delayed until a real PH may be transmitted for at least one cell in the same CC group (for example the same band) as the newly activated SCell may be to include one or more of the following trigger criteria which may be new trigger criteria or may replace the existing SCell activation trigger criteria.

For example, a trigger may occur when a SCell with configured uplink that is part of a certain CC group is or may be activated and the following conditions are satisfied (e.g., are true) in this TTI: there are UL resources allocated for transmission on a cell with a configured uplink that is in the certain CC group and the PHR has not been transmitted with the UL resources allocated for transmission on a cell with configured uplink that is in the certain CC group since the SCell was activated.

In another example, a trigger may occur when a SCell with configured uplink that is part of a certain CC group is or may be activated and the following conditions are satisfied (e.g., are true) in this TTI: There are UL resources allocated for transmission on a cell with configured uplink that is in the certain CC group and the PHR has not been transmitted with the UL resources allocated for transmission on a cell with configured uplink that are in the certain CC group since the SCell was first activated following deactivation, configuration, re-configuration, and/or since the SCell was configured or reconfigured, among others.

As discussed above, when operating with multiple bands in the UL and with multiple CCs per band, the WTRU 102 may configure a maximum output power per UL band, $P_{CMAX,b}$. If the sum of the computed powers for the CCs in band b without scaling would or is to exceed $P_{CMAX,b}$, the WTRU 102 may scale the computed powers.

The WTRU 102 may include the $P_{CMAX,b}$ in the PHR based on rules similar to those defined herein for when to include $P_{CMAX}$.

The WTRU 102 may include $P_{CMAX,b}$ in the PHR, which may be in the Extended PHR MAC CE or another PHR MAC CE. The WTRU 102 may always include $P_{CMAX,b}$ in the PHR or may include $P_{CMAX,b}$ in the PHR based on any one or more of the criteria identified for $P_{CMAX}$ above and/or based on one or more of the following criteria being met (or satisfied):

(1) A configuration criteria, which may be satisfied if the WTRU 102 is configured for inter-band UL with at least one UL CC in each of at least two bands and, for example, at least 2 UL CCs in at least one of the bands.

(2) An activated/CC criteria, which may be satisfied if the PHR includes (or will or is to include) reports for CCs in at least two bands (e.g., with reports for at least two CCs in at least one of the bands), which may, for example, mean that, or be such that (a) there may be at least one activated CC in each of at least two bands (e.g., with at least two activated CCs in at least one of the bands), for which PH is (or is to be) included in the PHR, and the PH for each of those CCs may be real or virtual; and/or (b) there may be at least one CC in each of at least two bands (e.g., with at least two CCs in at least one of the bands) for which PH is (or is to be) included in the PHR and the PH for each of those CCs may be real or virtual; among others.

(3) A real PH criteria, which may be satisfied if the PHR includes (or will or is to include) a real PH for CCs in at least two bands (e.g., with at least 2 CCs in at least one of those bands), which may, for example, mean that, or be such that (a) a V-bit may indicate real PH for at least one CC in each of at least 2 bands (and/or, e.g., for at least 2 CCs in at least one of those bands); and/or (b) the $P_{CMAX,c}$ may be (or is to be) included in the PHR for at least one the CC in each of at least 2 bands (and/or, e.g., for at least 2 CCs in at least one of those bands); and/or (c) for at least one CC in each of at least 2 bands (and/or, e.g., for at least 2 CCs in at least one of those bands), there are UL resources (e.g., PUSCH and/or PUCCH) in the subframe for which (or in which) the PHR is being reported; and/or (d) for at least one CC in each of at least 2 bands (and/or, e.g., for at least 2 CCs in at least one of those bands), there may be UL resources allocated in the subframe for which (or in which) the PHR is being reported where UL resources may be allocated by UL grant or by configured SPS and such allocation may result in a PUSCH transmission; and/or (e) for at least one CC in each of at least 2 bands (and/or, e.g., for at least 2 CCs in at least one of those bands) there may be UL resources allocated or a PUCCH transmission in the subframe for which (or in which) PHR is being reported where UL resources may be allocated by UL grant or by configured SPS and such allocation may result in a PUSCH transmission; among others.

(4) A scaling criteria, which may be satisfied if in the subframe for which (or in which) the PHR is being reported, the WTRU 102 scales or may scale one or more of the CC (or CC channel) powers it computed, for example, because the sum of the CC computed powers would or is to exceed the $P_{CMAX,b}$ for one or more of the UL bands.

An indication that scaling is applied in a particular band may be added to the PHR. The indication, which may be associated with each signaled $P_{CMAX,b}$, may be signaled. The criteria used for the presence of the band scaling indicator may be the same criteria as discussed above for the presence of $P_{CMAX,b}$.

It is contemplated that criteria (3) set forth above may be a subset of criteria (2) and criteria (2) may be a subset of criteria (1) for the case in which a CC with a real PH is an activated CC and an activated CC is a configured CC. In this case, non-redundant criteria may be each of criteria (1), criteria (2), criteria (3) and/or criteria (4) alone and the combinations, for example, of criteria (1) and (4); criteria (2) and (4), and/or criteria (3) and (4).

For one or more of the criteria above, if the criteria is met, the WTRU 102 may include the $P_{CMAX,b}$ for all UL bands in the PHR. In certain representative embodiments, the WTRU 102 may include the $P_{CMAX,b}$ for the bands (e.g., only for the bands) for which there are at least 2 CCs (e.g., UL CCs) and for example, only if one or more of the following conditions are true that: (a) those CCs have configured UL, for example for criteria (1); (b) those CCs have configured UL and are activated, for example for criteria (2); (c) the PHR may be real for those CCs in the TTI in which PHR will be sent, for example for criteria (3); and/or (d) the scaling of the computed power of one or more of those CCs (or CC channels) was useful or required because the sum of the computed powers of the CCs in the band would or is to exceed $P_{CMAX,b}$ in the TTI in which PHR may or will or is to be sent, for example for criteria (4).

If the criteria for including the $P_{CMAX,b}$ is based on criteria (4) alone or combined with any of the other criteria, the eNB 140 may not have sufficient information to determine if $P_{CMAX,b}$ is included in the PHR.

In certain representative embodiments, the WTRU 102 may include one or more of the following in the PHR: (1) an indication as to whether the WTRU 102 performed scaling on one or more CCs in a certain CC group, such as a band, when computing output power to avoid the situation of exceeding the WTRU maximum allowed transmit power for that band which may be the WTRU 102 configured maximum output power for that band, $P_{CMAX,b}$ (The indication may be a bit or other indication and may in addition to or instead be used to indicate if $P_{CMAX,b}$ is present in the PHR, for example, for a certain CC group.); and/or (2) an indication as to whether $P_{CMAX,b}$, for example, for a certain CC group, is included in the PHR, e.g., a presence indicator, for example as a single bit in the PHR and may be in addition to a scaling indication.

The band specific scaling indication may be present if the $P_{CMAX,b}$ for a given band is present in the PHR. Any of the $P_{CMAX,b}$ presence criteria discussed above may also apply to the band specific scaling indicator.

The $P_{CMAX,b}$ may provide useful information in other situations than inter-band CA, such as non-contiguous intra-band or contiguous intra-band CA. One or more of the criteria for including $P_{CMAX,b}$ that are based on having CCs in multiple bands may be equally applicable in the case of non-contiguous intra-band and/or contiguous intra-band. Criteria relating to CCs in different bands may be extended to criteria relating to CCs in different scenarios of other types such as CCs with different carrier frequencies for example in the case of non-contiguous intra-band CA or CCs which are non-colocated serving cells, among others.

FIG. 10 is a flowchart illustrating a representative PHR method 1000.

Referring to FIG. 10, the representative PHR method 1000 may manage PHR associated with a WTRU 102. At block 1010, the WTRU 102 may determine a P-MPR (e.g., sometimes referred to as P-PR) for the WTRU 102. Using one or more of the equations set forth above, at block 1020, the WTRU 102 may determine a backoff value for reducing a value of maximum transmission power for the WTRU 102. The backoff value may include any number of different factors introduced in the equations above. At block 1030, the WTRU 102 may report PH to the eNB 140 in accordance with the determined backoff value.

In certain representative embodiments, the WTRU 102 may calculate the backoff value based on the P-MPR or P-PR (e.g., when the P-MPR dominates the composite of the MPR and the A-MPR).

The WTRU 102 may select between one of the further value and the P-MPR, as a selected value and may calculate the backoff value based on the selected value.

The WTRU 102 may calculate the P-MPR based on at least a specific absorption rate (SAR) indicating a rate of absorption of radio frequency energy associated with the WTRU 102. For example, when the WTRU 102 is held close to or adjacent from a person, the specific absorption rate may increase (e.g., sharply increase) for example, based on proximity of the person to the WTRU 102. As such, the P-MPR may increase (sharply increase) and may dominate the other backoff effects such as MPR and A-MPR. In certain representative embodiments, the WTRU 102 may compare the further value (e.g., associated with the MPR and the A-MPR) to the P-MPR value to determine which is greater. Responsive to the further value being greater than the P-MPR (e.g., the first value dominating), the WTRU 102 may calculate the backoff value in accordance with the further value (e.g., using only the first value, exclusive of the P-MPR). Responsive to the further value being less than the P-MPR (e.g., the P-MPR dominating), the WTRU 102 may calculate the backoff value in accordance with the P-MPR (e.g., only the P-MPR, exclusive of the further value).

In certain representative embodiments, the WTRU 102 may determine that the further value may be based on a MPR and an A-MPR for each CC used for UL transmission by the WTRU 102 and may determine the P-MPR for each CC used for UL transmission by the WTRU 102.

The P-MPR, the backoff value and the power headroom reporting may each be associated with one of: (1) a CC associated with the WTRU 102 or (2) a composite of the CCs associated with the WTRU 102. For example, if the WTRU 102 is operating on non-contiguous frequency bands, the determinations or calculations for the P-MPR, the backoff value and/or the power headroom reporting may each be associated with one CC associated with a frequency band or the composite of the CCs associated with each of the non-contiguous frequency bands for inter-band operations. In certain representative embodiments, the reporting of the PH may include sending, for each carrier component, a PHR associated therewith or sending one PHR (e.g., a composite report) including PH values associated with each carrier component.

In certain representative embodiments, the WTRU 102 may calculate the backoff value as a the maximum of: (1) the further value (e.g., and optionally another value) and (2) the P-MPR.

The WTRU 102 may calculate the backoff value using one of: a first procedure for an inter-band uplink (UL) transmission or a second procedure for an intra-band UL transmission. For example, the procedures for calculating backoff for inter-band UL transmission by the WTRU 102 may be different from procedures for calculating backoff for intra-band UL transmission.

In certain representative embodiments, on a condition that the sum of the WTRU computed powers for the UL CCs without scaling (e.g., any scaling) is to exceed (e.g., is going to exceed) a maximum transmission power limit, the WTRU 102 may indicate to the eNB 140 that the WTRU 102 has scaled the CC powers before transmission to avoid exceeding the maximum transmission power limit. The WTRU 102 may also scale the CC powers in accordance with the indication to the eNB 140.

In certain representative embodiments, such as those used with multiple CCs, the WTRU 102 may generate a PHR having at least two PH values associated with CCs in at least two frequency bands. The PH values may include PH values associated with real transmissions for the at least two frequency bands.

In certain representative embodiments, the WTRU 102 may indicate in the PHR whether the WTRU 102 performed scaling when computing output power (e.g., by a scaling bit or scaling flag).

FIG. 11 is a flowchart illustrating another representative PHR method 1100

Referring to FIG. 11, the representative PHR method 1100 may report a WTRU status. At block 1110, the WTRU 102 may determine whether the WTRU 102 applies a power backoff based on a P-MPR for the WTRU 102. At block 1120, the WTRU may report to a network resource (e.g., the eNB 140) that the WTRU 102 has applied the power backoff based on the P-MPR. The WTRU 102 may also set a domination indicator when the power backoff is based on the P-MPR and may report or send the domination indicator to the network resource. The domination indicator may be in a PHR included in a media access controller (MAC) control element (CE) sent to the network resource. A domination indicator may be set for each component carrier impacted by its associated P-MPR and/or a single (e.g., overall/composite) domination indicator may be associated with the WTRU 102.

In certain representative embodiments, the WTRU 102 may change the domination indicator to: (1) a first logic level responsive to the power backoff being impacted by the P-MPR; or (2) a second logic level responsive to the power backoff not being impacted by the P-MPR.

FIG. 12 is a flowchart illustrating a further representative PHR method 1200

Referring to FIG. 12, the representative PHR method 1200 may manage PHRs associated with a WTRU 102. At block 1210, the WTRU 102 may determine whether a real power transmission may occur for a CC at a first period (e.g., the current period or current TTI period). At block 1220 the WTRU may determine a previous period when a real transmission occurred for the CC (e.g., when the CC had UL resources for a UL transmission) At block 1230, the WTRU 102 may compare the P-MPR (or P-PR) of the CC associated with a first period (e.g., the current period or current TTI period) with the P-PR of the CC associated with a second period (e.g., a previous period), for example, associated with the most recent TTI associated with a PHR being transmitted and the CC having a real transmission). At block 1240, the WTRU may trigger a PHR in accordance with the comparison result.

For example, the PHR associated with the CC may be triggered based on the comparison result (e.g., when the magnitude of change of the P-PR from the first to the second period changes more than a threshold amount). The determination of whether the transmission on the CC in the first or second periods is real may include a determination whether an uplink grant is associated with the CC in the first or second periods, respectively.

FIG. 13 is a flowchart illustrating an additional representative PHR method 1300

Referring to FIG. 13, the representative PHR method 1300 may manage PH reporting associated with a WTRU 102. At block 1310, the WTRU 102 may determine whether a condition associated with P-MPRs taken over a plurality of TTIs has changed temporarily, as a determined result. At block 1320, the WTRU 102 may trigger reporting of the PH based on the determined result.

In certain representative embodiments, the WTRU 102 may determine a sequence of P-MPRs for the plurality of TTIs (e.g., associated with those TTIs) by successively determining the sequence of P-MPR, each during a respectively different TTI.

In certain representative embodiments, the determination of whether the condition has changed temporarily may include a determination whether values of the P-MPR during the sequence of TTIs have changed to satisfy the condition for more than a threshold period. For example, a specified period may be set or configured by the WTRU 102 or network resource, which may be relative to a current time, as a lookback window (which may be a sliding window that moves/slides as the current time changes such that the condition may be measured/satisfied based on parameters within the lookback window). For example, the condition may be satisfied if the condition exists for at least a portion of the lookback window of more than the threshold period.

In certain representative embodiments, a trigger prohibit timer may be initiated by the triggering of a PHR to prevent a second premature PHR such that triggering of the PH reporting may be stopped or prevented (e.g., even if other conditions may warrant the second trigger) until the trigger prohibit time is exceeded from the time of the initiation of the trigger prohibit timer.

The WTRU 102 may calculate the backoff value as one of: (1) a highest value of the P-MPR; (2) a lowest value of the P-MPR; (3) a mean value of the P-MPR; or (4) a median value of the P-MPR from within the lookback window.

In certain representative embodiments, a PHR trigger due to P-MPR may be modified to eliminate bias caused by reports of virtual headroom in the PHR.

FIG. 14 is a flowchart illustrating a still further representative PHR method 1400.

Referring to FIG. 14, the representative PHR method 1400 may manage PH reporting associated with a WTRU 102. At block 1410, the WTRU 102 may determine a first backoff value indicating a first reduction in a value of the maximum transmission power for the WTRU 102 based on or associated with at least one of: (1) Maximum Power Reduction (MPR) or (2) Additional MPR (A-MPR). At block 1420, the WTRU 102 may determine a second backoff value indicating a second reduction in the value of the maximum transmission power for the WTRU 102 based on Power Management Maximum Power Reduction (P-MPR). At block 1430, the WTRU 102 may select one of the first or second backoff values based on which of the first or second backoff values dominate. At block 1440, the WTRU 102 may report the PH in accordance with the selected backoff value.

FIG. 15 is a flowchart illustrating a still additional representative PHR method 1500

Referring to FIG. 15, the representative PHR method 1500 may manage transmission power associated with (e.g., implemented by) a WTRU 102. At block 1510, the WTRU 102 may trigger during a TTI a PHR based on changes to backoff or the impacts of backoff. At block 1520, the WTRU 102 may transmit the PHR during the TTI.

FIG. 16 is a flowchart illustrating a still additional representative PHR method 1600

Referring to FIG. 16, the representative PHR method 1600 may manage transmission power associated with (e.g., implemented by) a WTRU 102. At block 1610, the WTRU 102 may calculate a maximum output power of the WTRU 102 using a power management based backoff. At block 1620, the WTRU 102 may trigger a PHR based on changes to the power management based backoff or the impacts of the power management based backoff.

FIG. 17 is a flowchart illustrating a yet further representative PHR method 1700

Referring to FIG. 17, the representative PHR method 1700 may implement a transmission power determination associated with (e.g., implemented by) a WTRU 102. At block 1710, the WTRU 102 may determine a power management based backoff for reducing the maximum transmission power. At block 1720, the WTRU 102 may report the reduced maximum transmission power based on the determined power management based backoff.

FIG. 18 is a flowchart illustrating a yet further representative PHR method 1800.

Referring to FIG. 18, the representative PHR method 1800 may manage transmission power associated with (e.g., implemented by) a WTRU 102. At block 1810, the WTRU 102 may trigger a PHR based on changes to backoff or the impacts of backoff. At block 1820, the WTRU 102 may eliminate PHR triggers caused by virtual PHRs, for example, by modifying the PHR trigger due to power management based backoff to eliminate the bias caused by reports of virtual headroom in the PHR.

The PH may be calculated as a difference between the WTRU 102 calculated transmit power and a configured maximum output power. In certain representative embodiments, the WTRU 102 may compute a value used for PH for each of a plurality of CCs.

In certain representative embodiments, the WTRU 102 may apply the MPR (e.g., MPR and/or A-MPR) effects in parallel with the non-MPR effects (e.g., reducing the maximum output power per CC in a subframe.

The WTRU 102 may trigger the PHR generation in response to detection of a change in the power management based backoff and/or may indicate in the PHR how the power management based backoff affects the maximum output power for each CC reported.

In certain representative embodiments, the WTRU 102 may use the power management based backoff when the WTRU 102 is in an ON state.

In certain representative embodiments, the UL transmission may be bursty such that triggering, by the WTRU 102 of the PHR may include a reduced maximum output power per component carrier value in response to a first transmission burst (e.g., which may set an information element burst mode to ON).

In certain representative embodiments, the PHR may be sent and may include the maximum output power per CC value that is a worst-case backoff that occurred in a time period since a last occurrence of a PHR.

In certain representative embodiments, the WTRU 102 may report a maximum output power per CC value in a virtual PHR (e.g. on a condition that the maximum output power per CC value is affected by the power management based backoff).

In certain representative embodiments, the WTRU 102 may set a maximum output power using one of: (1) a first mode based on the WTRU 102 operating in more than one frequency band; or (2) a second mode based on the WTRU 102 operating in one frequency band. When the WTRU 102 operates in the first mode, the MPR, the A-MPR, a ΔTc, or a power management based backoff may be different respective values for each frequency band.

In certain representative embodiments, physical uplink shared channels (PUSCHs) without uplink control information (UCI) may be equally scaled on a condition that the UCI is simultaneously transmitted on physical uplink control channel (PUCCH) and PUSCH, and a total transmit power of the WTRU 102 is not to exceed $P_{CMAX}$, and the sum of PUCCH power plus PUSCH with UCI power is not to exceed $P_{CMAX}$. In certain representative embodiments, the PUSCH with the UCI may be scaled while the PUSCH without the UCI may not be transmitted, when the total transmit power of the WTRU 102 is to exceed $P_{CMAX}$, and the sum of the PUCCH power plus the PUSCH with the UCI power is to exceed $P_{CMAX}$.

In certain representative embodiments, the triggering of the PHR may include triggering the PHR based on a factor that dominates the maximum power calculation.

FIG. 19 is a flowchart illustrating a representative power transmission adjustment method.

Referring to FIG. 19, the representative method 1900 may manage transmission power of a WTRU 102. At block 1910, the WTRU 102 may determine a Power Management Power Reduction (P-PR). At block 1920, the WTRU 102 may determine a backoff value for reducing a value of the maximum transmission power for the WTRU 102. At block 1930, the WTRU 102 may adjust transmission power in accordance with the determined backoff value.

In certain representative embodiments, the WTRU 102 may calculate the backoff value based on the P-PR.

In certain representative embodiments, the WTRU 102 may compare a further value to the P-PR; and responsive to the further value being greater than the P-PR, the WTRU may adjust of transmission power in accordance with the further value, exclusive of the P-PR. In other representative embodiments, responsive to the further value being less than the P-PR, the WTRU 102 may adjust of transmission power in accordance with the P-PR, exclusive of the further value.

In certain representative embodiments, the WTRU may base the further value on a Maximum Power Reduction (MPR), and an Additional MPR (A-MPR) for each carrier component used for transmission by the WTRU 102.

In certain representative embodiments, The WTRU 102 may scale a transmission power of the component carriers used for transmission by the WTRU 102 such that a composite of the actual transmission power of the component carriers does not exceed the adjusted maximum transmission power of the WTRU 102.

In certain representative embodiments, responsive to a sum of the WTRU computed powers for the uplink component carriers (CCs) without scaling exceeding a maximum transmission power limit, the WTRU 102 may scale the CC powers before transmission to avoid exceeding the maximum transmission power limit.

FIG. 20 is a flowchart illustrating a further representative power transmission adjustment method.

Referring to FIG. 20, the representative method 2000 may manage transmission power of a WTRU 102. At block 2010, the WTRU 102 may determine whether a condition associated with Power Management Power Reductions (P-PRs) taken over a plurality of transmission time intervals (TTIs) has changed temporarily, as a determined result. At block 2020, the WTRU 102 may adjust power transmission of the WTRU based on the determined result.

In certain representative embodiments, the WTRU 102 may determine the P-PRs for the plurality of TTIs by the WTRU 102 successively determining the P-PR during respectively different TTIs.

In certain representative embodiments, the WTRU may determine whether values of the P-PR during the TTIs have changed to satisfy the condition for more than a threshold period.

In certain representative embodiments, the WTRU 102 may set a specified period relative to a current time, as a lookback window; and may determine whether the condition is satisfied in the lookback window.

In certain representative embodiments, the WTRU 102 may determine whether the condition exists for at least a portion of the lookback window of more than the threshold period.

In certain representative embodiments, the WTRU 102 may set the lookback window to be a specified period relative to the current time.

In certain representative embodiments, the WTRU 102 may change the lookback window as the current time changes.

In certain representative embodiments, the WTRU 102 may determine the P-PR as one of: (1) a highest value of P-PR; (2) a lowest value of P-PR; (3) a mean value of P-PR; or (4) a median value of P-PR; and may use the determined value in the adjustment of the maximum transmission power of the WTRU 102.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits.

The data bits may also be maintained on a computer readable medium including magnetic disks, optical disks, and any other volatile (e.g., Random Access Memory ("RAM")) or non-volatile ("e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

One of ordinary skill also understands that different functions and/or elements of disclosed embodiments may be used individually or in combination without departing from the invention.

One of ordinary skill also understands that the representative procedures and methods set forth herein may be used in both Time division duplex (TDD) and frequency division duplex (FDD) System.

Although WTRUs have been described using particular access technologies (e.g., radio access technologies (RATs) such as LTE and CDMA, it is contemplated that the WTRUs may operate as multi-mode devices (e.g., simultaneously in more than one RAT).

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of" multiples of the items and/or the categories of items, individually or in conjunction with other items and/or other categories of items. Further, as used herein, the term "set" is intended to include any number of items, including zero. Further, as used herein, the term "number" is intended to include any number, including zero.

Moreover, the claims should not be read as limited to the described order or elements unless stated to that effect. In addition, use of the term "means" in any claim is intended to invoke 35 U.S.C. § 112, ¶6, and any claim without the word "means" is not so intended.

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used in conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

Embodiments

In one embodiment, a method of managing power headroom reporting associated with a wireless transmit/receive unit (WTRU), may comprises determining a Power Management Power Reduction (P-PR); determining a backoff value for reducing a value of maximum transmission power for the WTRU; and reporting power headroom in accordance with the determined backoff value.

In one embodiment, the determining of the backoff value may include calculating the backoff value based on the P-PR.

In one embodiment, the determining of the backoff value may include determining a further value for reducing a value of maximum transmission power for the WTRU; selecting between one of the further value and the P-PR, as a selected value; and calculating the backoff value based on the selected value.

In one embodiment, the determining of the P-PR may include at least calculating the P-PR based on at least a specific absorption rate (SAR) indicating a rate of absorption of radio frequency energy associated with the WTRU.

In one embodiment, the method may further comprise comparing the further value to the P-PR; and responsive to the further value being greater than the P-PR, calculating the backoff value in accordance with the further value, exclusive of the P-PR.

In one embodiment, the method may further comprise: comparing the further value to the P-PR; and responsive to the further value being less than the P-PR, calculating the backoff value in accordance with the P-PR, exclusive of the further value.

In one embodiment, the further value may be based on a Maximum Power Reduction (MPR), and an Additional MPR (A-MPR).

In one embodiment, the method may further comprise calculating the further value by algebraically combining values based on the MPR and the A-MPR.

In one embodiment, the P-PR, the backoff value and the power headroom reporting may be each associated with one of: (1) a component carrier associated with the WTRU or (2) a composite of component carriers associated with the WTRU.

In one embodiment, the reporting of the power headroom may include sending, for each component carrier, a power headroom report associated therewith In one embodiment, the calculating of the backoff value based on the selected value may include calculating a maximum output power using the maximum of the further value and the P-PR.

In one embodiment, the P-PR, the backoff value, the power headroom reporting and the maximum output power may be each associated with an individual component carrier of the WTRU.

In one embodiment, the method may further comprise calculating a maximum output power using a maximum of the P-PR and a composite of the further value and another value.

In one embodiment, the method may further comprise configuring maximum output power between an upper bound and a lower bound where the lower bound is set by the following equation:

$$P_{CMAX\_L} = \mathrm{MIN}\{P_{EMAX,c} - \Delta T_C, P_{PowerClass} - \mathrm{MAX}(\mathrm{MPR} + A\text{-}\mathrm{MPR}, P\text{-}\mathrm{PR}) - \Delta T_{C,c}\}$$

where $P_{EMAX}$ is a quantity signaled to the WTRU, $\Delta T_C$ is a power reduction that is based on the WTRU transmission frequency, $P_{PowerClass}$ is the maximum power of the WTRU's power class, MPR is a Maximum power reduction for the WTRU, A-MPR is a additional MPR, and P-PR is a power management power reduction.

In one embodiment, the method may further comprise configuring maximum output power for an individual component carrier between an upper bound and a lower bound where the lower bound is set by the following equation:

$$P_{CMAX\_L,c} = \mathrm{MIN}\{P_{EMAX,c} - \Delta T_{C,c}, P_{PowerClass} - \mathrm{MAX}(\mathrm{MPR} + A\text{-}\mathrm{MPR}, P\text{-}\mathrm{PR}) - \Delta T_{C,c}\}$$

where $P_{EMAX,c}$ is a quantity signaled to the WTRU, $\Delta T_{C,c}$ is a power reduction that is based on the WTRU transmission frequency for the individual component carrier, $P_{PowerClass}$ is the maximum power of the WTRU's power class, MPR is a Maximum power reduction for the WTRU, A-MPR is a additional MPR, and P-PR is a power management power reduction.

In one embodiment, the determining of the backoff value may include calculating the backoff value using one of: a first procedure for an inter-band uplink (UL) transmission or a second procedure for an intra-band UL transmission.

In one embodiment, the method may further comprise on a condition that a sum of WTRU computed powers for UL component carriers (CCs) without scaling is to exceed a maximum transmission power limit, indicating that the WTRU has scaled the CC powers before transmission to avoid exceeding the maximum transmission power limit.

In one embodiment, the reporting of the power headroom may include sending a power headroom report (PHR) including power headroom values for component carriers in at least two frequency bands.

In one embodiment, the reporting of the power headroom may include sending a power headroom report including actual power headroom values associated with at least two bands.

In one embodiment, the method may further comprise indicating, in the PHR, whether the WTRU performed scaling when computing output power.

In one embodiment, the method may further comprise determining whether the WTRU applies a backoff value based on the P-PR; and reporting to a network resource that the WTRU has applied the backoff value based on the P-PR.

In one embodiment, the reporting that the WTRU has applied the backoff value based on the P-PR may include: setting a domination indicator when the backoff is based on the P-PR; and sending the domination indicator to the network resource.

In one embodiment, the reporting that the WTRU has applied the backoff value based on the P-PR may include: including a domination indicator in a power headroom (PH) report.

In one embodiment, the sending of the domination indicator may include sending the power headroom report including the domination indicator to the network resource in a medium access control (MAC) control element (CE).

In one embodiment, the setting of the domination indicator may include setting one of: (1) a respective domination indicator for each component carrier impacted by a corresponding P-PR; or (2) a single domination indicator associated with the WTRU.

In one embodiment, the setting of the domination indicator may include setting the domination indicator to one of: (1) a first logic level responsive to the backoff value being impacted by the P-PR; or (2) a second logic level responsive to the power backoff not being impacted by the P-PR.

In one embodiment, a method of managing power headroom reports (PHRs) associated with a wireless transmit/receive unit (WTRU), may comprise: determining whether a real transmission is to occur for a component carrier (CC) at a first period; determining a previous period when a real transmission occurred for the CC; comparing the P-PR of the CC associated with the first period with the P-PR of the CC associated with the previous period; and triggering a PHR in accordance with a comparison result.

In one embodiment, the triggering of the PHR that is associated with the CC to be reported may include triggering the PHR in response to the P-PR of the CC associated with the first period differing from the P-PR of the CC associated with the previous period by a threshold.

In one embodiment, the determining of whether the real transmission is to occur for the CC at the first period may include determining whether any UL resources are to be used for the CC at the first period.

In one embodiment, the determining whether any UL resources are to be used for the CC at the first period may include determining whether either PUSCH or PUCCH signaling occurred for the CC at the first period.

In one embodiment, the first period may be a period associated with a current transmission time interval and the previous period may be a period associated with a closest, previous transmission time interval in which the PHR was sent by the WTRU which included a power headroom corresponding to a real transmission for the CC.

In one embodiment, the comparing of the P-PR of the CC associated with the first period with a P-PR of the CC associated with the previous period may include: obtaining the P-PR of the CC associated with the first period; obtaining the P-PR of the CC associated with the previous period; and determining whether the P-PR of the CC associated with the first period differs from the P-PR of the CC associated with the previous period by a threshold.

In one embodiment, the previous period may be a most recent period a PHR was sent by the WTRU which included a power headroom corresponding to a real transmission for the CC.

In one embodiment, the first period may be a period associated with a current transmission time interval and the previous period may be a period associated with a closest, previous transmission time interval in which the PHR was sent by the WTRU which included a power headroom corresponding to a real transmission for the CC.

In one embodiment, the triggering of the power headroom report may include triggering the power headroom report in transmission time intervals in which the WTRU has uplink resources for a new transmission, exclusive of transmission time intervals in which the WTRU does not have uplink resources for a new transmission.

In one embodiment, the triggering of the power headroom report may include triggering the power headroom report in transmission time intervals in which the WTRU has a PHR prohibit timer that expires or has expired, exclusive of transmission time intervals in which the WTRU does not have the PHR prohibit timer that expires or has expired.

In one embodiment, a method of managing power headroom reporting associated with a wireless transmit/receive unit (WTRU), may comprise: determining whether to trigger power headroom reports based a length and an amount of change in Power Management Power Reductions (P-PRs), as a determined result; and triggering reporting of power headroom based on the determined result.

In one embodiment, a method of managing power headroom reporting associated with a wireless transmit/receive unit (WTRU), may comprise: determining whether a condition associated with Power Management Power Reductions (P-PRs) taken over a plurality of transmission time intervals (TTIs) has changed temporarily, as a determined result; and triggering reporting of power headroom based on the determined result.

In one embodiment, the method may further comprise determining the P-PRs for the plurality of TTIs by successively determining, by the WTRU, the P-PR during respectively different TTIs.

In one embodiment, the determining of whether the condition has changed temporarily may include determining whether values of the P-PR during the TTIs have changed to satisfy the condition for more than a threshold period.

In one embodiment, the determining whether values of the P-PR during the TTIs have changed to satisfy the condition for more than the threshold period may include setting a specified period relative to a current time, as a lookback window; and determining whether the condition is satisfied in the lookback window.

In one embodiment, the determining of whether the condition is satisfied in the lookback window may include determining whether the condition exists for at least a portion of the lookback window of more than the threshold period.

In one embodiment, the setting of the threshold period relative to a current time, as a lookback window may include setting the lookback window to be a specified period relative to the current time.

In one embodiment, the method may further comprise changing the lookback window as the current time changes.

In one embodiment, the triggering of reporting of power headroom may include: responsive to a previous power headroom report being triggered within a trigger prohibit time, preventing, the triggering of the power headroom report until the trigger prohibit time is exceeded.

In one embodiment, the method may further comprise calculating a backoff value reported in the power headroom report using a P-PR associated with one or more of the plurality of P-PRs associated with the look back window.

In one embodiment, the calculating of the backoff value reported in the power headroom report may be repeated for each active component carrier having an uplink grant In one embodiment, the calculating of the backoff value may include determining one value of: (1) a highest value of P-PR; (2) a lowest value of P-PR; (3) a mean value of P-PR; or (4) a median value of P-PR; and including the determined one value in the power headroom report.

In one embodiment, the method may further comprise modifying a PHR trigger due to power management backoff (P-PR) to eliminate bias caused by reports of virtual headroom in the PHR.

In one embodiment, a method of managing power headroom reporting associated with a wireless transmit/receive unit (WTRU), may comprise: determining a first backoff value indicating a first reduction in a value of the transmission power for the WTRU associated with at least one of: (1) Maximum Power Reduction (MPR) or (2) Additional MPR (A-MPR); determining a second backoff value indicating a second reduction in the value of the transmission power for the WTRU based on Power Management Power Reduction (P-PR); selecting one of the first or second backoff values based which of the first or second backoff values dominates; and reporting power headroom in accordance with the selected backoff value.

In one embodiment, a method, implemented by a wireless transmit/receive unit (WTRU), of managing transmission power, may comprise: triggering, during a transmission timing interval (TTI), a power headroom report (PHR) based on changes to backoff or the impacts of backoff, such that the backoff is a larger value of Power Management Power Reduction and another value; and transmitting the PHR during the TTI.

In one embodiment, a method, implemented by a wireless transmit/receive unit (WTRU), of managing transmission power, may comprise triggering a power headroom report (PHR) based on changes to backoff or the impacts of backoff, wherein a power management based backoff is used to calculate a maximum output power of the WTRU.

In one embodiment, a method, implemented by a wireless transmit/receive unit (WTRU), of managing transmission power, may comprise: triggering a power headroom report (PHR) based on changes to backoff or the impacts of backoff, wherein power management based backoff is used to calculate a maximum output power of the WTRU; and eliminating PHR triggers caused by virtual PHRs.

In one embodiment, the method may further comprise modifying a PHR trigger due to power management based backoff to eliminate bias caused by reports of virtual headroom in the PHR.

In one embodiment, the method may further comprise calculating the power headroom as a difference between the WTRU calculated transmit power and a configured maximum output power.

In one embodiment, the calculating of the power headroom may include computing a value used for power headroom for each of a plurality of component carriers (CCs).

In one embodiment, the method may further comprise determining a backoff value based on maximum power reduction (MPR), additional MPR (A-MPR) and non-MPR effects, the non-MPR effects corresponding to the power management based backoff.

In one embodiment, the method may further comprise applying the MPR/A-MPR in parallel with the non-MPR effects.

In one embodiment, non-MPR effects may reduce a maximum output power per component carrier in a subframe.

In one embodiment, the triggering of the PHR may include triggering PHR generation in response to detection of a change in the power management based backoff.

In one embodiment, the method may further comprise indicating in the PHR how the power management based backoff affects the maximum output power for each component carrier reported.

In one embodiment, the triggering of the PHR may include triggering on a condition that the power management based backoff affects the maximum output power for each component carrier value by more than a threshold.

In one embodiment, the method may further comprise applying a changed power management based backoff in response to a changed maximum output power per component carrier value reported by the WTRU in the PHR.

In one embodiment, the method may further comprise using, by the WTRU, the power management based backoff when the WTRU is in an ON state.

In one embodiment, on a condition that transmissions are bursty, triggering, by the WTRU, the PHR including a reduced maximum output power per component carrier value in response to a first transmission burst.

In one embodiment, the method may further comprise setting an information element burst mode to ON.

In one embodiment, the method may further comprise sending the PHR including a maximum output power per component carrier value having a worst case backoff that occurred in a time period since a last occurrence of a PHR.

In one embodiment, the method may further comprise reporting a maximum output power per component carrier value in a virtual PHR on a condition that the maximum output power per component carrier value may be affected by the power management based backoff.

In one embodiment, the method may further comprise setting a maximum power output using one of: (1) a first mode based on the WTRU operating in more than one frequency band; or (2) a second mode based on the WTRU operating in one frequency band.

In one embodiment, at least one of: a maximum power reduction (MPR), an additional MPR (A-MPR), a $\Delta Tc$, or a power management based backoff may be different for each band.

In one embodiment, the method may further comprise equally scaling physical uplink shared channels (PUSCHs) without uplink control information (UCI) on a condition that the UCI is simultaneously transmitted on physical uplink control channel (PUCCH) and PUSCH, and the total transmit power of the WTRU is not to exceed Pcmax, and the sum of PUCCH power plus PUSCH with UCI power is not to exceed Pcmax.

In one embodiment, the method may further comprise scaling the PUSCH with UCI and not transmitting the PUSCH without the UCI on a condition that the total transmit power of the WTRU is to exceed Pcmax, and the sum of PUCCH power plus PUSCH with the UCI power is to exceed Pcmax.

In one embodiment, the power management based backoff may be applied to a minimum bound of a configured maximum transmission power.

In one embodiment, the method may further comprise waiting a time prior to triggering a PHR after changed condition associated with triggering a PHR.

In one embodiment, power backoff values may be component carrier (CC) specific.

In one embodiment, the triggering of the PHR may include triggering the PHR based on a predetermined factor that dominates a maximum power calculation.

In one embodiment, a method of managing transmission power of a wireless transmit/receive unit (WTRU), may comprise: determining a Power Management Power Reduction (P-PR); determining a backoff value for reducing a value of maximum transmission power for the WTRU; and adjusting transmission power in accordance with the determined backoff value.

In one embodiment, the determining of the backoff value may include calculating the backoff value based on the P-PR.

In one embodiment the determining of the backoff value may include: determining a further value for reducing a value of maximum transmission power for the WTRU; and selecting between one of the further value and the P-PR, as a selected value.

In one embodiment, the method may further comprise: comparing the further value to the P-PR; and responsive to the further value being greater than the P-PR, adjusting of the maximum transmission power in accordance with the further value, exclusive of the P-PR.

In one embodiment, the method may further comprise: comparing the further value to the P-PR; and responsive to the further value being less than the P-PR, adjusting of the maximum transmission power in accordance with the P-PR, exclusive of the further value.

In one embodiment, the further value may be based on a Maximum Power Reduction (MPR), and an Additional MPR (A-MPR) for each component carrier used for transmission by the WTRU.

In one embodiment, the method may further comprise: determining whether a sum of powers of the component carriers of the WTRU exceed the maximum transmission power, as a determined result; and scaling a transmission power of the component carriers used for transmission by the WTRU such that a composite of the scaled transmission power does not exceed the maximum transmission power in accordance with the determined result.

In one embodiment, the method may further comprise: configuring maximum output power between an upper bound and a lower bound where the lower bound is set by the following equation:

$$PCMAX\_L = \text{MIN}\{PEMAX - \Delta TC, PPowerClass - \text{MAX}(MPR + A\text{-}MPR, P\text{-}PR) - \Delta TC,\}$$

where PEMAX is a quantity signaled to the WTRU, $\Delta TC$, is a power reduction that is based on the WTRU transmission frequency, PPowerClass is the maximum power of the WTRU's power class, MPR is a Maximum power reduction for the WTRU, A-MPR is a additional MPR, and P-PR is a power management power reduction.

In one embodiment, the method may further comprise: configuring maximum output power for an individual component carrier between an upper bound and a lower bound where the lower bound is set by the following equation:

$$PCMAX\_L,c = \text{MIN}\{PEMAX,c - \Delta TC,c, PPowerClass - \text{MAX}(MPR + A\text{-}MPR, P\text{-}PR) - \Delta TC,c\}$$

where PEMAX,c is a quantity signaled to the WTRU, $\Delta TC,c$, is a power reduction that is based on the WTRU transmission frequency for the individual component carrier, PPowerClass is the maximum power of the WTRU's power class, MPR is a Maximum power reduction for the WTRU, A-MPR is a additional MPR, and P-PR is a power management power reduction.

In one embodiment, the method may further comprise: responsive to a sum of the WTRU computed powers for the uplink component carriers (CCs) without scaling exceeding a maximum transmission power limit, scaling, by the WTRU, the CC powers before transmission to avoid exceeding the maximum transmission power limit.

In one embodiment, a method of managing transmission power of a wireless transmit/receive unit (WTRU), may comprise determining whether a condition associated with Power Management Power Reductions (P-PRs) taken over a plurality of transmission time intervals (TTIs) has changed temporarily, as a determined result; and adjusting power transmission of the WTRU based on the determined result.

In one embodiment, the method may further comprise determining the P-PRs for the plurality of TTIs by successively measuring, by the WTRU, the P-PR during a respectively different TTI.

In one embodiment, the determining of whether the condition has changed temporarily may include determining whether values of the P-PR during the TTIs have changed to satisfy the condition for more than a threshold period.

In one embodiment, determining whether values of the P-PR during the TTIs have changed to satisfy the condition for more than the threshold period may include: setting a specified period relative to a current time, as a lookback window; and determining whether the condition is satisfied in the lookback window.

In one embodiment, the determining of whether the condition is satisfied in the lookback window may include determining whether the condition exists for at least a portion of the lookback window of more than the threshold period.

In one embodiment, the setting the threshold period relative to a current time, as a lookback window may include setting the lookback window to be a specified period relative to the current time.

In one embodiment, the method may further comprise changing the lookback window as the current time changes.

In one embodiment, the calculating of the backoff value may include determining one value of: (1) a highest value of P-PR; (2) a lowest value of P-PR; (3) a mean value of P-PR; or (4) a median value of P-PR; and using the determined value in the adjusting of the maximum transmission power of the WTRU.

In one embodiment, a wireless transmit/receive unit (WTRU) configured to report power headroom, may comprise: a processor configured to: determine a Power Management Power Reduction (P-PR) and determine a backoff value for reducing a value of maximum transmission power for the WTRU; and a transmit/receive unit configured to report power headroom in accordance with the backoff value determined by the processor.

In one embodiment, the processor may be configured to calculate the backoff value based on the P-PR.

In one embodiment, the processor may be configured to determine a further value for reducing a value of maximum transmission power for the WTRU; select between one of the further value and the P-PR, as a selected value; and calculate the backoff value based on the selected value.

In one embodiment, the processor may be configured to at least calculate the P-PR based on at least a specific absorption rate (SAR) indicating a rate of absorption of radio frequency energy associated with the WTRU.

In one embodiment, the processor may be configured to: compare the further value to the P-PR; and responsive to the further value being greater than the P-PR, calculate the backoff value in accordance with the further value, exclusive of the P-PR.

In one embodiment, the processor may be configured to: compare the further value to the P-PR; and responsive to the further value being less than the P-PR, calculate the backoff value in accordance with the P-PR, exclusive of the further value.

In one embodiment, the processor may be configured to base the further value is on a Maximum Power Reduction (MPR), and an Additional MPR (A-MPR).

In one embodiment, the processor may be configured to calculate the further value by algebraically combining values based on the MPR and the A-MPR.

In one embodiment, the processor may be configured to associate the P-PR, the backoff value and the power headroom reporting with one of: (1) a component carrier associated with the WTRU or (2) a composite of the component carriers associated with the WTRU.

In one embodiment, the transmit/receive unit may be configured to send, for each component carrier, a power headroom report associated therewith.

In one embodiment, the transmit/receive unit may be configured to send a composite power headroom report via radio resource control signaling computed from power backoffs associated with individual, active component carriers of the WTRU.

In one embodiment, the processor may be configured to calculate a maximum output power using the maximum of the further value and the P-PR.

In one embodiment, the processor may be configured to calculate a maximum power output using the maximum of the P-PR and a composite of the further value and another value.

In one embodiment, the processor may be configured to set a maximum output power between an upper bound and a lower bound where the lower bound is set by the following equation:

$$P_{C\text{MAX}\_L}=\text{MIN}\{P_{EMAX}-\Delta T_C, P\text{PowerClass}-\text{MAX}(MPR+A\text{-}MPR, P\text{-}PR)-\Delta T_C,\}$$

where PEMAX is a quantity signaled to the WTRU, $\Delta TC$, is a power reduction that is based on the WTRU transmission frequency, PPowerClass is the maximum power of the WTRU's power class, MPR is a Maximum power reduction for the WTRU, A-MPR is a additional MPR, and P-PR is a power management power reduction.

In one embodiment, the processor may be configured to set a maximum output power for an individual component carrier between an upper bound and a lower bound where the lower bound is set by the following equation:

$$P_{C\text{MAX}\_L,c}=\text{MIN}\{P_{EMAX,c}-\Delta T_{C,c}, P\text{PowerClass}-\text{MAX}(MPR+A\text{-}MPR, P\text{-}PR)-\Delta T_{C,c}\}$$

where PEMAX,c is a quantity signaled to the WTRU, $\Delta TC,c$, is a power reduction that is based on the WTRU transmission frequency for the individual component carrier, PPowerClass is the maximum power of the WTRU's power class, MPR is a Maximum power reduction for the WTRU, A-MPR is a additional MPR, and P-PR is a power management power reduction.

In one embodiment, the processor may be configured to determine whether the WTRU applies the backoff value based on the P-PR; and the transmit/receive unit may be configured to report to a network resource that the WTRU has applied the backoff value based on the P-PR, responsive to the WTRU applying the backoff value based P-PR.

In one embodiment, the processor may be configured to set a domination indicator when the backoff value is based on P-PR; and the transmit/receive unit may be configured to send the domination indicator to the network resource.

In one embodiment, the processor may be configured to set a domination indicator, as a media access controller (MAC) control element (CE); and the transmit/receive unit may be configured to send the MAC CE to the network resource.

In one embodiment, the processor may be configured to set one of: (1) a respective domination indicator for each component carrier impacted by the P-PR; or (2) a single domination indicator associated with the WTRU.

In one embodiment, the processor may be configured to set the domination indicator to one of: (1) a first logic level responsive to the backoff value being impacted by the P-PR; or (2) a second logic level responsive to the backoff value not being impacted by the P-PR; and to trigger a power headroom report (PHR).

In one embodiment, a wireless transmit/receive unit (WTRU) configured to manage power headroom reports (PHRs), may comprise: a processor configured to determine whether a real transmission is to occur for a component carrier (CC) at a first period; determine a previous period when a real transmission occurred for the CC; compare the P-PR of the CC associated with the first period with the P-PR of the CC associated with the previous period; and trigger a PHR in accordance with a comparison result.

In one embodiment, the processor may be configured to determine whether an uplink grant is associated with the component carrier in the first period.

In one embodiment, the processor may be configured to trigger the PHR in response to the P-PR of the CC associated with the first period differing from the P-PR of the CC associated with the previous period by a threshold.

In one embodiment, the processor may be configured to obtain the P-PR of the CC associated with the first period; obtain the P-PR of the CC associated with the previous period; and determine whether the P-PR of the CC associated with the first period differs from the P-PR of the CC associated with the previous period by a threshold.

In one embodiment, the processor may be configured to trigger the power headroom report in response to the power backoff of the CC associated with the first period differing from the power backoff of the CC associated with the previous period by a threshold.

The previous period may be a most recent period a PHR was sent by the WTRU which included a power headroom corresponding to a real transmission for the CC; and the first period may be a period associated with a current transmission time interval and the previous period is a period associated with a closest, previous transmission time interval in which the PHR was sent by the WTRU which included a power headroom corresponding to a real transmission for the CC.

In one embodiment, the processor may be configured to trigger the power headroom report in transmission time intervals in which the WTRU has uplink resources for a new transmission on the CC, exclusive of transmission time intervals in which the WTRU does not have uplink resources for the new transmission on the CC.

In one embodiment, the processor may be configured to trigger the power headroom report in transmission time intervals in which the WTRU has a PHR prohibit timer that expires or has expired, exclusive of transmission time intervals in which the WTRU does not have the PHR prohibit timer that expires or has expired.

In one embodiment, a wireless transmit/receive unit (WTRU) configured to manage power headroom reporting, may comprise: a processor configured to determine whether a condition associated with Power Management Power Reductions (P-PRs) taken over a plurality of transmission time intervals (TTIs) has changed temporarily, as a determined result; and trigger reporting of power headroom based on the determined result.

In one embodiment, the processor may be configured to determine the P-PRs for the plurality of TTIs by successively calculating the P-PR during respectively different TTIs.

In one embodiment, the processor may be configured to determine whether values of the P-PR during the TTIs have changed to satisfy the condition for more than a threshold period.

In one embodiment, the processor may be configured to set a specified period relative to a current time, as a lookback window; and determine whether the condition is satisfied in the lookback window.

In one embodiment, the processor may be configured to determine whether the condition exists for at least a portion of the lookback window of more than the threshold period.

In one embodiment, the processor may be configured to set the lookback window to be a specified period relative to the current time.

In one embodiment, the processor may be configured to change the lookback window as the current time changes.

In one embodiment, the processor may be configured to prohibit the triggering of the power headroom report until the trigger prohibit time is exceeded, responsive to the power headroom report otherwise being triggered within a trigger prohibit time.

In one embodiment, the processor may be configured to calculate a backoff value using a P-PR associated with one or more of the plurality of P-PRs associated with the lookback window.

In one embodiment, the processor may be configured to determine one value of: (1) a highest value of P-PR; (2) a lowest value of P-PR; (3) a mean value of P-PR; or (4) a median value of P-PR; and include the determined value in the power headroom report.

In one embodiment, the processor may be configured to modify a PHR trigger due to power management backoff to eliminate bias caused by reports of virtual headroom in the PHR.

In one embodiment, a wireless transmit/receive unit (WTRU) configured to manage power headroom reporting, further comprises: a processor configured to determine a first backoff value indicating a first reduction in a value of the transmission power for the WTRU based on at least one of: (1) Maximum Power Reduction (MPR) and (2) Additional MPR (A-MPR); determine a second backoff value indicating a second reduction in the value of the transmission power for the WTRU based on Power Management Power Reduction (P-PR); select one of the first or second backoff value based which of the first or second backoff values dominate; and a transmit/receive unit configured to report power headroom in accordance with the backoff value selected by the processor.

In one embodiment, a wireless transmit/receive unit (WTRU) configured to manage transmission power, may comprise: a processor configured to trigger, during a transmission timing interval (TTI), a power headroom report (PHR) based on power management changes to backoff or impacts of the power management on the backoff; and a transmit/receive unit configured to transmit the PHR during the TTI.

In one embodiment, a wireless transmit/receive unit (WTRU) configured to manage transmission power, may comprise: a processor configured to trigger a power headroom report (PHR) based on changes to backoff or the impacts of the backoff, wherein a power management based backoff is used to calculate a maximum output power of the WTRU;

In one embodiment, a wireless transmit/receive unit (WTRU) configured to manage transmission power, may comprise: a processor configured to determine a power management based backoff for reducing the transmission power; and a transmit/receive unit configured to report the reduced transmission power based on the determined power management based backoff.

In one embodiment, a wireless transmit/receive unit (WTRU) configured to manage transmission power, may comprise: a processor configured to trigger a power headroom report (PHR) based on changes to backoff or the impacts of backoff, wherein power management based backoff is used to calculate a maximum output power of the WTRU; and eliminate PHR triggers caused by virtual PHRs.

In one embodiment, the processor may be configured to modify a PHR trigger due to power management based backoff to eliminate bias caused by reports of virtual headroom in the PHR.

In one embodiment, the processor may be configured to calculate the power headroom as a difference between the WTRUs calculated transmit power and a configured maximum output power.

In one embodiment, the processor may be configured to compute a value used for power headroom for each of a plurality of component carriers (CCs).

In one embodiment, the processor may be configured to determine a backoff value based on maximum power reduction (MPR), additional MPR (A-MPR) and non-MPR effects, the non-MPR effects corresponding to the power management based backoff.

In one embodiment, the processor may be configured to apply the MPR/A-MPR in parallel with the non-MPR effects.

In one embodiment, the non-MPR effects may reduce a maximum output power per component carrier in a subframe.

In one embodiment, the processor may be configured to trigger PHR generation in response to detection of a change in the power management based backoff.

In one embodiment, the processor may be configured to indicate in the PHR how the power management based backoff affects the maximum output power for each component carrier reported. In one embodiment, the processor may be configured to trigger on a condition that the power management based backoff affects the maximum output power for each component carrier value by more than a threshold.

In one embodiment, the processor may be configured to apply a changed power management based backoff in response to a changed maximum output power per component carrier value reported by the WTRU in the PHR.

In one embodiment, the processor may be configured to use the power management based backoff when the WTRU is in an ON state.

In one embodiment, the processor may be configured to trigger, the PHR including a reduced maximum output power per component carrier value in response to a first transmission burst on a condition that transmissions are bursty.

In one embodiment, the processor may be configured to set an information element burst mode to ON, on the condition that transmissions are bursty.

In one embodiment, the processor may be configured to send the PHR including a maximum output power per component carrier value having a worst case backoff that occurred in a time period since a last occurrence of a PHR.

In one embodiment, the transmit/receive unit may be configured to report a maximum output power per component carrier value in a virtual PHR on a condition that the maximum output power per component carrier value is affected by the power management based backoff.

In one embodiment, the processor may be configured to set a maximum power output using one of: (1) a first mode based on the WTRU operating in more than one frequency band; or (2) a second mode based on the WTRU operating in one frequency band.

In one embodiment, at least one of: a maximum power reduction (MPR), an additional MPR (A-MPR), a ∆Tc, or a power management based backoff, as the non-MPR effects is different for each frequency band.

In one embodiment, the processor may be configured to equally scale physical uplink shared channels (PUSCHs) without uplink control information (UCI) on a condition that the UCI is simultaneously transmitted on physical uplink control channel (PUCCH) and PUSCH, total transmit power of the WTRU is not to exceed Pcmax, and the sum of PUCCH power plus PUSCH with UCI power is not to exceed Pcmax.

In one embodiment, the processor may be configured to scale the PUSCH with UCI and not transmitting the PUSCH without the UCI on a condition that total transmit power of the WTRU is to exceed Pcmax, and a sum of PUCCH power plus PUSCH with the UCI power is to exceed Pcmax.

In one embodiment, the processor may be configured to apply the power management based backoff to a minimum bound of a configured maximum transmission power.

In one embodiment, the processor may be configured to wait a time prior to triggering a PHR after a changed condition associated with triggering a PHR.

In one embodiment, the processor may be configured to trigger the PHR based on a predetermined factor that dominates a maximum power calculation.

In one embodiment, a non-transitory computer readable storage medium storing program code may implement any of the methods herein.

What is claimed is:

1. A method of managing power headroom reports (PHRs) associated with a wireless transmit/receive unit (WTRU), the method comprising:
   determining whether a Power Management Power Reduction (P-MPR) for a serving cell has changed by more than a threshold after a last PHR was transmitted by the WTRU when the WTRU included at least one real uplink transmission on the serving cell;
   determining whether a configured maximum output power of the WTRU is impacted by the P-MPR;
   on condition that the P-MPR for the serving cell has changed by more than the threshold after the last PHR was transmitted by the WTRU when the WTRU included the at least one real uplink transmission on the serving cell, triggering a new PHR; and
   sending, by the WTRU to a network entity, the triggered new PHR including the configured maximum output power of the WTRU and an indicator that indicates whether the configured maximum output power of the WTRU is impacted by the P-MPR.

2. The method of claim 1, further comprising:
   for a transmission time interval (TTI), determining whether the WTRU includes at least one other real uplink transmission on the serving cell or has an uplink resource grant for transmission on the serving cell, wherein:

the at least one other uplink transmission on the service cell or the uplink resource grant for transmission on the serving cell is after the last PHR transmitted by the WTRU, and the triggering of the new PHR is further conditioned on the WTRU including the at least one real uplink transmission on the serving cell or having the uplink resource grant for transmission on the serving cell.

3. The method of claim 2, wherein the WTRU includes the at least one real uplink transmission on the serving cell on condition that any of: (1) the WTRU has the uplink resource grant for transmission on the serving cell for an associated TTI; (2) the WTRU has an uplink resource that is allocated for transmission on the serving cell for the associated TTI; or (3) the WTRU is to provide a Physical Uplink Control Channel (PUCCH) transmission on the serving cell for the associated TTI.

4. The method of claim 3, further comprising receiving, by the WTRU, the uplink resource grant or a semi-static persistent schedule to allocate the uplink resource for transmission on the serving cell for the associated TTI.

5. The method of claim 2, wherein the WTRU included the at least one other real uplink transmission on the serving cell in another TTI that was associated with the last PHR on condition that any of: (1) the WTRU had the uplink resource grant for transmission on the serving cell for the other TTI; (2) the WTRU had an uplink resource that was allocated for transmission on the serving cell for the other TTI; or (3) the WTRU provided Physical Uplink Control Channel (PUCCH) transmission on the serving cell for the other TTI.

6. The method of claim 1, wherein the triggered new PHR is associated with a current transmission time interval (TTI) and the last PHR is associated with a closest, previous TTI for which the WTRU included any real transmission on the serving cell.

7. The method of claim 1, wherein the P-MPR is affected by any of: (1) a change in a specific absorption rate (SAR); (2) a change in proximity of the WTRU to a user of the WTRU; or (3) 1xEV-DO data transmission.

8. The method of claim 1, further comprising adjusting transmission power in accordance with the configured maximum output power of the WTRU sent in a Media Access Control (MAC) Control Element (CE).

9. The method of claim 1, wherein, in the triggered new PHR, the indicator and the configured maximum output power are included separately.

10. A wireless transmit/receive unit (WTRU) configured to manage power headroom reports (PHRs), comprising:

a processor configured to:

determine whether a Power Management Power Reduction (P-MPR) for a serving cell has changed by more than a threshold after a last PHR was transmitted by the WTRU when the WTRU included at least one real uplink transmission on the serving cell, determine whether a configured maximum output power of the WTRU is impacted by the P-MPR, and trigger a new PHR on condition that the P-MPR for the serving cell has changed by more than the threshold after the last PHR was transmitted by the WTRU when the at least one real uplink transmission was included by the WTRU on the serving cell; and a transmit/receive unit configured to send to a network entity the triggered new PHR including the configured maximum output power of the WTRU and an indicator that indicates whether the configured maximum output power of the WTRU is impacted by the P-MPR.

11. The method of claim 1, further comprising generating a Media Access Control (MAC) Control Element (CE) including the configured maximum output power and the indicator, wherein the sending of the triggered new PHR includes sending the MAC CE.

12. The WTRU of claim 10, wherein:

the processor is configured to:

for a transmission time interval (TTI), determine whether the WTRU includes at least one other real uplink transmission on the serving cell or has an uplink resource grant for transmission on the serving cell, and trigger the new PHR on condition that: (1) the P-MPR for the serving cell has changed by more than the threshold after the last PHR was transmitted by the WTRU when the at least one real uplink transmission was included by the WTRU on the serving cell and (2) the WTRU includes the at least one other real uplink transmission on the serving cell or has the uplink resource grant for transmission on the serving cell; and the at least one other uplink transmission on the service cell or the uplink resource grant for transmission on the serving cell is after the last PHR transmitted by the WTRU.

13. The WTRU of claim 12, wherein the triggered new PHR is associated with a current TTI and the last PHR is associated with a closest, previous TTI for which the WTRU included any real transmission on the serving cell.

14. The WTRU of claim 12, wherein the transmit/receive unit is configured to include the at least one other real uplink transmission on the serving cell on condition that any of: (1) the WTRU has the uplink resource grant for transmission on the serving cell for an associated TTI; (2) the WTRU has an uplink resource that is allocated for transmission on the serving cell for the associated TTI; or (3) the WTRU is to provide a Physical Uplink Control Channel (PUCCH) transmission on the serving cell for the associated TTI.

15. The WTRU of claim 14, wherein the transmit/receive unit is configured to receive an allocation of the uplink resource for transmission on the serving cell for the associated TTI by the uplink resource grant or by a semi-static persistent scheduling.

16. The WTRU of claim 12, wherein the processor is configured to maintain a value for P-MPR, which is affected by any of: (1) a change in a specific absorption rate (SAR); (2) a change in proximity of the WTRU to a user of the WTRU; or (3) 1xEV-DO data transmission.

17. The WTRU of claim 10, wherein:

the processor is configured to generate a Media Access Control (MAC) Control Element (CE) including the configured maximum output power and the indicator; and the transmit/receive unit is configured to send the MAC CE.

18. The WTRU of claim 10, wherein the processor is configured to adjust transmission power in accordance with the configured maximum output power of the WTRU sent in a Media Access Control (MAC) Control Element (CE).

19. The WTRU of claim 10, wherein the processor is configured to separately include in the triggered new PHR, the indicator and the configured maximum output power.

20. A wireless transmit/receive unit (WTRU) configured to manage power headroom reports (PHRs), comprising:
a processor configured to:
determine whether to trigger a new PHR based on a change in a Power Management Power Reduction (P-MPR),
determine whether a configured maximum output power of the WTRU is impacted by the P-MPR, and
trigger the new PHR; and
a transmit/receive unit configured to send the triggered new PHR including the configured maximum output power of the WTRU and an indicator that indicates whether the configured maximum output power of the WTRU is impacted by the P-MPR.

* * * * *